(12) United States Patent  
Kaiser et al.

(10) Patent No.: US 9,031,382 B1  
(45) Date of Patent: May 12, 2015

(54) CODE EXECUTION IN COMPLEX AUDIOVISUAL EXPERIENCES

(71) Applicant: Coincident.tv, Inc., Hillsborough, CA (US)

(72) Inventors: David H. Kaiser, Hillsborough, CA (US); Bruce Schwartz, Hillsborough, CA (US); Carl Rosenberg, San Francisco, CA (US); Alex Kalinin, Cupertino, CA (US)

(73) Assignee: Coincident.tv, Inc., San Francisco, CA (US)

( * ) Notice: Subject to any disclaimer, the term of this patent is extended or adjusted under 35 U.S.C. 154(b) by 397 days.

(21) Appl. No.: 13/657,520

(22) Filed: Oct. 22, 2012

Related U.S. Application Data

(60) Provisional application No. 61/549,582, filed on Oct. 20, 2011.

(51) Int. Cl.  
*H04N 13/00* (2006.01)

(52) U.S. Cl.  
CPC .................................. *H04N 13/0062* (2013.01)

(58) Field of Classification Search  
None  
See application file for complete search history.

(56) References Cited

U.S. PATENT DOCUMENTS

| | | | | |
|---|---|---|---|---|
| 6,332,144 | B1* | 12/2001 | deVries et al. | 1/1 |
| 2002/0059342 | A1* | 5/2002 | Gupta et al. | 707/512 |
| 2009/0259941 | A1* | 10/2009 | Kennedy, Jr. | 715/719 |
| 2010/0037149 | A1* | 2/2010 | Heath | 715/753 |
| 2010/0095211 | A1* | 4/2010 | Kenvin et al. | 715/723 |
| 2010/0293190 | A1* | 11/2010 | Kaiser et al. | 707/769 |

* cited by examiner

*Primary Examiner* — Hung Dang  
*Assistant Examiner* — Sunghyoun Park  
(74) *Attorney, Agent, or Firm* — Hickman Palermo Truong Becker LLP

(57) ABSTRACT

In one embodiment, a method includes obtaining a link to a video program; obtaining metadata that relates to the program and that defines, for a specified time point in the program, annotations to be invoked at the specified time point; wherein the annotations comprise: a graphic image; one or more filters, each of the filters comprising a key and one or more matching values; and optionally a reference to a video segment, an electronic document, program code statements, or a programmatic call; during playing the video, detecting that the video program is playing at the specified time point; in response to the detecting: for each particular annotation for the specified time point, retrieving a current value for the key, and causing to display the graphic image associated with that particular annotation only when the current value of the key matches one of the matching values of one of the filters.

6 Claims, 46 Drawing Sheets

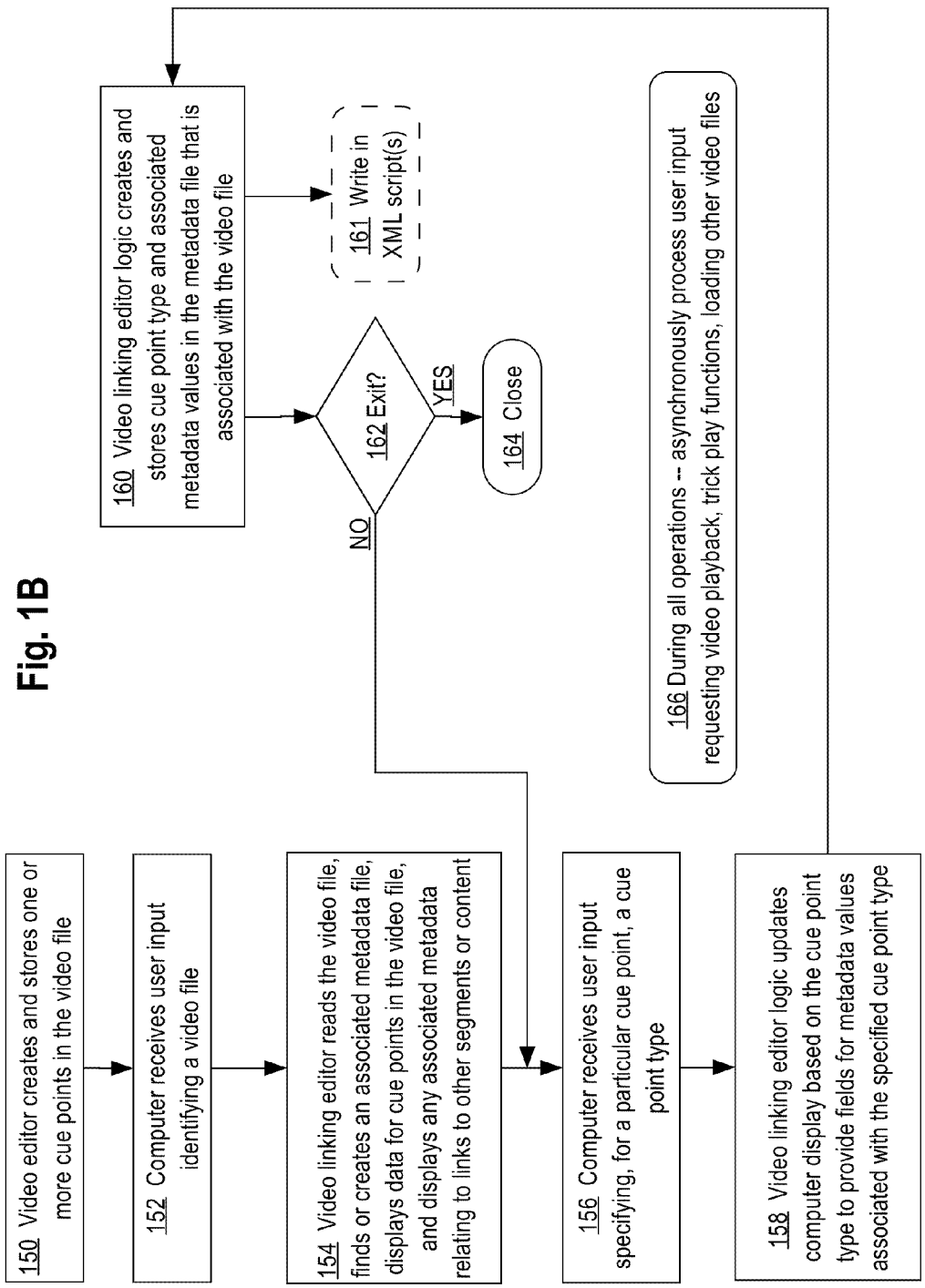

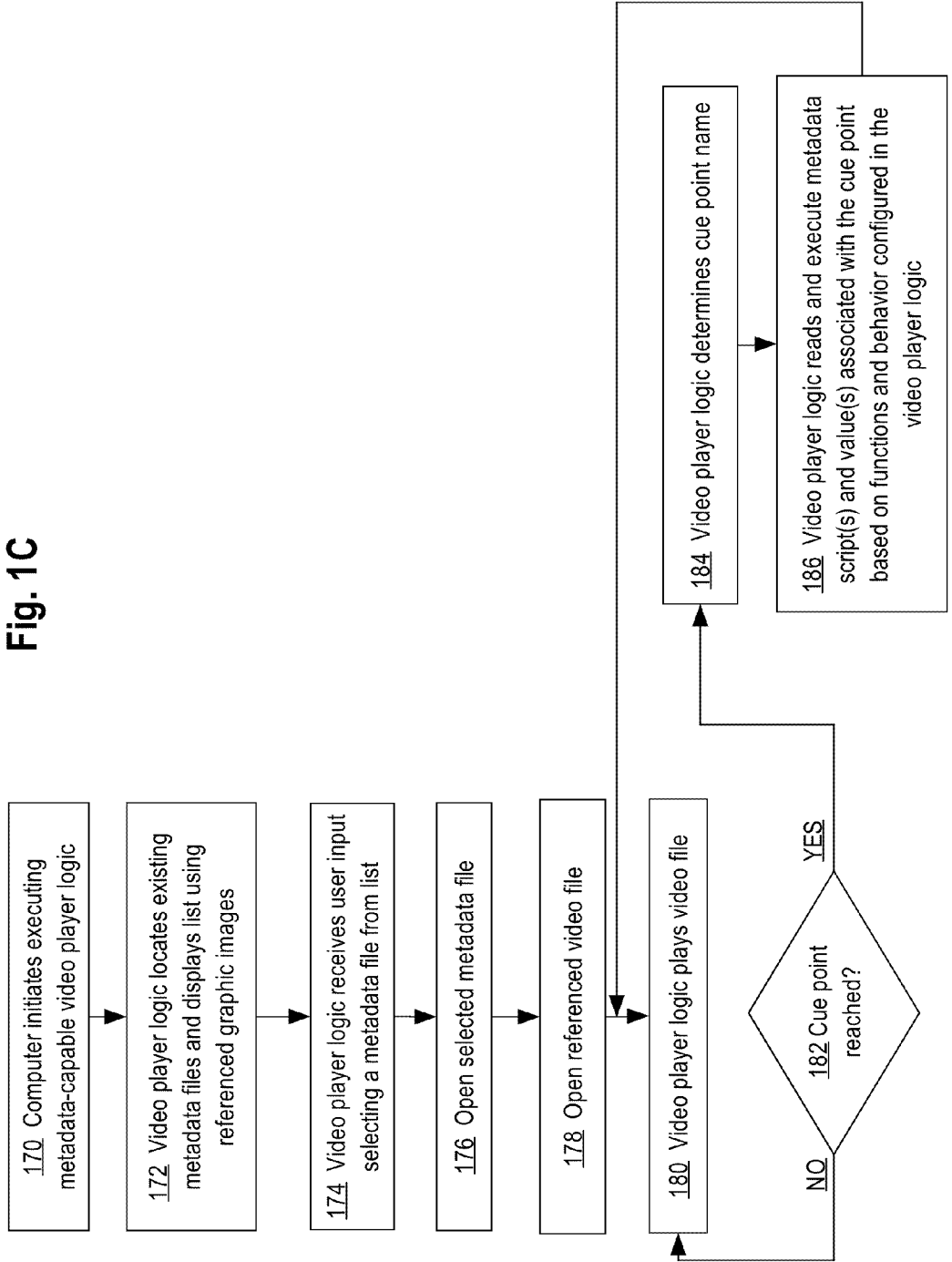

Fig. 6

| | Cue Point Data |
|---:|:---|
| Cue Name | start |
| Cue Time | 0 |
| Cue type | reg ▼ |
| Content Type | prog_Inline ▼ |
| Interest URL | http://www.thedailyshow.com/ |
| Query String | |
| Story Text | |
| Story Picture | |
| Targets | Cue Point |

[ + ] [ - ]

A directory, in this case of the stories within an episode of PBS's "News Hour"
(Note the balloon text, red because it's a video link (blue for web))

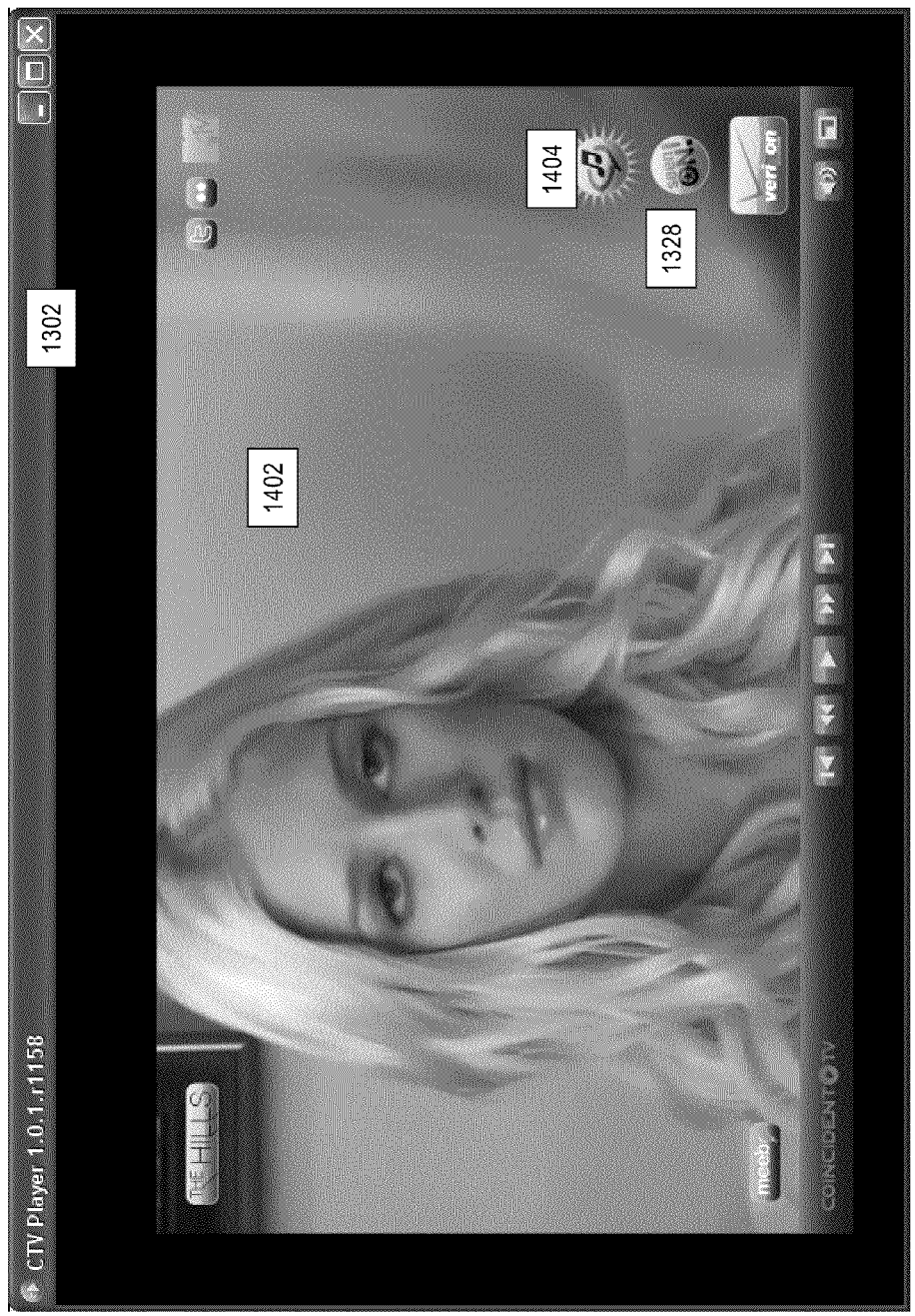

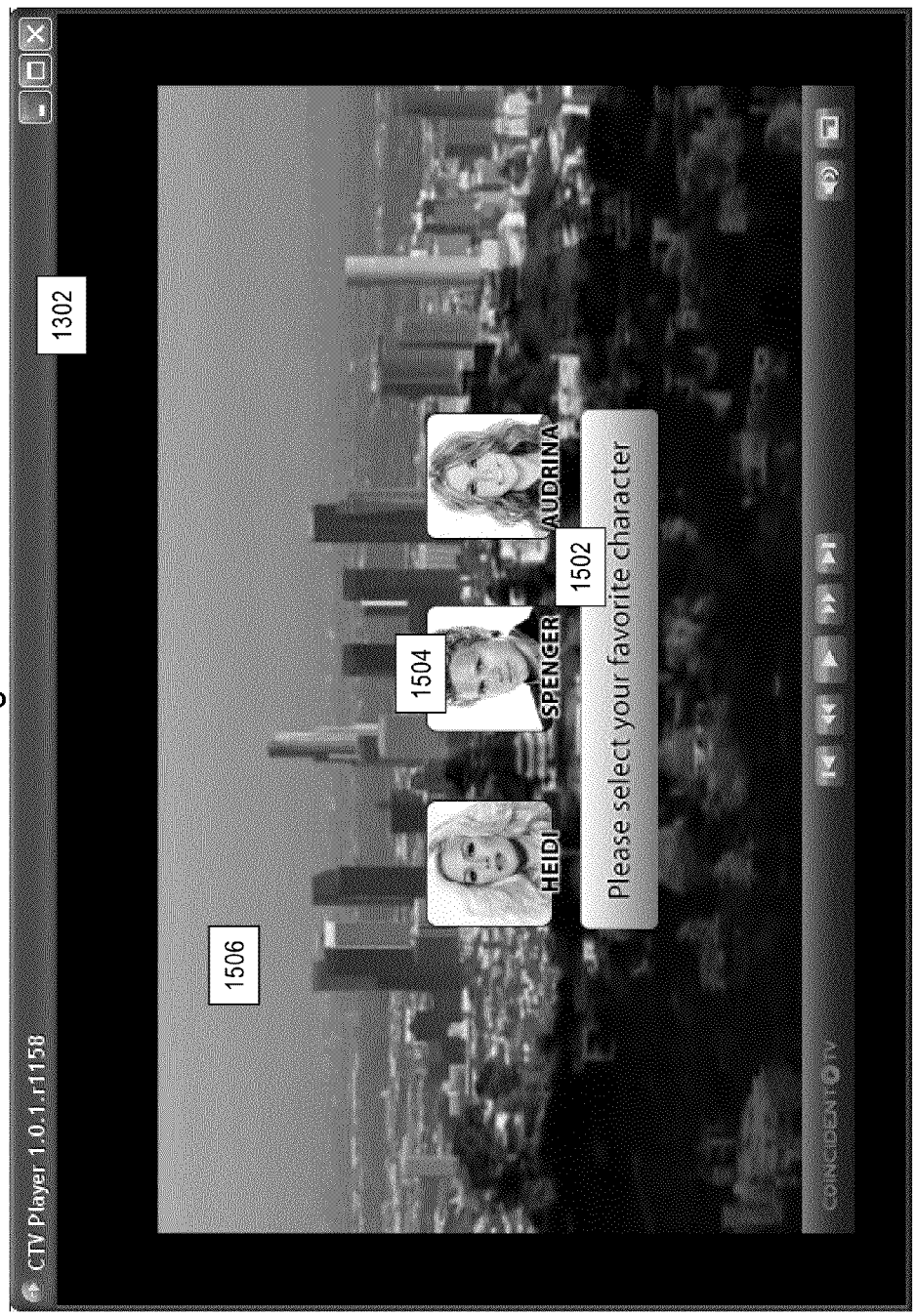

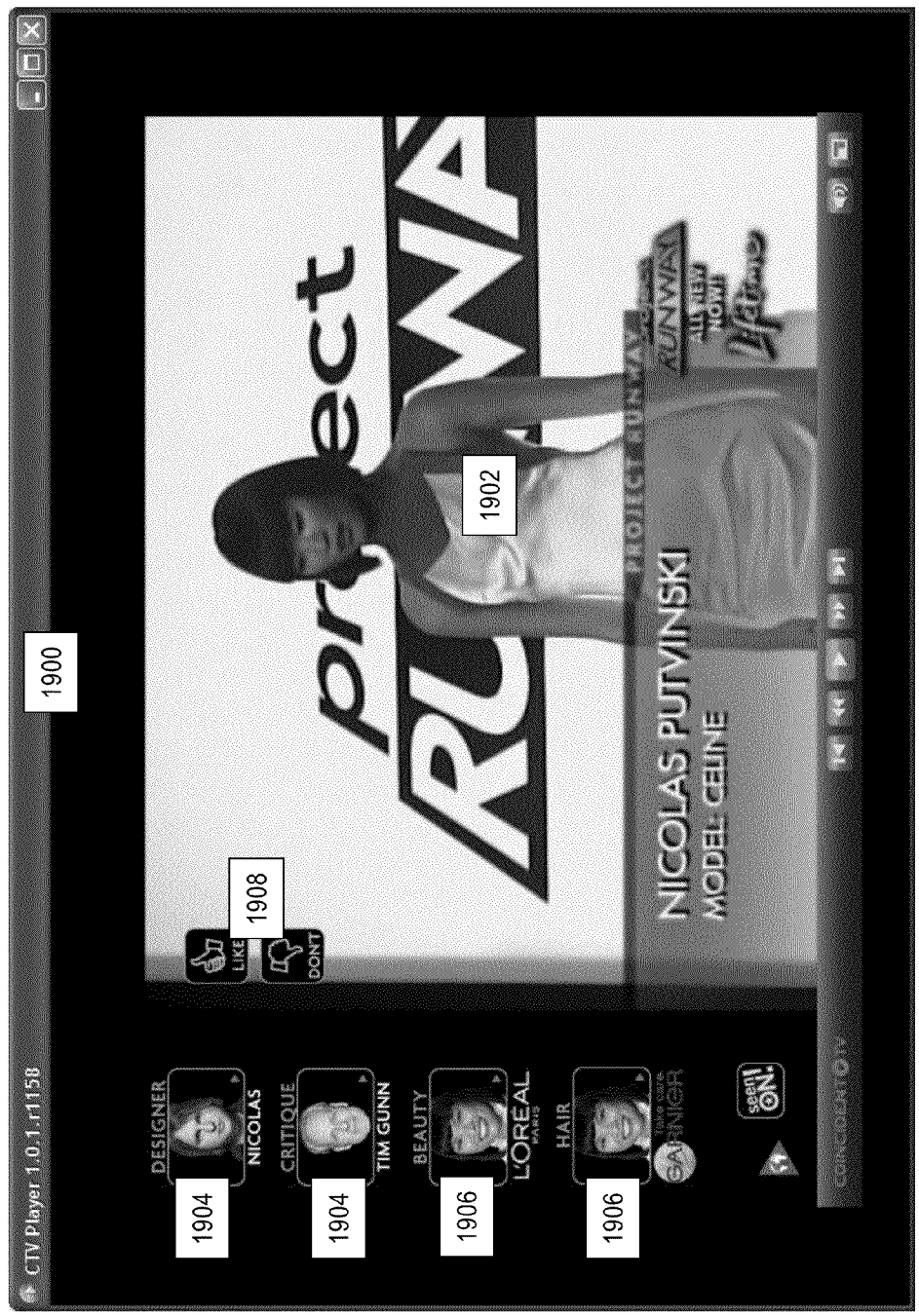

Total

Fig. 35
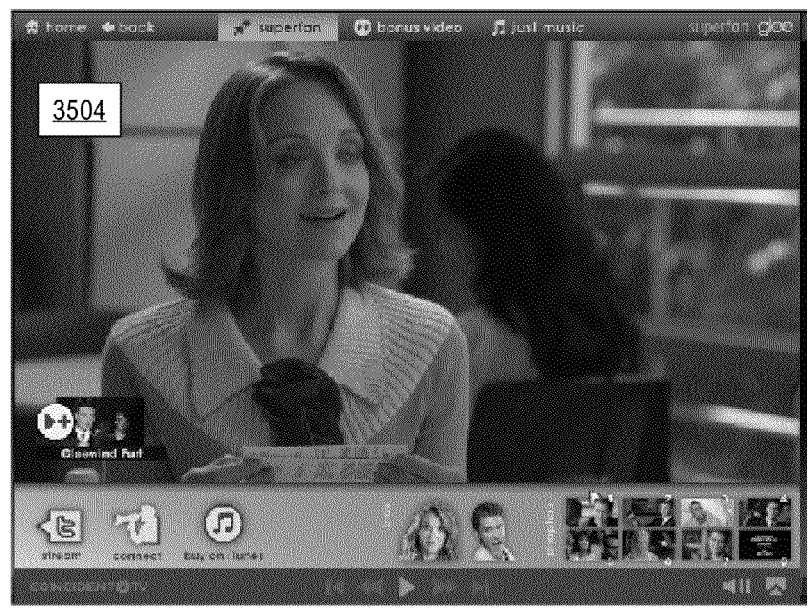
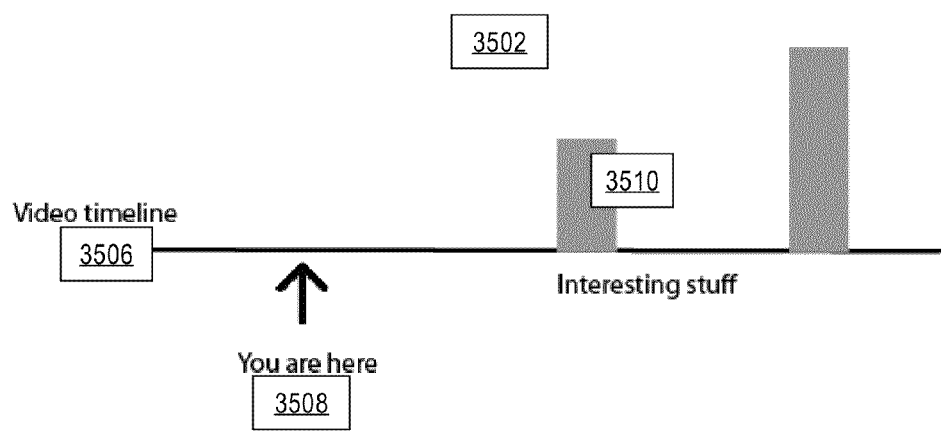

CODE EXECUTION IN COMPLEX AUDIOVISUAL EXPERIENCES

BENEFIT CLAIM

This application claims the benefit under 35 U.S.C. 119 of prior provisional application 61/549,582 filed Oct. 20, 2011, the entire contents of which is hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2008-2012 Coincident.TV, Inc.

TECHNICAL FIELD

The present disclosure generally relates to video playing, video editing, and displaying hyperlinked media.

BACKGROUND

Commercial television broadcasting has been supported by advertising revenue since its inception. More recently, providers of video programs and video clips in Internet sites have embedded advertising within video programs or next to video programs in web pages at which the video programs are viewed. However, a continuing problem involved in these technologies is that the advertisements are not closely personalized for the viewer. Instead, commercial broadcasters attempt to define, in terms of rough demographic characteristics, a sub-population of a mass audience that is expected to be interested in a particular program; advertisers who believe that their products appeal to the same rough demographic will purchase advertising slots in the program. Unfortunately, a continuing result of this system is that at least some viewers, who do not fit the rough demographic, are shown advertisements that are irrelevant to the viewers' interests.

Internet technologies also have attempted to tailor advertisements, displayed in World Wide Web sites, more closely to the preferences of Internet users, based on collecting explicitly-specified preference data, based on a user profile, or by inferring preferences through collecting metadata that is derived as the Internet user selects pages or performs online actions. However, these technologies are not fully accurate because they rely on algorithms that attempt to match known characteristics of ads with user preferences that can be only roughly inferred from the data that the users provide.

Video editors such as Adobe Premiere Pro and Final Cut Pro enable users to select multiple video clips, join the clips, and annotate the clips by defining cue points and associating text notes with the cue points.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1B illustrates a process of creating video programs, which are linked to metadata, which can control operation of a video player.

FIG. 1C illustrates a process of playing a video program that is linked to metadata.

FIG. 6 illustrates the metadata panel populated with data for the Start cue point of the example.

FIG. 14 illustrates a frame of a video program having a highlighted service icon.

FIG. 15A illustrates an annotation that provides a user choice.

FIG. 15B illustrates a frame of a video segment in a sequence for which Audrina is the featured character.

FIG. 19A illustrates playing a video program in which annotations are associated with multiple different responsive behavior types.

FIG. 35 illustrates an example screen display and chart that may be used to indicate data about interesting parts of a video.

DETAILED DESCRIPTION

Figure 1A:
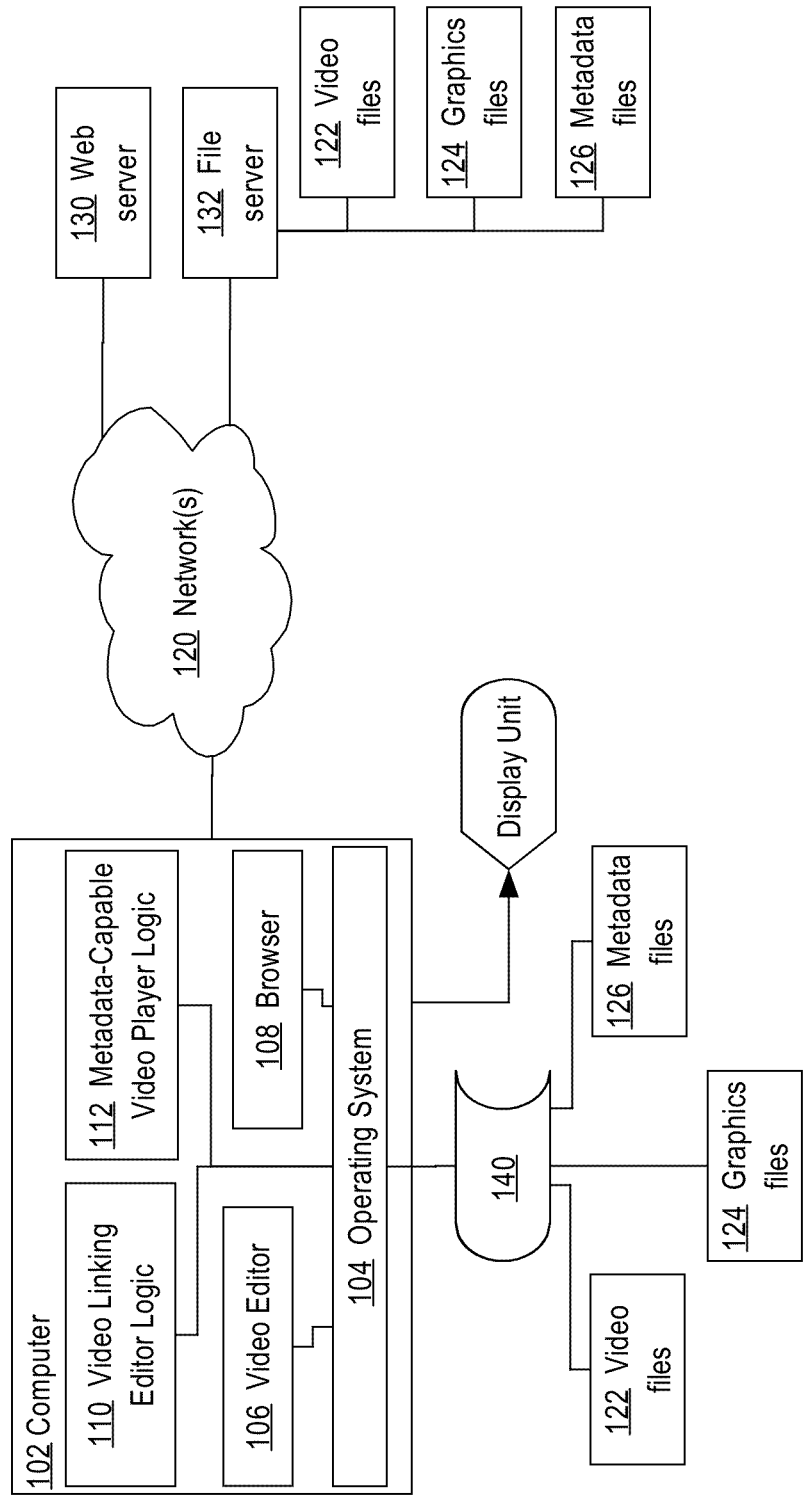
FIG. 1A illustrates an example arrangement of digital computer elements that can be used to implement certain embodiments.

APPENDICES. All appendices and other documents filed as part of the above-referenced provisional applications form a part of the disclosure herein. The appendices describe example embodiments and other embodiments may vary from the descriptions in the appendices.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described according to the following outline, although the following description does not reproduce, as section headings, each and every item in the outline.

1. Concept summary: Editor; Player; Metadata format
2. Overview of structural context
3. Overview of functional context: Directories; Jump to a destination; Get more information from a destination; Switching media based on a web service; Modal story branch; Overlay web content; Provide web points with associated URLs, graphics and text; Return from the end of a segment
4. Adding cue points and cue point names using a video editor: Overview of creating cue points; Definitions; endNote
5. Authoring video links using an editor
    5.1 Editor GUI overview
    5.2 Creating and modifying cue point metadata for particular cue point types
        5.2.1 goto Cue Point
        5.2.2 gotoAutoReturnButton Cue Point
        5.2.3 insertPt Cue Point
        5.2.4 modalStoryBranch Cue Point
        5.2.5 MXMLOverlay Cue Point
        5.2.6 progEnd Cue Point
        5.2.7 webFocus Cue Point
    5.3 Other language elements and attributes; Annotations; Switched Annotations
    5.4 Content types
    5.5 Automatic creation of cue points
    5.6 Directories
    5.7 Web Services
    5.8 Cue Point Language example
6. Playing video and linked media
    6.1 Trick play functions, timeline, always-available web link
    6.2 Keyboard controls
    6.3 Subscription video
7. Implementation details—Hardware overview
8. Advanced Techniques for Displaying Audiovisual Experiences
    8.1 Deep Linking
    8.2 Javascript Client-Side Metadata Creation
    8.3 Client Browser Database For Determining Flow Analytics
    8.4 Ad Layer Above Existing Video
    8.5 Fractional Downloading For Complex Experience Changes
    8.6 Focus On A Sub Stream Using Mouse Actions
    8.7 Separate Story Media And Actions For Annotations
    8.8 Live Injector
    8.9 Simultaneous Streams From Multiple Cdns In One Player
    8.10 Video Analytics
    8.11 Code Execution
    8.12 Using Tags To Automate Content Creation
    8.13 Cloud-Based Editor And Playback
    8.14 Point And Click Multimedia Authoring
    8.15 Ad Server In The Cloud; Cloud-Based Editor
    8.16 Temporal Templates 1. Concept Summary Various embodiments provide an editor, a player, and a metadata format. In an embodiment, the editor implements a method of creating, for a video file consisting of multiple segments, metadata describing one or more display operations, decision operations, branching operations, video linking operations and web media linking operations, and associating the metadata with the video file. In an embodiment, the player implements a method of interpreting the metadata during playback of the video file and performing the operations in coordination with playback. In an embodiment, the metadata format comprises computer-readable data storage media encoded with tags and values which when interpreted cause performing particular display, decision, branching, video linking and web media linking operations. Metadata may comprise cue point type names for various cue point types, and attribute values associated with the cue point types that control the particular behavior of the player in performing the operations.

2. Overview of Structural Context

FIG. 1A illustrates an example arrangement of digital computer elements that can be used to implement certain embodiments. In an embodiment, a computer 102 is coupled directly or indirectly through one or more networks 120 to a web server 130 and optionally to a file server 132. In various embodiments, network 120 may comprise a local area network (LAN), wide area network (WAN), an internetwork, or a combination. Web server 130 hosts one or more video files, HTML documents, HTTP servers or application servers, or other web content. File server 132 stores or hosts video files 122, graphics files 124, and metadata files 126.

Computer 102 hosts or executes an operating system 104 that supervises I/O, storage management, and execution of application logic. In an embodiment, computer 102 further comprises a video editor 106. Commercially available examples of video editor 106 include Adobe Premiere and Final Cut Pro. In an embodiment, computer 102 comprises a browser 108. Commercially available examples of browser 108 include Firefox, Safari, Chrome and Internet Explorer.

In an embodiment, computer 102 is coupled to storage 140, which broadly represents any data storage device, storage area network (SAN), network attached storage (NAS), or network file system (NFS) unit or server. Storage 140 may reside on network 120 or on a server coupled to the network. Storage 140 stores video files 122, graphics files 124, and metadata files 126.

In an embodiment, computer 102 further comprises video linking editor logic 110 and metadata-capable video player logic 112. In other embodiments, computer 102 only comprises player logic 112 and does not have an editor; such an embodiment might be used by an end user who is viewing video programs that have been prepared by someone else. Thus, the use of video linking editor logic 110 is not required.

The video linking editor logic 110 is generally configured to cause one or more processors in computer 102 to receive user input specifying links between segments of a video file and other media such as other segments in the same file, other segments of other video files, graphics files, online content such as web sites or web applications, and other rich media content; to create representations of the links in metadata; and to store the metadata and link-related information in the metadata files 126 in association with related video files. For example, a user of computer 102 may interact with video linking editor logic 110 to select one or more of the video files 122, from storage 140 or file server 132, create links using editing functions that the editor logic provides, integrate graphics files 124 and references to content on web server 130, and then store metadata files 126 either at storage 140 or in file server 132. The metadata files 126 identify the associated video files 122 and contain metadata defining links among segments, link types, and link-related information to support novel playback functions and other user experiences. Other more specific functions of video editor linking logic 110 are described in other sections herein.

The metadata-capable video player logic 112 is generally configured to open metadata files and associated video files, and to play the video files while interpreting and responding to links and related information and instructions in the associated metadata files. Other more specific functions of metadata-capable video player logic 112 are described in other sections herein. The metadata-capable video player logic 112 may be implemented within a web browser and comprising a browser support library and browser-executable code, such as JavaScript, that is received in and executed by the browser at the time that an end user selects a video for playing. The browser support library may be any video playing plug-in component for a browser. Examples include Macromedia Flash and Silverlight. Alternatively, web browsers may use the VIDEO tag of HTML version 5 to render video and HTML and JavaScript to implement the player logic 112. In some embodiments, the player logic 112 may be partially implemented on server 132 or another server using dynamic AJAX techniques. For example, the server may convert data defining annotations into HTML to be displayed in the player. Alternatively, the metadata-capable video player logic 112 is implemented as a standalone program application that may be installed locally in computer 102. For such native applications any software development kit (SDK) that is capable of displaying video could be used to implement the player. Examples include SDKs for Apple Mac OS X, Microsoft WINDOWS, and Linux.

Each of the computer 102, video linking editor logic 110 and metadata-capable video player logic 112 may be implemented in various embodiments using a computer, one or more application-specific integrated circuits (ASICs) or other digital electronic logic, one or more computer programs, modules, objects, methods, or other software elements. For example, in one embodiment computer 102 may comprise a special-purpose computer having particular logic configured to implement the elements and functions described herein. In another embodiment, service computer 102 may comprise a general purpose computer as in FIG. 12, loaded with one or more stored programs which transform the general purpose computer into a particular machine upon loading and execution.

3. Overview of Functional Context and Operation

In an embodiment, video linking is facilitated by creating, in metadata files associated with video files, executable instructions and/or descriptive information that are linked to cue points in the video files. A cue point generally comprises an association of a name to a position within a video file, wherein the position is typically expressed as a time value or timestamp. In an embodiment, cue points are created for a particular video file using video editor 106; the names and values of cue points become part of the video file through conventional operation of the video editor. Thereafter, user interaction with the video linking editor logic 110 can create links, operations and link-related metadata information for one or more of the cue points. At any later time, the metadata-capable video player logic 112 may be invoked to play the video and to concurrently detect cue points, identify the previously created metadata information relating to links and operations, and execute the operations.

FIG. 1B illustrates a process of creating video programs, which are linked to metadata, which can control operation of a video player. FIG. 1C illustrates a process of playing a video program that is linked to metadata. In an embodiment, the video linking editor logic 110 is configured to perform at least selected functions of FIG. 1B and the metadata-capable video player logic 112 is configured to perform the functions of FIG. 1C.

Referring first to FIG. 1B, in one embodiment, at step 150 a video editor creates and stores one or more cue points in a video file. Thus, FIG. 1B presumes that at least one video file has been created and stored on a computer, such as computer 102. Step 150 may comprise a user interacting with the video editor 106 to create and store named cue points in the video file as further described herein. Alternatively, step 150 can involve a process or logic in computer 102, or another computer, creating cue points in a video file using programmatic techniques or electronic communication of messages to the computer.

In step 152, the computer receives user input identifying a video file. Step 152 may involve invoking the video linking editor logic 110 and specifying the file name of one of the video files 122, or specifying the name of one of the metadata files 126, which will include an internal reference to an associated one or more of the video files.

At step 154, the video linking editor logic 110 reads the video file, finds or creates an associated metadata file, displays data for cue points in the video file, and displays any associated metadata relating to links to other segments or content. If one of the video files 122 is specified at step 152 and no existing metadata file is found, then the video linking editor logic 110 creates a related metadata file. If an existing related metadata file is found, then that file is read and metadata relating to cue points is displayed on a display unit that is coupled to computer 102. An example graphical user interface that may be generated to display the metadata is further described herein in connection with FIG. 2, but the approach of FIG. 1B does not require that particular GUI.

At step 156, the computer receives user input specifying, for a particular cue point, a cue point type. For example, interacting with the GUI of FIG. 2 or through other means, a user or external computer process or logic selects one of the previously created cue points of the video file and provides input specifying a cue point type value. At a cue point, any of several types of operations may be defined to be performed at the time of playback using the metadata-capable video player logic 112. In this document, a cue point within a video file and the operations performed at the cue point are sometimes collectively termed a cue point. Cue points as defined herein can refer to video, coupled video-web contexts or non-temporal web locations (or "web points," as further described).

In an embodiment, cue points enable a user at playback to jump forward and backward in time in a video, and jump between web content and video content. Since the user and the environment can change the order in which media is played, the metadata-capable video player logic 112 maintains data indicating the user's prior location so that the player can transfer control to a prior location.

In an embodiment, web points define an end for web content that specify where to transfer the user when the user has reached the end of a navigation path. Both video and web content can be displayed on the screen at the same time, overlaid over web content or using a picture-in-picture representation, and time can be running or paused. When web content is displayed, selecting a back operation transfers control to a previously viewed page but when the earliest page is reached then a subsequent back operation transfers control away from web content and to the previously viewed video segment. When video is displayed, performing a back operation returns to the beginning of the current video segment.

Figure 24:
FIG. 24 is a screen display diagram of an example Editor window in which a Web tab is selected.

FIG. 24 is a screen display diagram of an example Editor window in which a Web tab is selected. The Web tab 2402 of the example Editor screen display 2102 may be used, in an embodiment, to create and store web points in association with a video program. In an embodiment, Web tab 2402 displays a list of all web points that have been defined for the video program that is previewed in video window 2403. Selecting an Add web point control 2405 causes the editor logic 110 to display a data entry panel 2404 that may receive user input of parameter values defining attributes of a web point. In an embodiment, attributes include an interest URL 2406, query string 2408, target cue point, web view layout definition, description, and thumbnail graphic image.

In an embodiment, interest URL 2406 refers to an online electronic document that is loaded and displayed at playback time if the user requests additional information about the data shown at the web point. In an embodiment, query string 2408 comprises a database query that is submitted to an online engine if the web point is selected, to generate a search result so that the user receives current search result information associated with the web point. The target field defines a target cue point to which the user is directed at playback time after having viewed a web document associated with the web point. The web view layout definition field identifies a layout format for the player to be used when displaying web information; in an embodiment, the layout format is one of the formats shown in FIG. 25, which is described further herein. The description field is a text description of the web point to display, and the thumbnail graphic image is a graphic image to display in the player to denote the web point.

In an embodiment, any of the following operations may be defined in the metadata for association with a cue point:

Directory or Annotation—a directory or annotation specifies one or more graphics files, web services, and associated links; at playback, the graphics files are selectable as hyperlinks to cause playback of other video segments and the web services may be invoked automatically to fire database queries, retrieve data, dispatch emails or text messages, or perform other communication functions as defined in the web services.

Jump to a destination—metadata can specify that when a particular cue point is reached during playback, the player should jump to another cue point within the same video file. The destination cue point may be earlier in time or later in time than the cue point from which a jump is made.

Get more information from a destination—metadata can specify that when a particular cue point is reached during playback, the computer 102 should connect to a web site at web server 130 and display a web page or invoke a web application. Typically the web site content is associated with or related to the video content at the cue point, but such an association is not required.

Change media under external process control—metadata can specify that when a particular cue point is reached during playback, the computer 102 should switch to one of several pieces of media, as determined by a web service, and continue as specified in the media to which the switch was made.

Modal story branch—metadata can specify that when a particular cue point is reached during playback, the computer 102 should switch to one of several pieces of media, determined by user selection of an image associated with the media.

Overlay web content—metadata can specify that when a particular cue point is reached during playback, the computer 102 should display a graphical and interactive overlay. This overlay is logically and computationally associated with a web service. The web service maintains databases (both session and persistent) that can be used to influence the course of playback, for example with an insertPt cue point. In an embodiment, the metadata-capable video player logic 112 invokes asynchronous web services to control user interaction with the overlaid web components.

The video linking editor logic 110 can define and store one or more web points comprising names with associated URLs, graphics and text. These web points can substitute for video cue points. For example, all targets for a user choice cue point can be either video cue points or web points. In this context web points also define an "end" action to be followed in circumstances paralleling reaching the end of a video segment.

In an embodiment, video linking editor logic 110 can define and store, in the metadata file, one or more cue points that include data defining required associated web pages. Such cue points are termed synchronized attributes or cue point attributes and refer to a specified point in a video that automatically creates a primary and secondary window. For example, in an embodiment, any cue point can have an associated web page that is to be displayed while the cue point is active. In this embodiment, when the video segment defined by the cue point is being played and the cue point is reached, the associated web page is automatically loaded and displayed in a browser window that appears conceptually under the video player window. In this context, "under" refers to Z-axis ordering of video and web content; in an embodiment, the video content is "over" the web content in the sense that the video content may obscure certain web content. The size and positioning of the video and web content can also be specified in association with the cue point using the video linking editor logic. With this approach, an author can define a video that provides a synchronized display of an audiovisual work and Internet content such as web pages. The web pages might comprise an advertisement or other online information that is relevant to a particular event on the TV program. For example, an author can set a cue point for a time in the video at which a character appears wearing particular distinctive clothing, and can associate a web page for a merchant of that clothing with the cue point. Consequently, when the video plays and the character appears in the video, the merchant's web page for the associated clothing is automatically accessed and displayed in a browser window behind the player. As an another example, a cue point can associate a time in the video at which an actor appears with a particular web page of the Internet Movie Database (IMDB) service, www.imdb.com, that contains background, filmography and other details for the actor. This approach may be economically attractive both to the broadcaster of the video and the associated web site; for example, the associated web site benefits from an additional page view while the broadcaster concurrently continues to have a viewer viewing the video. More broadly, this approach enables events occurring in temporal media such as video to cause automatic changes in state-based media such as web pages. In an embodiment, creating a synchronized attribute is performed by selecting the Cue tab 2106 in the editor screen display 2102 (FIG. 21), selecting a cue point to which a synchronized attribute should be associated, selecting an Other tab in a Parameters pane, selecting Browse and selecting an appropriate web point.

Return from the end of segment—metadata can specify that when a particular cue point is reached during playback, the computer 102 should return to a previous segment from which a branch was taken. In an embodiment, web-based cue points define an end, even though web content is a non-temporal media, to specify where to go when the user has reached the end. Both video content and web content can played or viewed on screen at the same time, overlaid or picture-in-picture, and time can be running or paused. In an embodiment, selecting a Back button while viewing web content causes backtracking among hyperlinks in the manner of a web browser, but when no other prior links exist then a selection of a Back operation transfers control to the video segment from which the web content was reached. In content, moving backward in video transfers control to the beginning of the video.

In an embodiment, metadata-capable video player logic 112 interprets metadata such that when the user is watching video, a web link to some form of related content is always available. If the user selects the web link and views the web content, the player displays the video in a reduced size picture-in-picture form. Further description of the foregoing cue point types is provided in other sections of this disclosure.

Referring again to FIG. 1B, at step 158, the video linking editor logic 110 updates the computer display based on the cue point type to provide input fields and display fields for metadata values that are associated with the specified cue point type. Thus, a context-sensitive display of input fields and display fields is provided depending on the cue point type. Step 158 may also include receiving user input that indicates particular metadata values for the input fields. For example, if the cue point type provided at step 156 is "modal story branch," then at step 158 an input is received to specify two or more target cue points that represent branch destinations.

At step 160, the video linking editor logic 110 creates and stores the cue point type and the associated metadata values in the metadata file that is associated with the video file. As shown in optional step 161, the type and values may be stored in one or more XML script(s) within one of the metadata files 126. However, XML is not required in all embodiments and the metadata files 126 may represent cue point names, types and metadata values in other forms that can be read by the metadata-capable video player logic 112 and used to control linking, branching, decisions, web interaction, and other content operations when cue points are reached.

Step 162 represents testing whether a user has requested to exit or discontinue using the video linking editor logic 110. If no exit request is received then control is transferred to step 156 or step 158 for the computer to await further user input relating to cue points. Alternatively the computer may perform an exit operation at step 164, for example, by closing the video file and metadata file.

As indicated in step 166, during all operations previously described for FIG. 1B the method is configured to asynchronously process user input requesting video playback, trick play functions, or loading other video files or metadata files. Thus, in an embodiment, a playback mechanism may be integrated into the process so that a user can play and view a video program or segment while determining what cue point types and values to specify. The playback mechanism supports non-linear playback of video so that the player can execute branch operations, play one of a plurality of different alternative video segments at a branch point or decision point, return to a prior point and continue playing the next segment thereafter, and other complex operations consistent with the rich media authoring capabilities described herein. At any time during the process of FIG. 1B, the user may request playing a video segment or performing trick play functions such as fast forward or rewind. In an embodiment, selecting a different named cue point at step 156 causes the player mechanism to display a first frame of the video segment that starts at the selected cue point or to begin playing the video from that point.

As a result of the process of FIG. 1B, a video file having internally stored named cue points becomes associated with a separate metadata file that specifies cue point types and metadata values relating to control functions for the video file, related networked content, and other user interactions. The metadata-capable video player logic 112 is configured to play the video and, as each cue point is reached, perform the control functions based on the cue point types and metadata values that are specified in the metadata file.

FIG. 1C broadly represents a process involving opening a stored video file having one or more video segments and one or more cue points in the video file, and opening a metadata file that contains an internal reference to the video file; playing a first video segment of the video file; in response to reaching, during the playing, one of the cue points that are defined in the video file: receiving from the metadata file one or more metadata values identifying a cue point type, and one or more values of attributes that are associated with a particular cue point type, the cue point type and attribute values defining features of an action to perform at the cue point during playing of the video file; performing the action using the attribute values to determine and perform particular features, displays, or controls associated with the action.

In one embodiment of a playback process, at step 170 the computer initiates executing the metadata-capable video player logic 112. Initiating execution may occur in response to user input, or in response to an instruction from other hardware logic or computer processes. For example, a user, logic, or process may select and invoke one of the metadata files 126 or video files 122, and in computer 102 the files may be associated with the metadata-capable video player logic 112 as an application that is launched when the files are invoked.

Optionally, in step 172, the metadata-capable video player logic 112 locates any existing metadata files and displays a list of the metadata files. Each metadata file may be represented visually in the list using a still image or other graphics file that is referenced within the metadata file. Thus, the metadata-capable video player logic 112 may generate a display of thumbnail images, each image representing an associated metadata file. At step 174, the metadata-capable video player logic 112 receives user input selecting a metadata file from the list. For example, the graphic images may comprise selectable links and the user may select one of the images using a pointing device. Steps 172 and 174 are described as optional because a selection of a metadata file may be unnecessary if the metadata-capable video player logic 112 is invoked by a user or process launching one of the metadata files 126 rather than launching or invoking the metadata-capable video player logic independently.

In step 176, the selected metadata file is opened. Each of the metadata files 126 is configured to internally name or reference at least one of the video files 122. Therefore, the metadata-capable video player logic 112 reads the selected metadata file, identifies the referenced video file, and opens the referenced video file at step 178.

At step 180, the metadata-capable video player logic 112 enters a loop that begins when the video player logic plays the video file that was found and opened at step 178. At step 182, a test is performed to determine whether a cue point has been reached. Step 182 represents the occurrence of an interrupt or other event indicating that a cue point was reached. As an alternative to interrupts, step 182 may be implemented by examining stored metadata values relating to a segment and setting timers that cause generic, non-video events to occur when the video events would have occurred. The timers are adjusted as the user moves among video segments and plays video segments, as the amount of time to a given video event changes as a result of such movement. However, this approach enables content to play correctly even if the cue points have been removed from the video in the course of transmission or transcoding. For example, preparing video for the YouTube online player results in the YouTube system discarding the cue points and the present approaches enable video productions to play properly on YouTube.

The NO control path of step 182 represents continuing playback and waiting until the next cue point is reached.

At step 184, when a cue point has been reached, the metadata-capable video player logic 112 determines the name of the cue point that has been reached. At step 186, based on the cue point name, the metadata-capable video player logic 112 reads and executes one or more metadata scripts and/or values associated with the current cue point, based on functions and behavior configured in the video player logic. Thus, in one embodiment, the metadata-capable video player logic 112 comprises logic or program instructions that define what functions are performed for all cue point types, and the metadata files 126 specify cue point types and attribute values that control how the functions are performed, such as specific video displays, graphical displays, user interactions, branches, links or other control functions.

After step 186 control returns to step 180 to continue playing the current video segment. As a consequence of the processing in step 186, the current video segment after step 186 may be a different video segment than earlier, depending on the cue point type and its associated metadata values. As with FIG. 1B, during any part of the loop from step 180 to step 186, the process of FIG. 1C and the metadata-capable video player logic 112 may be configured to asynchronously process user input requesting trick play functions or loading other video files or metadata files.

As a result, the approach of FIG. 1C enables playing a video with a rich set of controls and user interactions including branching to different video segments automatically, presenting a user with a branch selection menu and branching to particular video segments in response to user selection, determining a branch or different video segment using a web service, presenting web content that is related or associated with a video segment, and other controls and user interactions. The video file does not require internal modification and can be used with other players that do not provide the controls and user interactions. The controls and user interactions can be authored using an editing process as shown for FIG. 1B, enabling video producers to rapidly create rich video productions without detailed knowledge of programming.

4. Adding Cue Points 4.1 Adding Cue Points Using a Video Editor

In one embodiment, video linking editor logic 110 uses one or more cue points that have been previously defined for video files on which the video linking editor logic operates; in other embodiments as further described herein, cue points may be defined independently of the video, using the video linking editor logic, and are stored in metadata separate from the video files. In an embodiment, users create cue points and cue point names using the video editor 106. For purposes of this document, a "video" is a single piece of video content (a file or a URL) typically with many cue points; within a video each "segment" begins and ends with a cue point without any cue points in between. A "compound segment" or "inLine" segment has cue points within it, i.e., cue points in addition to the beginning and ending cue points. An external video, specified by a URL, may also contain cue points, and depending upon their organization, these cue points may be segments or compound segments. The player can refer to internal and external cuePoints transparently.

In an embodiment, video editor 106 is used to organize one or more video files into pieces each having a cue point at the start, at the end, and at any point to or from which the current time ("head") can jump. Cue points have an attribute canBeDestination. If this is set to false, the cue point cannot be a destination of any action which causes the playhead to jump. Cue points with canBeDestination set to false are typically used as markers for overlaying annotations but where the author does not want that point in the video to be a destination for a chapter jump.

There are also cue points with cue type="null". These are used to place markers in the video at precise points that the author may at some future time want to use. Null cue points require less processing. For example, when a logger (the first and least expensive person in the workflow on professional video shoots) logs the shots of the raw footage they can put Null cue points at every shot without adding undue computational overhead. After rendering, a step that takes many hours of computation, these cue points are all available and can selectively be changed into meaningful cue points like "regular" or "insertPt" without re-rendering.

A user creates one or more cue points as desired using a cue point tool within the video editor 106. For example, in Premiere, a cue point is created by moving an icon representing a playback head to a particular point in the video file and selecting "Cue Point."

In an embodiment, a last video segment in a video file is supplemented with a terminal video segment denoted "endNote." For example, an endNote may comprise short piece of junk video positioned about two seconds after the last usable video segment. The endNote is created with zero cue points to prevent confusion with an automatic, invisible cue point that the video editor 106 automatically inserts at the end of the last piece of media. In an embodiment, the endNote is positioned about two seconds after the last usable video segment to prevent reaching the actual end of the video file under certain conditions; user experience has determined that when the metadata-capable video player logic 112 issues a command to pause or stop, the virtual head keeps moving for a short time interval.

4.2 Soft Cue Points

In an embodiment, video linking editor logic 110 is configured to enable a user to define one or more cue points independent of the video for storage in metadata files 126. A cue point that is defined and stored in metadata, rather than stored within a video segment and previously created in the video segment using a separate video editor 106, may be termed a "soft" cue point. Soft cue points allow the user to insert, delete, and change the time of cue points directly into a video that has already been imported into storage associated with the editor logic 110.

In an embodiment, a soft cue point is created using editor logic 110 by selecting the Cue tab 2106 (FIG. 21) and selecting an add cue point control 2108. Selecting the add control 2108 causes editor logic 110 to create and store metadata for a new cue point at the default time of 00:00:00:00. Selecting the Description tab enables a user to insert a particular time for the cue point. The time can be determined by scrolling through the video using the trick play controls 2110.

In an embodiment, a cue point is a named marker for a particular point in a video segment. A cue points may comprise a name, a time value indicating the particular point, and other metadata that defines what actions occur when that point is reached during playing the video. During playing the video, video player logic 112 continuously compares the time value of a current position of a logical playback head within a video segment, and determines if the current time value is equal to any soft cue point that has been previously defined and stored in the metadata file 126 that is associated with the video segment. When a cue point is reached, the video player logic 112 performs one or more particular operations that are defined in the metadata of the cue point.

In this manner, an author can build a complete interactive video experience from existing video files without needing to use complex tools like Adobe Premiere or Final Cut to create cue points. For example, an author can select and use video files that are maintained on a third party video server or hosting site, such as YouTube, and streamed from that server or site to an end user using the video player logic 112 at the time of playback. The video files do not need to have cue points previously defined for and stored in them. Instead, the user uses video linking editor logic 110 to create cue points and store the created cue points in the metadata files 126. The metadata files 126 can be launched and can invoke the video player logic 112 to cause the video player logic to invoke streaming the video segments from the third party video server or hosting site while concurrently performing one or more operations as cue points are reached in playing the video segments.

4.3 External Cue Points

In an embodiment, video linking editor logic 110 is configured to enable a particular metadata file 126 to reference cue points that are defined in other metadata files 126. In an embodiment, a cue point may comprise a contained element termed a target, which specifies a cue point by name and optionally links it with an association attribute. An attribute of a target may be a cue point reference, which may reference cue points that are in other metadata files. In an embodiment, a cue point reference is formed as a URL comprising a file location (path), file name, and a URL fragment that identifies a particular cue point. For example, the cue point reference "http://www.coincident.tv/cplfiles/foo.cpl#DadArrivesHome" identifies a cue point named "DadArrivesHome" within a metadata file named "foo.cpl" that is stored in the folder or director "cplfiles" of the "coincident.tv" domain. In this embodiment, in any metadata file definition in which a cue point can be a target, for example, as the target of an annotation, insert point, goto cue point, or directory or user choice entry, that target can be in another file referenced by relative URL.

External cue points beneficially enable authors to work with cue points that otherwise might require multiple other steps to re-define for a particular audiovisual work. For example, a 2-hour video program might contain dozens of cue points, but a particular author might wish to reference only a few of the cue points. The author need not re-define the same cue points in a new metadata file for a new audiovisual project, but can reference previously defined cue points within other, previously created metadata files. Therefore, the author can create a cross-linked metadata control structure that can simplify video program development based on other files or segments.

5. Authoring Video Links 5.1 Editor GUI Overview

The structure and operation of an embodiment of video linking editor logic 110 is now described. In an embodiment, video linking editor logic 110 generates and causes displaying a graphical user interface (GUI) on a computer display unit, and the GUI provides cue point editing functions that can be used to link video segments and other content in a plurality of ways. The editor logic 110 is also configured to create and store, based on user input interacting with the editing functions and providing selections and values, metadata describing the links. In an embodiment, the metadata comprises one or more scripts expressed in a Cue Point Language (CPL). In an embodiment, CPL comprises an XML-based language that describes non-linear structures in a mixture of video and web media. CPL can be embedded into digital video content that is available from a plurality of sources such as broadcast, DVR, DVD, broadband, game consoles. CPL can be associated with web content also. The resulting metadata may be played back with a CPL-capable player to create a playback experience that integrates video and interactive web-based graphic elements in such a manner that the sequence of playback is influenced by user interaction, run-time execution of code embedded in the video, run-time interaction with code referenced by data embedded in the video, and calls to remote web services in combination with jump tables authored in the editor and embedded (or embedded by reference) in the video.

The CPL may be viewed as an architecture rather than a user interface. For example, while CPL implements a mechanism for a modal n-way branch, the author can use that mechanism to provide a video production that is graceful and easy to use, or confusing and user-hostile. CPL is compatible with a variety of playback platforms, asset locations and video formats. For example, in emerging systems video content can be viewed using screens that are attached to processors, disks or network connections. Platforms may consist of computers, game consoles, set-top boxes, or mobile devices. CPL is format independent with the assumption that all digital video formats define cue points and have ways to associate events and text with the cue point. CPL is location independent and can interoperate with video that originates from any desired source.

Figure 2:
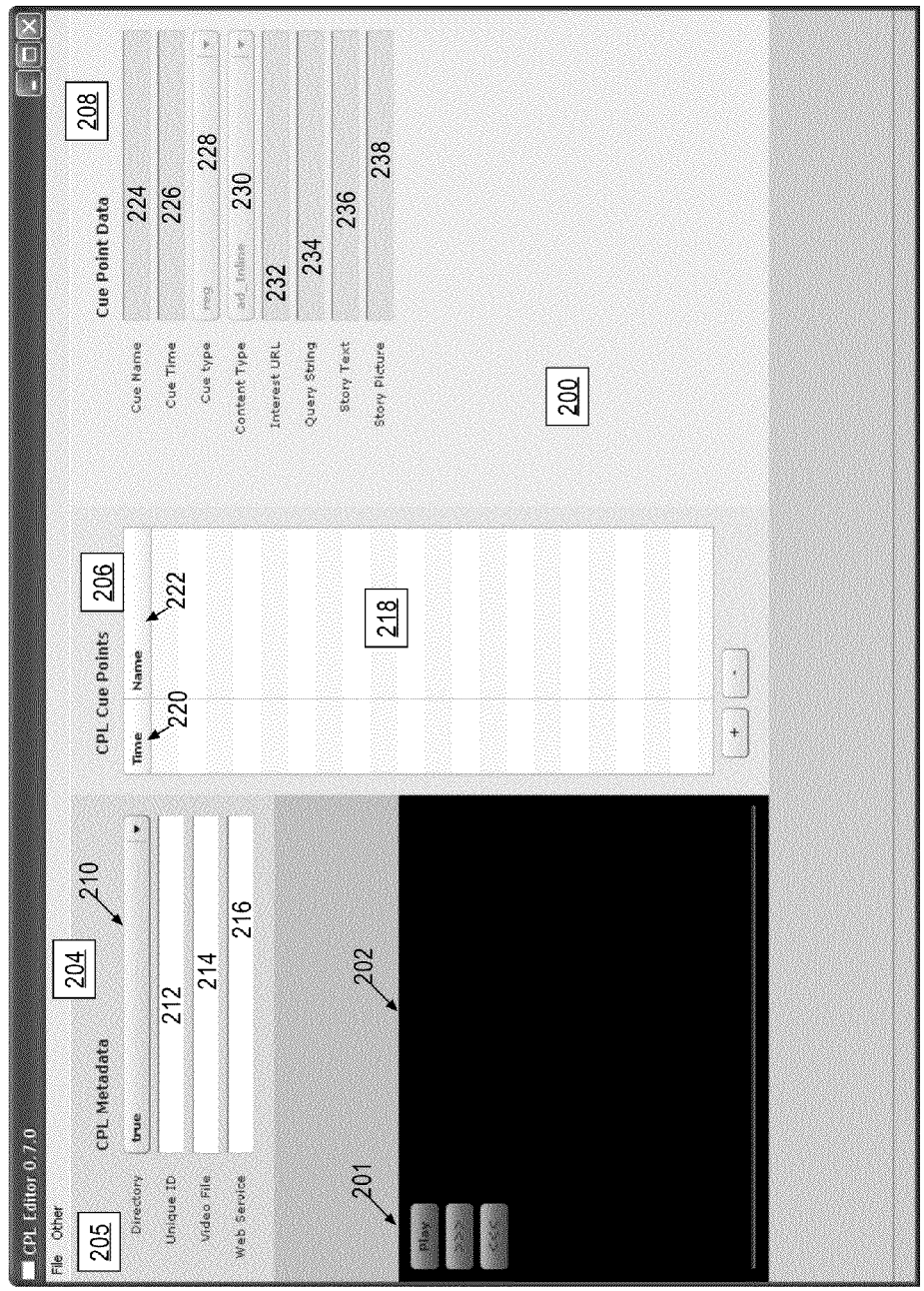
FIG. 2 illustrates an example screen display that the video linking editor logic generates and causes displaying.

FIG. 2 illustrates an example screen display that the video linking editor logic generates and causes displaying. In an embodiment, screen display 200 generally comprises a video window 202, metadata panel 204, cue point list 206, a web point list, an annotation list and cue point data panel 208.

Video window 202 is configured to play and show one or more video segments representing a linked video project and comprises buttons 201 that are configured to receive user input selecting a playback function and trick play functions such as jumping to different segments that are forward or backward in time. In this context, a "video project" refers to an association of a video file and a metadata file.

Metadata panel 204 receives and displays metadata values that pertain to a project as a whole. In an embodiment, metadata panel 204 comprises unique id field 212, video file field 214, and web service field 216. The unique id field 212 is configured to receive a name, number, or other character sequence that uniquely identifies the current video project, and the unique id value is used in naming the metadata file that the editor creates and associates with a video file and to coordinate dynamic updates with a server. The video file field 214 displays a name of a video file that has been loaded using the File menu 205 and previously created with cue points in a video editor. The name may comprise a pathname in a file-system accessible to the computer that is hosting the video linking editor logic 110, a URL identifying video in a web server, or another form of location identifier specifying a location of video. In an embodiment, selecting the File menu item 205 initiates a File Open dialog and after a file selection is made the logic 110 displays a value in the video file field 214 and opens and displays the named video file in video window 202. Alternatively, a user may direct logic 110 to load a previously created metadata file, and in response, the video linking editor logic locates a video file that is referenced within the metadata file and displays the name of that referenced video file in video file field 214.

The web service field 216 is configured to receive user input identifying a web service in the form of a URL. The specified web service may be hosted on computer 102 or on a remotely located computer. The web service may comprise a web application or a script file. The web service provides a control mechanism for interacting with insert points, overlays, and other types of cue points that are further described in other sections herein.

Cue point list 206 is configured to display a list of cue points that have been previously defined in the video that is shown in video window 202. In an embodiment, in response to user input opening a video file, video linking logic 110 loads and displays the named video in video window 202 and concurrently reads and displays the cue point data that was embedded in the video file as a result of creating cue points using the video editor. Cue points found in the video file are listed in one or more rows 218 of list 206 and each row includes time of the associated cue point in a time column 220 and a name in name column 222.

In an embodiment, existing web points in the video are displayed in a separate list, and cue point annotations are displayed. The form and use of annotations are described more fully in the section herein entitled ANNOTATIONS and in the Appendix and other documents of record in the provisional disclosure.

Further, in an embodiment the first cue point in list 206 is automatically selected and highlighted in the list. Video linking logic 110 is further configured to search for an existing cue point metadata file that may have been created in an earlier user session with video linking logic 110. If an existing cue point metadata file is found, then cue point data is loaded and the video linking logic displays, in cue point data panel 208, cue point data for the first cue point in list 206 that was automatically selected and highlighted.

Cue point data 208 is configured to receive user input specifying one or more metadata values relating to a particular link or transfer of control associated with one of the cue points in cue point list 206 that is currently selected or highlighted in the cue point list. In an embodiment, a user may operate a pointing device such as a mouse or trackball to select other cue points in list 206 and in response to selection of a different cue point the video linking logic 110 automatically updates cue point data panel 208 to display cue point metadata for the newly selected cue point.

Cue point data panel 208 comprises a cue name field 224 and cue time field 226 that reproduce the data shown in cue point list 206 for a selected cue point. Cue point data panel 208 comprises a cue type combo box 228. Particular types of cue points are described further in other sections below. Cue point data panel 208 is context-sensitive so that the particular fields displayed as part of the panel will vary according to the value of the cue type combo box 228 and a content type combo box 230. For example, when the cue type is Regular and the content type is ad_Inline (referring to an advertisement within a video segment) then the cue point data 208 comprises an interest URL field 232, query string field 234, story text field 236 and story picture field 238 as shown in the example of FIG. 2.

Alternatively, the fixed content types represented in FIG. 2 may be omitted and an author may tag cue points with arbitrary content types as further described in the Appendix.

The interest URL field 232 is configured to receive user input specifying a website or other URL to which a viewer may be directed at playback time in response to receiving input indicating interest in other information relating to the video. The query string field 234 is configured to receive user input specifying a search engine query string which, at playback time, the metadata-capable video player logic 112 may submit to an Internet search engine for the purpose of generating search results in which a viewer may have interest, or that relate to the video. The story text field 236 is configured to receive user input specifying a story to display to a viewer using the player logic 112 at the time the video is played. The story picture field 238 is configured to receive user input specifying a graphics file or still image, and a text string, to display to the viewer using the player logic 112 at the time the video is played.

Figure 3:
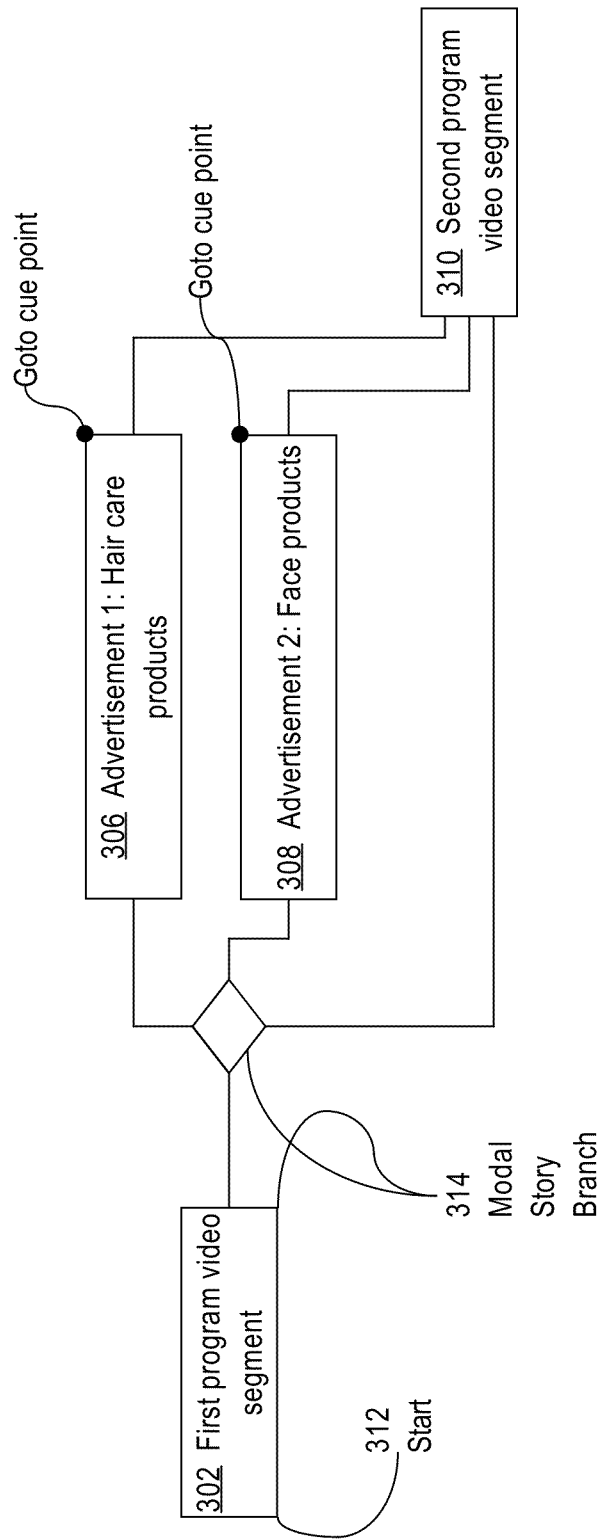
FIG. 3 graphically illustrates an example video linking arrangement.

An example of using the video linking editor logic 110 and interacting with the screen display 200 is now provided. FIG. 3 graphically illustrates an example video linking arrangement that can be configured using the mechanisms now described. For purposes of illustrating a clear example, FIG. 3 describes relatively few video segments and cue points; in a practical embodiment the techniques herein can be used to create video projects having any number of video segments and cue points.

The example of FIG. 3 represents a non-linear video program in which the viewer arrives at a choice point and selects one of three possible videos; at the end of the selected video, the video project continues with the program. The video project comprises a first program video segment 302 having a start cue point 312 and ending in a modal story branch cue point 314, which is configured in video linking editor logic 110 to permit an N-way branch to other video or content but in the example of FIG. 3 is configured as a three-way branch. A first branch leads to a first video advertisement 306 relating to hair care products. A second branch leads to a second advertisement 308 relating to face products. A third branch leads to a second program video segment 310.

Figure 4:
FIG. 4 illustrates a screen display in the Adobe Premiere video editor in which a video file has been created with the segments and advertisements and appropriate cue points.

To create a video project in which the foregoing logical structure is achieved at playback, a user activates video editor 106 and authors a video project that includes segments 302, 310 and advertisements 306, 308 in the same video file. The user creates and stores a Flash navigation-type cue point with a name at a plurality of locations in the video file. FIG. 4 illustrates a screen display in the Adobe Premiere video editor in which a video file has been created with the segments and advertisements and appropriate cue points. After creating the cue points, the user saves the video project in Premiere and encodes the video.

Figure 5:
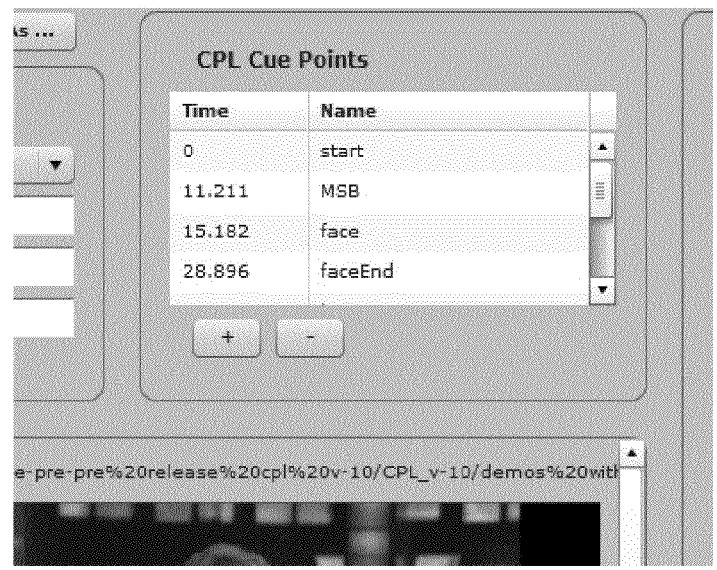
FIG. 5 illustrates a portion of a screen display showing a cue point list for the video of FIG. 3, FIG. 4.

The user then activates video linking editor logic 110, and in response, the user interface of FIG. 2 is displayed. The user selects a Load File function in screen display 200 and selects the video project that was created. In response, the video linking editor logic 110 loads the specified video file and displays data for cue points that are found in the file. FIG. 5 illustrates a portion of screen display 200 showing cue point list 206 for the video of FIG. 3, FIG. 4. Assume the user selects the Start cue point. In response, video linking editor logic displays metadata associated with that cue point in the metadata panel 208. FIG. 6 illustrates the metadata panel populated with data for the Start cue point of the example. The user may edit the values in the metadata panel by selecting fields and entering new values, or selecting pull-down menus.

Figure 7:
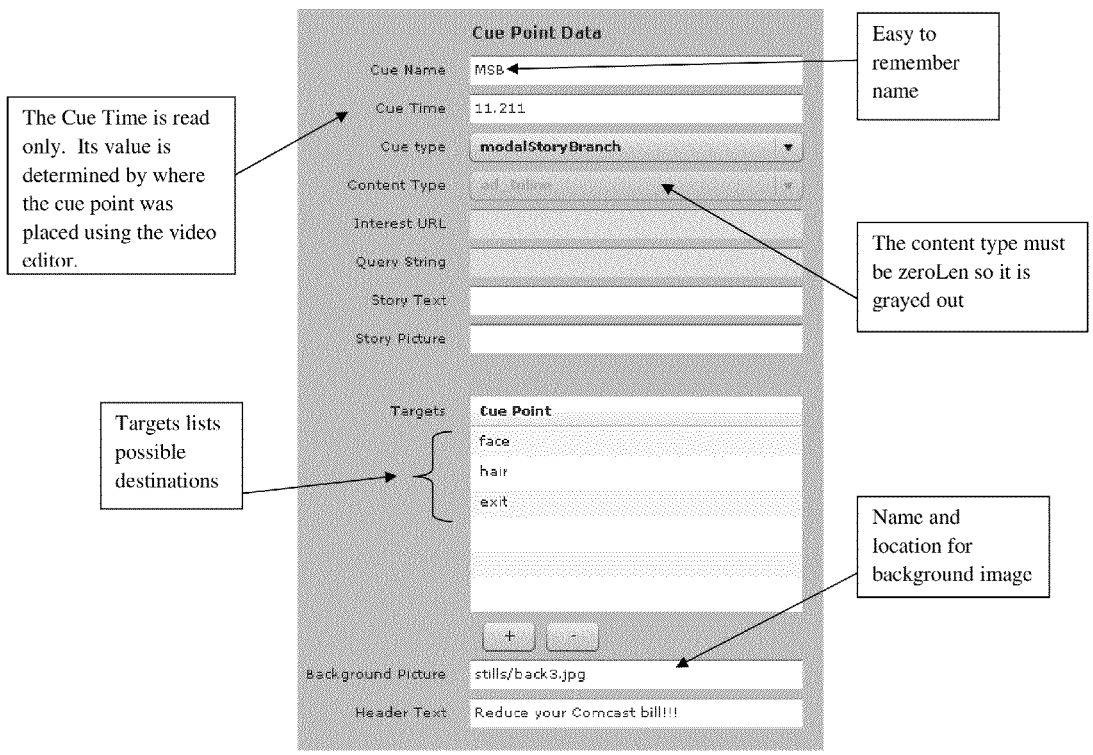
FIG. 7 illustrates the cue point data configured with values from user input that create such a cue point.

Assume that the user wishes to create the modal story branch cue point 314. FIG. 7 illustrates the cue point data 308 configured with values from user input that create such a cue point. A name may be entered in the Cue Name field. The Cue Time field is not modified and shows the value obtained from the video file. The cue type is selected as "modalStoryBranch." A branch cue type is associated with no content, so the Content Type field is grayed out. A Targets list identifies possible destinations or targets to which control is transferred at the branch point. A Background Picture field and Text field receive an identification of a picture to display to the user in a background area while the user is determining which selection to make, and a text string that can serve as a prompt.

Figure 8:
FIG. 8 illustrates a display generated at playback time based on the metadata that has been created in the present example.
Figure 9:
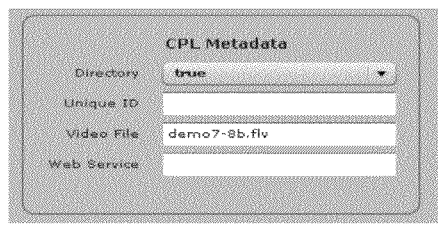
FIG. 9 illustrates appropriate values of program-wide metadata for the present example.

FIG. 8 illustrates a display generated at playback time based on the metadata that has been created in the present example. The user may create program wide metadata by entering values in the CPL metadata panel 204. FIG. 9 illustrates appropriate values of program-wide metadata for the present example. The user may then save the metadata using a Save function in the File menu 205 of the screen display 200. In an embodiment, selecting the Save function causes the video linking editor logic 110 to create and store an XML file containing the metadata and to store the XML file in a same directory or other storage location as the video file that is referenced in the metadata. In an embodiment, multiple cue point metadata files may reference and may be associated with a single video file.

At any point after creating and storing the metadata file, the user may invoke the video linking editor logic 110, reload the metadata file, modify the cue points, save an updated metadata file with modified cue point data, and replay the video based on the updated metadata file. Such updates may be performed without re-encoding the video, because the video file is maintained entirely separate from the metadata file.

5.2 Creating and Modifying Cue Point Metadata for Particular Cue Types 5.2.1 Goto Cue Point In an embodiment, a "goto" cue point may be defined and at playback, the goto cue point causes a jump to another video segment when the play head reaches the cue point. The destination location for the jump is defined in a cue point group ("cpGroup") and discussed below. In an embodiment, a goto cue point has the following associated metadata:

| | |
|---|---|
| cueType | Goto |
| contentType | "zeroLen" |
| interestURL | Not applicable (NA) as with a zeroLen content type there is no video immediately following the cue point. |
| nameCue | Any string value |
| Query | Not applicable as with a zeroLen content type there is no video immediately following the cue point so having a query to associate with the video is meaningless. |

In an embodiment, a goto cue point has the following elements of interest:

| | |
|---|---|
| cpGroup | a "goto" must have a cpGroup to hold the destination of the goto; cpGroups can hold multiple targets; a goto uses the first target in the cpGroup |
| gotoAutoReturnButton | NA - this contentType = zeroLen meaning that no contiguous video follows, so putting a gotoAutoReturnButton on it doesn't make sense. Besides, it requires a cueType of "goto". |
| mxmlInCPL | NA (The use of MXML for other cue point types is further described below.) |
| progLevelMetadata | If your very first cue point is a goto (at play head time 00:00:00), you'd include the progLevelMetadata here (but it seems like an odd structure to start). See the progLevelMetadata element description for more detail. |
| Story | NA |

An example script code excerpt including a goto cue point, which may be included in a metadata file, is:
```
<cuePt      cueType="goto"      interestURL="     "
nameCue="goSomeWhere"
contentType="zeroLen">
    <cpGroup>
    <targetSeg
      cuePointName="targetThisIsWhereYouGo"></target-
      Seg>
    </cpGroup>
</cuePt>
```

5.2.2 gotoAutoReturnButton Cue Point

In an embodiment, a gotoAutoReturnButton cue point supports a mechanism for the user to obtain more information relating to a particular video. From the gotoAutoReturnButton until the next cue point, the player causes the video to be overlaid with a graphical button; user input selecting the button causes the player to perform a goto branch operation to reach another cue point with an automatic return. In an automatic return, at the end of the "more information" video segment, the player causes the playhead to jump back, reaching the beginning of a video segment that just fallows the end of the calling video segment. For example, a first video segment might comprise a 30-second automobile commercial; 10 seconds into it, the user selects the "more info" button, jumps to a 5-minute extended commercial about the car; and at the end of the extended commercial the player jumps back to the programming that followed the original 30 second commercial.

In an embodiment, the "gotoAutoReturnButton" cue point comprises the following attributes:

| | |
|---|---|
| cueType | gotoAutoReturnButton |
| contentType | cannot be zeroLen as the button wouldn't appear |
| interestURL | target of the W button (independent of the overlay button) |
| nameCue | Required |
| Query | target of the W button (independent of the overlay button) |

In an embodiment, the following elements are provided:

| | |
|---|---|
| cpGroup | Could be included in order to have a cue point specific directory |
| gotoAutoReturnButton | An overlay button element used to specify the button text and the target, itself a cue point |
| mxmlInCPL | NA |
| progLevelMetadata | If this is the first cue point, it must be a cuePtInitial element and must contain a progLevelMetadata element. |
| Story | A story element is required to cause this cue point (and thus the content that follows it) to be shown in directories (e.g., in an on-screen chapter menu). A story element has descriptive balloon text and a still picture to associate it with a cue point. |

In an embodiment, an example script code segment comprises:
```
<cuePt
cueType="gotoAutoReturnButton"    interestURL="http://
www.saabusa.com"
    nameCue="A" contentType="ad_Inline">
    <gotoAutoReturnButton xCueName="C" xLabel="More
about Saab!"/>
</cuePt>
```

5.2.3 InsertPt Cue Point

In an embodiment, an insertPt may be used to include one of several pieces of media at a certain point in time. A selection of one of the pieces of media is made by a call to a web service. When reached, the cue point at the end of a target piece of media determines what happens next. The cue point at the end may comprise a returnEnd, goto or progEnd cue point.

In an embodiment, the media consists of one or more video segments with cueType="reg" to begin and a returnEnd, goto or progEnd to end; and one or more web points with cueType="webFocus" to begin and a valid cue point name specified in the gotoWebFocusEndName attribute.

The group of media points is specified as a cpGroup. The cpGroup must have uniform endings for the segments it contains. For example, every cue point identifies a contain segments (or compound segments) and every segment implies an ending cue point. For a cpGroup, all of the ending cue points are either goto cue points, returnEnd cue points, or progEnd cue points, or a mixture of these types of segment ending cue points.

In an embodiment, when the player reaches an insertPt, the player invokes the web service specified in the progLevelMetadata element described below with an operation specified with the cpGroup. The result of this call is used to select which media to display (the "target").

For example, assume the user has provided zip code information when registering for NBC.com, and the user is watching an episode of "Saturday Night Live" using the player disclosed herein. At an insertPt for a commercial, the player calls a web service to obtain the user's zip code. Based on the received zip code value, the player selects from among Bronco, Escalade and Hummer commercials. In an embodiment, the cpGroup is stated in script code as:

```
<cuePt cueType="insertPt" interestURL="" nameCue="B"
contentType="ad_Inline">
    <cpGroup operation="whichAdByZip">
        <targetSeg association="94010, 94103"
            cuePointName="escalade"></targetSeg>
        <targetSeg association="94611, 94612, 94708"
            cuePointName="hummer"></targetSeg>
        <targetSeg association="94617, 95012, 99234, default"
            cuePointName="bronco"></targetSeg>
    </cpGroup>
</cuePt>
```

In an embodiment, the cpGroup is a table of targets in which an association attribute configured as a string is linked to a media point. The result of the web service call, a string, is tested against the association values until a match is found, and the first match is used. The matching function implements a many-to-one matching as detailed in the cpGroup element description. If no match is found then the association="default" is checked against the table. If there is no match for the string or for "default", then nothing is inserted and the video plays on.

In an embodiment, the end of a video segment is its ending cue point. With cueType="returnEnd," control returns to the calling point. A goto end cue point jumps to wherever specified and a progEnd stops playback. In an embodiment, the end of a cue point with cueType="webFocus" is explicitly specified. It is reached by user action ("back" or goto TV). In an embodiment, the insertPt cue point has the following metadata attributes:

| | |
|---|---|
| cueType | insertPt |
| contentType | Other than zeroLen; see the discussion in the Attributes section of content types. |

-continued

| | |
|---|---|
| interestURL | Identifies a URL such to which control is transferred upon return from the insertion if "w" button is selected on the computer keyboard. See the discussion of cpGroup-interestURL-query cascade. |
| nameCue | Required. |
| query | Identifies a query that is submitted the interestURL upon return from the insertion if "w" button is selected on the computer keyboard. |

In an embodiment, the cue point has the following elements:

| | |
|---|---|
| cpGroup | A group target elements, with associations(s) and target cuePt(s) specified by name. |
| gotoAutoReturnButton | NA. gotoAutoReturnButton requires cueType="gotoAutoReturnButton". |
| mxmlInCPL | NA |
| progLevelMetadata | If this is the first cue point, it must be an element of type cuePtInitial and must contain a progLevelMetadata element. |
| Story | See element description. |

An example of script code using an insertPt cue point is:

```
<cuePt
cueType="insertPt"   interestURL=" "   nameCue="B"
contentType="prog_Inline">
    <cpGroup operation="whoAmI">
    <targetSeg                          cuePointName="D"
        association="F18to35"></targetSeg>
    <targetSeg       cuePointName="F,       default"
        association="oldMen">
</targetSeg>
</cpGroup>
</cuePt>
```

Further description on the details of behavior of the modalStoryBranch and insertPt cue points, in an embodiment, is provided in the Appendix.

5.2.4 Modal Story Branch Cue Point

In an embodiment, a modal story branch cue point causes the player to pause the video and to present the user with an n-way branch. The user selects an image representing the cue point to go to that cue point. The cue points can be either video or web points. The type for the cue points at the end of the targets are (for video) is goto or progEnd. In an embodiment, the cue point has the following attributes:

| | |
|---|---|
| cueType | modalStoryBranch |
| contentType | Always zeroLen |
| interestURL | NA, at zeroLen |
| nameCue | required |
| Query | NA, at zeroLen |

In an embodiment, the cue point has the following elements:

| | |
|---|---|
| cpGroup | A group target elements, with associations(s) and target cuePt(s) specified by name. Required for a modalStoryBranch. |
| gotoAutoReturnButton | NA |
| mxmlInCPL | NA |
| progLevelMetadata | If this is the first cue point, it must be an element of type cuePtInitial and must contain a progLevelMetadata element. |
| Story | See element description. |

In an embodiment, FIG. 8 illustrates an example screen display resulting from the use of a modal story branch cue point and example script code follows.

```
<cuePt
    cueType="modalStoryBranch"      interestURL=" "
nameCue="B"
contentType="zeroLen">
    <cpGroup backgroundPicLoc="stills/back.jpg"
    headerText="Pick your commercial and earn $!$!$!">
    <targetSeg association=" " cuePointName="X"/>
    <targetSeg association=" " cuePointName="G"/>
    <targetSeg association=" " cuePointName="I"/>
    <targetSeg association=" " cuePointName="K"/>
    </cpGroup>
</cuePt>
```

5.2.5 MXML Overlay Cue Point

In an embodiment, an MXML (Macromedia eXtensible Markup Language) overlay cue point allows use of a web development tool to define overlays with web-aware bindings. An example development tool is Flex from Adobe Systems, Inc., San Jose, Calif. Flex provides for content layout and code within an asynchronous architecture. In an embodiment, in the MXMLOverlay cue point MXML code is passed to the player via the mxmlInCPL element in the cue point. The code is executed to make the UI element overlays. For example, the metadata-capable video player logic 112 is configured to read a MXML user interface markup language script from the metadata file, parse and interpret the MXML script, and generate and display one or more overlay graphical elements in the video window of the player GUI based on the parsing and interpreting.

User interaction is processed using a web service that is specified in the progLevelMetadata attribute. User interaction with each component, such as a button, is handled by invoking an operation within the web service named "on" concatenated with the id property of the component. In an embodiment, the operation is called with the data relevant to the component.

In an embodiment, tags that descend from UIComponent and RadioButtonGroup within Flex are used. MXML authoring is further described in Adobe developer network documents relating to Flex. In an embodiment, the cue point has the following attributes:

| | |
|---|---|
| contentType | some non zeroLen type that you want to overlay |
| interestURL | This is where does the "W" button takes you. See the discussion of cpGroup-interestURL-query cascade. |
| nameCue | required |
| query | Where does the "w" button take you? See the discussion of cpGroup-interestURL-query cascade. |

In an embodiment, the cue point has the following elements:

| | |
|---|---|
| cpGroup | This is not an insertPt or a modalStoryBlock so it's not clear that there is a use for a cpGroup here. |
| gotoAutoReturnButton | NA |
| mxmlInCPL | See the description above and the section on the mxmlInCPL element. |
| progLevelMetadata | If this is the first cue point, it must be an element of type cuePtInitial and must contain a progLevelMetadata element. |
| Story | See element description. |

5.2.6 Progend and Returnend Cue Points

In an embodiment, progEnd end returnEnd cue points define the end of a video segment and upon reaching the cue points, the player stops playing video and does not provide a rewind option. There can multiple progEnd's in a media program.

In an embodiment, the returnEnd cue point is used at the end of a segment. Reaching a returnEnd causes a jump to the point that initiated the jump to the start of the segment. In an embodiment, the returnEnd and progEnd cue points have the following attributes:

| | |
|---|---|
| contentType | zeroLen |
| interestURL | NA |
| nameCue | Required |
| query | NA |

In an embodiment, the cue point has the following elements:

| | |
|---|---|
| cpGroup | NA |
| gotoAutoReturnButton | NA |
| mxmlInCPL | NA |
| progLevelMetadata | NA |
| story | NA |

5.2.7 Webfocus Cue Point

In an embodiment, a webFocus cue point can specify a URL for a web point and, with a story element, associate an image and text (e.g., for a call out) with the web URL. webFocus cue points can be used as targets in modalStoryBranch cue points and insertPt cue points. webFocus cue points can appear in directories. webFocus cue points can have a gotoWebPointEndName attribute value to specify what to show at the "end" of a webFocus.

In an embodiment, during playback, a user indicates that the user is at the "end" of a webFocus by selecting a "back" browser function or by selecting a "TV" button. If the video media is in an operational state, the player switches to the video, maintaining the playhead time and play/pause status. If the video is not in an operational state because, for example, a zeroLen cue point has been reached, the player executes a goto to the media point specified by the gotoWebPointEndName.

In an embodiment, the cue point has the following attributes:

| | |
|---|---|
| cueType | webFocus |
| contentType | zeroLen |
| interestURL | The URL that the WebFocus goes to. |
| nameCue | required |
| query | NA |
| gotoWebPointEndName | A cue point to goto at the end of a webFocus. |

In an embodiment, the cue point has the following elements:

| | |
|---|---|
| cpGroup | NA |
| gotoAutoReturnButton | NA |
| mxmlInCPL | NA |
| progLevelMetadata | NA, this element goes in the cuePtInitial which cannot be of type webFocus |
| story | webFocus's generally need stories to be useful |

5.3 Other Language Elements and Attributes

In an embodiment, the cue point language defined herein has the following elements:

cuePt elements have the following attributes:

| Element | Attribute | Comments |
|---|---|---|
| cuePt | nameCue | Any string |
| cuePt | contentType | ad_Inline, ad_Segment, prog_Inline, prog_Segment, zeroLen. See note on contentType(s). |
| cuePt | cueType | reg, gotoAutoReturnButton, progEnd, insertPt, returnEnd, goto, modalStoryBranch, webFocus, MXMLOverlay |
| cuePt | interestURL | a complete, legal URL, including the http:// or similar. This should be, but is not, checked by a regular expression; all the regular expressions for URL's that I found gave many false negatives. |
| cuePt | query | words, no white space, delimited by "+" |
| cuePt | gotoWebPointEndName | a cue point name |

In an embodiment, a cue point has the following contained elements:

| Containing Element | Element | Comments |
|---|---|---|
| cuePt | progLevelMetadata | The first cuePt must be a cuePtInitial and must contain a progLevelMetadata |
| cuePt | cpGroup | optional, at most once; see definition |
| cuePt | gotoAutoReturnButton | optional, at most once; see definition |
| cuePt | story | optional, at most once; see definition |
| cuePt | mxmlInCPL | optional, at most once; see definition |

In an embodiment, a cpGroup is used anywhere a group of cue points is needed. The cpGroups are made up of some attributes and a collection of targetSeg elements. A targetSeg contains a cue point name and an optional association attribute.

Some cue points, for example insertPt, use cpGroups where each cue point in the cpGroup has an association that is used to select the cue points. In operation, the player searches the table to match the string provided as a key with the association attribute and then returns the cue point name contained in the first match. Thus, a many-to-one matching is performed. The key may come from a web service as explained in the insertPt cue point section. As an example, with the following targetSeg's in a cpGroup:

| association | cuePointName |
|---|---|
| Jack | A |
| Jill | B |
| John, Jerry, Jill | C |
| June, default | D |

The following matching results would occur:

J, Jack, ack all match A

Jill matches B, and never gets to C

John, Jerry, Jill, ill, Jer, err all match C

ZZZZ (or anything or nothing) matches D (because after looking for the string key, the player attempts to match the string "default" as a key.

In an embodiment, the cpGroup has the following attributes:

| Element | Attribute | Comments |
| --- | --- | --- |
| cpGroup | backgroundPicLoc | This image is used as a background image when the cpGroup is used in a display, for example in a modalStoryBlock. |
| cpGroup | headerText | This text is used as the Headline when a cpGroup is used in a display, for example, a modalStoryBlock or a directory. |
| cpGroup | operation | the name of an operation in the web service specified in the progLevelMetadata that is used to select among the target segments |

In an embodiment, the cpGroup has the following contained elements:

| Containing Element | Element | Comments |
| --- | --- | --- |
| cpGroup | targetSeg | One to unbounded number; In a cpGroup it is prudent to have one targetSeg with association = "default". See element definition. |

In an embodiment, a targetSeg may be used to specify a cue point name and optionally associate it with an association attribute. When a group of cue points are needed, e.g., a modalStoryBlock where the user makes the choice, the association attribute can be omitted. In an insertPt the association attribute is needed to determine which cue point to goto. The association attribute can be of the form "aaa, bbb, ccc" where each substring would match the cuePointName. See cpGroup for an explanation of how the association attribute is used to select a cuePointName.

In an embodiment, the targetSeg has the following elements:

| Element | Attribute | Comments |
| --- | --- | --- |
| targetSeg | cuePointName | The cue point name; required. |
| targetSeg | association | A string associated with the target cue point; optional. |

In an embodiment, a mxmlInCPL element may be used to hold executable MXML code. There are no sub-elements and attributes defined. Instead, a user can include anything that descends from the UIComponent in mx:MXML. An example definition is now provided, followed by comments:

```
1.<mxmlInCPL>
    a. <mx:MXML id="whatever" xmlns.mx="http://www.adobe.com/
        2006/mxml">
        1. <mx:Canvas xmlns:mx="http://www.adobe.com/2006/mxml"
            width="600"
            height="440" id="uberContainer">
        2. <mx:Button label=" button 1" id="button1"
            click="onMXML(event)"/>
        3. </mx:Canvas>
    b. </mx:MXML>
2.</mxmlInCPL>
```

| Line | Note |
| --- | --- |
| 1 and 2 | Enclose the MXML with the mxmlInCPL tag. |
| 1.a | MXML, an element defined by Adobe; you need line 1.a, as it is, but with whatever id you choose. |
| 1.a.1 | Any container (canvas, VBox, etc.) that will contain all the other components. With the fixed name (remember: quick and dirty) "uberContainer". |
| 1.a.2 | Any id you want for the component and then the operation within the web service is "on" + the id. Here you'd build a server side handler with the function name "onbutton1". Any event can be handled (here it is "click") but all components call the fixed name "onMXML" as the handler. |

In an embodiment, a progLevelMetadata element is required. It contains data associated with the overall program. Example attributes include:

| Element | Attribute | Comments |
| --- | --- | --- |
| progLevelMetadata | xUniqueID | This is a unique id for the program. It could be used to retrieve dynamically a set of cue points from the web, updating the entire CPL data and behavior of the program. Currently television programs contain a unique ID as specified by SCTE V-ISAN unique ID that could be used for this purpose. |
| progLevelMetadata | xProgLevelDir | true or false. If true, the player will make a directory of all of the cuepoints (including webFocus's) which have a story element. |
| progLevelMetadata | xVersionCPL | This is a number that specifies the version of CPL used in this file and embedded in the video. The XML will report a validation error if the .xsd file version and this field do not match. The player will report an error(but not stop) if the player version and the CPL version don't match. |
| progLevelMetadata | xWebServiceLoc | This is the location of the web services used by cue points such as insertPt and MXMLOverlay. The operations within the service are specified separately. The location should match an entry in services-config.xml. |

Example contained elements include:

| Containing Element | Element | Comments |
| --- | --- | --- |
| progLevelMetadata | cuePt | This is where cue points with cueType = "webFocus" are defined. |

In an embodiment, a story element packages data used to display a cue point (web or video). Example attributes include:

| Element | Attribute | Comments |
| --- | --- | --- |
| story | balloonText | A string, used as balloon text in directories, popups, etc. |
| story | picStory | The location of the image to represent the cue point; a jpeg, 100 × 100; see the note regarding path specification for images. |

In an embodiment, a gotoAutoReturnButton element and cue point support a "more info" operation. Example attributes include:

| Element | Attribute | Comments |
| --- | --- | --- |
| gotoAutoReturnButton | xCueName | The target cue, the name of the cue point for the more info. |
| gotoAutoReturnButton | xLabel | The label for the button. |

Annotations

In an embodiment, an annotation element is used to display a graphic on screen. The graphic can be actionable. An annotation element is a graphic object that appears on screen starting at a cue point; when the next cue point is processed the annotation is removed (although it could be reapplied). It is used to overlay the display with a graphic while in video view and may optionally implement a goto behavior in response to a click. The structure of the annotation element is similar to cuePoints in that it contains the same targetList and story elements. Clicks on an annotation can cause three things to happen, depending on the value of the clickBehavior attribute. See the attribute description. Example attributes include:

| Element | Attribute | Comments |
| --- | --- | --- |
| annotation | name | The type is String. May include white space. Used to identify the annotation. Required. No default. |
| annotation | x, y | The type is Decimal. The position of the annotation; may be relative or absolute. 0, 0 is upper left, and the coordinate system is that of the videoSource attribute in the progLevelMetadata element. Optional. Default is 10, 90 (and "relative" defaults to true). |
| annotation | relative | The type is Boolean. If true interpret the x, y attributes to position the graphic as percentages of video coordinate space; otherwise interpret the values as magnitudes. Optional. Defaults to "true". |
| annotation | alpha | The type is decimal, it is optional and the default value is 1.0. This controls the annotation's transparency with 0.0 being completely invisible and 1.0 being completely occluding. |
| annotation | clickBehavior | The type is string with legal values "goto", "returnEnd", and "decoration". Optional, defaults to "decoration". The behaviors are: clickBehavior = "decoration", a click causes nothing to happen clickBehavior = "goto", execute a goto to the cue point held in the annotation's target clickBehavior = "returnEnd", execute a returnEnd (changing the playhead and stack accordingly) and returns to the segment that caused control to transfer to the segment displaying the annotation. The third case by example: an insertPt has taken the playhead into a segment, the segment has an annotation with clickBehavior = "returnEnd"; a click on the annotation executes a returnEnd and returns the playhead just after the initiating insertPt. |
| annotation | skipOnReturn | Boolean, defaults to "false". This controls the behavior at the end of a target segment (assuming there was one) reached through a user click on an annotation. If true, this causes the playhead to goto the end of the calling segment; otherwise the playhead returns mid-segment to the point within the calling segment from which it was called. |
| Annotation | story | A required image and optional balloon text for the annotation. See the element description. |
| Annotation | targetList | With clickBehavior = "goto" this one element list contains the destination. See description of targetList element description. Meaningless for other clickBehavior values. |

In an embodiment, an audiovisual work may include one or more annotations that specify interactions available to a viewer. Annotations may comprise graphical images, buttons, text messages, labels, and other elements that may be displayed in a variety of locations overlaid on a video segment or near a video player window that is showing a video segment. One or more annotations may be assigned to a cue point; when the cue point is reached during playing, the annotations are activated and remain active until the next cue point. Annotations have flexible attributes relating to where they can be shown, what they can show, and how they behave. Graphic images associated with annotations may include images such as PNG and JPEG files, or SWF files or any other files that can be rendered on the system on which the player logic 112 is hosted.

In an embodiment, an annotation has one of four types: decoration; goto; returnEnd; and overlay. (Details of annotation types are disclosed in the Appendix.) Annotations may be displayed as static graphical images or animated graphics. Annotations may be positioned anywhere in the video windows that the player logic displays during playing.

In an embodiment, annotation frames allow placement of an annotation outside of the video window; an annotation frame can provide a larger area outside the video in which annotations can appear, without covering up the video. In an embodiment, a user may use the video linking editor logic 112 to define an annotation frame as a rectangle within which the video window is placed. If the annotation frame is larger than the video frame, then space is displayed around the video and annotations can be placed in the resulting space without obscuring the video. With annotation frames, an author is not required to re-encode a video segment to create space to place annotations.

A "goto" annotation may be associated with a target and one of several different kinds of return behavior; a target specifies where the player branches when a viewer clicks on the annotation, and the return behavior specifies where the viewer returns after viewing the video or web page associated with the annotation. For example, the return behavior of a goto annotation may be set to "Skip." With skip on return behavior, after a viewer returns from the annotation's target video segment or web point, the player skips to the next cue point after the one that includes the goto annotation.

An annotation of any type may be configured with modal behavior. A modal cue point has two different playback modes comprising an initial entry mode and a return or overlay completion mode. When an annotation is modal, each annotation type causes the video player logic 112 to operate differently depending upon the then-current mode, as defined by how the player arrived at the associated cue point. For example, initial entry mode refers to the player arriving at the cue point via normal program flow, or as the result of a direct jump. In initial entry mode, the video player logic 112 is configured to display all annotations that are configured as modal, pause, and wait for the user to select a non-decoration annotation, such as a "goto" annotation or a "returnEnd" annotation. In contrast, return or overlay completion model occurs when the player returns to the cue point via a returnEnd cue point or annotation after a jump from it, or when a viewer selects the Continue button to close an overlay data entry form. (Further details are provided in the Appendix.)

Figure 23:
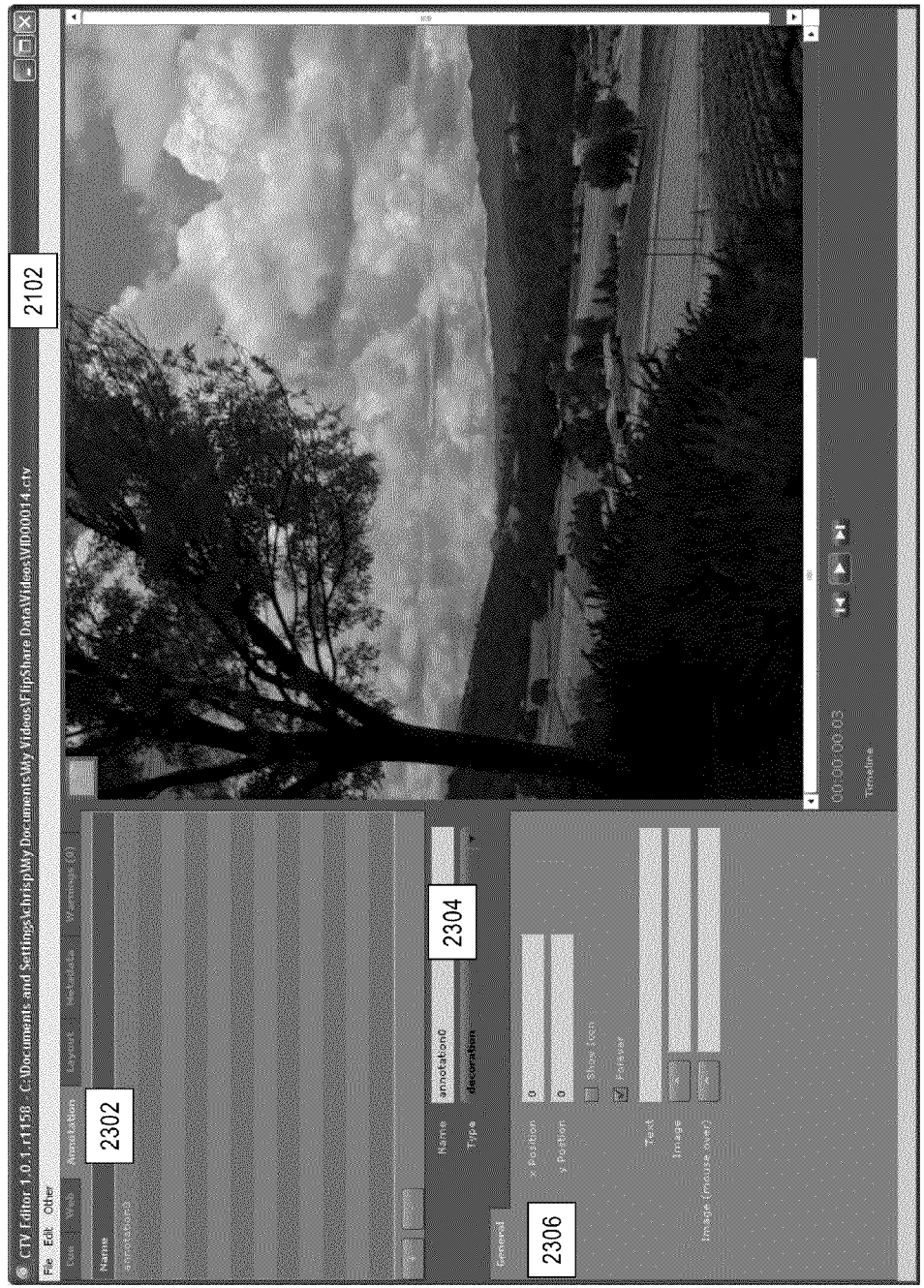
FIG. 23 is a screen display diagram of an example Editor window in which an Annotation tab is selected.

FIG. 23 is a screen display diagram of an example Editor window in which an Annotation tab is selected. In the example, screen display 2102 includes Annotation tab 2302. Selecting an Add Annotation (+) control causes the editor logic 110 to display a default annotation name and type in fields 2304; user input may modify the annotation name and type, so that the annotation may be referenced in other metadata using a convenient name. Editor logic 110 also displays a data entry panel 2306 that may receive values defining particular parameters of an annotation including screen position values (X position, Y position). Parameters also may include a text label for the annotation, a graphic image to display as the visible form of the annotation in the player, and mouse over image. The mouse over image is a different graphic image to display if a user moves a pointing device over the annotation while using the player and when the annotation is displayed. A Boolean parameter selected in the editor using a checkbox may specify whether to display an annotation icon.

Switched Annotations

In an embodiment, external data may control which annotations or overlays are played back. In various embodiments, external data may be used to control a level of user interactivity with an audiovisual work, or to selectively display annotations such as subtitles in particular foreign languages. In an embodiment, an author uses a switched annotation identifier to set up switched annotations and also specifies two or more different annotations to display based on the value of an external data item. At playback, an external data value is obtained, and the user experience changes depending on the value of the external data and the particular switching path specified by the switched annotation identifier for that external data value. Thus, the term "switched annotation" refers to the fact that any annotation, as otherwise disclosed herein, may have its visibility on the screen determined by the value of a key in the data store; thus, the annotation can be switched on or off using its associated key.

In an embodiment, a switched annotation may be used to include or display one of several annotations at a certain point in time. A selection of one of the annotations is made by a call to a web service. A switched annotation may be implemented using the techniques described above for the insertPt cue point, except that the switched annotation affects display of annotations, rather than pieces of media. In an embodiment, when the player reaches a switched annotation, the player invokes a specified web service with a specified operation. The result of this call is used to select which annotation to display (the "target annotation").

In an embodiment, at a given cue point the properties of a switched annotation are controlled by a key. The key acts as a control variable and can be local to the CTV content, or can be external to the CTV content and reached by, for example, an HTTP request. In an embodiment, at every cue point, and every annotation when clicked, code can potentially execute.

As an example, assume that the key is labeled Language, and can take the value English, French, etc. When an audiovisual work is played, in rendering the annotation, the player examines at the key to determine which annotation to show. The author has previously defined an annotation value corresponding to each possible value for the key or key value. For example, the following table associates example Language keys with example annotations:

| Key = Language | Value |
|---|---|
| English | "I am here" |
| French | "je suis ici" |

Figure 26:
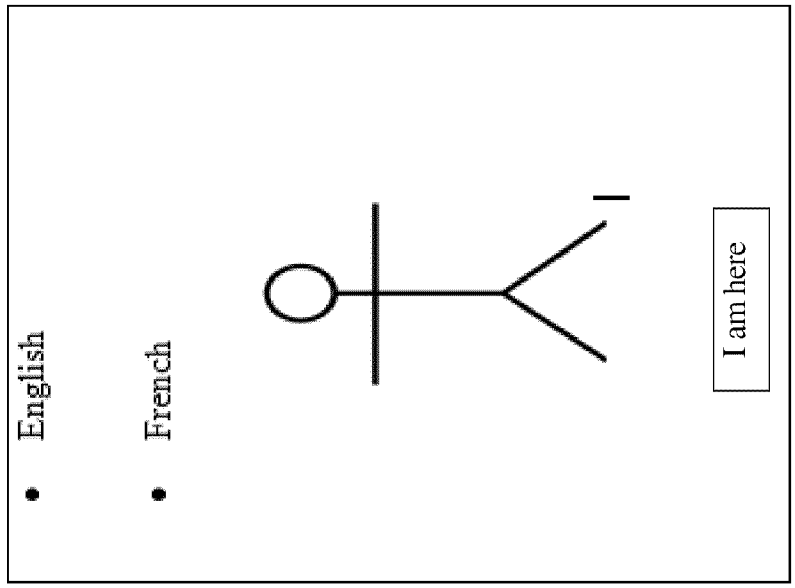
FIG. 26 illustrates a screen display in schematic form that could be displayed at a particular cue point.

Assume that an audiovisual work is playing and reaches a particular cue point for which a switched annotation has been defined. FIG. 26 illustrates a screen display in schematic form that could be displayed at a particular cue point. In the example of FIG. 26, a character is displayed with the subtitle "I am here" in English. The screen display also includes icons, representing annotations, labeled English and French and having highlighting, coloring or other graphical indications that the English icon is enabled and the French icon is disabled. Assume that the user selects the French icon by directing a mouse cursor to it and clicking. In response, the key Language is set to French, and the screen is redrawn so that the subtitle "Je suis ici" appears in place of the English subtitle.

Alternatively, the key may be set by issuing a Web Services request that returns a string value of "English" or "French". In an embodiment, the annotations that are represented by icons for selection of the language are also switched annotations. For example, a first annotation may be labeled FirstLanguage and may receive its value from a Web Services request or from a previously defined table of values.

Switched annotations are defined and operate in a manner similar to the insertPt cue point type that is described elsewhere in this disclosure. However, an insertPt cue point type is used to pick which video segment is inserted at playback at a particular cue point, and a switched annotation is used to select which annotation to use at a particular cue point.

In an embodiment, a switched annotation is implemented by including, in a CTV file or other metadata that defines an annotation, a filter tag. The filter tag has two attributes: key—the name of the variable in the datastore to match against; value—the pattern to match against. The annotation is displayed if the value of the keyword in the datastore is contained within the value attribute string.

For example, if the value in the datastore is "bike", that value match the filter value "bike", "bike,default", and "car, bike" but not "b". As a convenience, if the datastore does not have a value for the given key, the string "default" is used as the value.

In one embodiment, the following syntax is used to define a switched annotation using a filter tag:

<annotation>
    <filter key=" . . . keyword" value=" . . . match value"/>
    </annotation>

In an embodiment, the audiovisual experience authoring platform described herein is integrated into a social networking platform such as Facebook.

Figure 27:
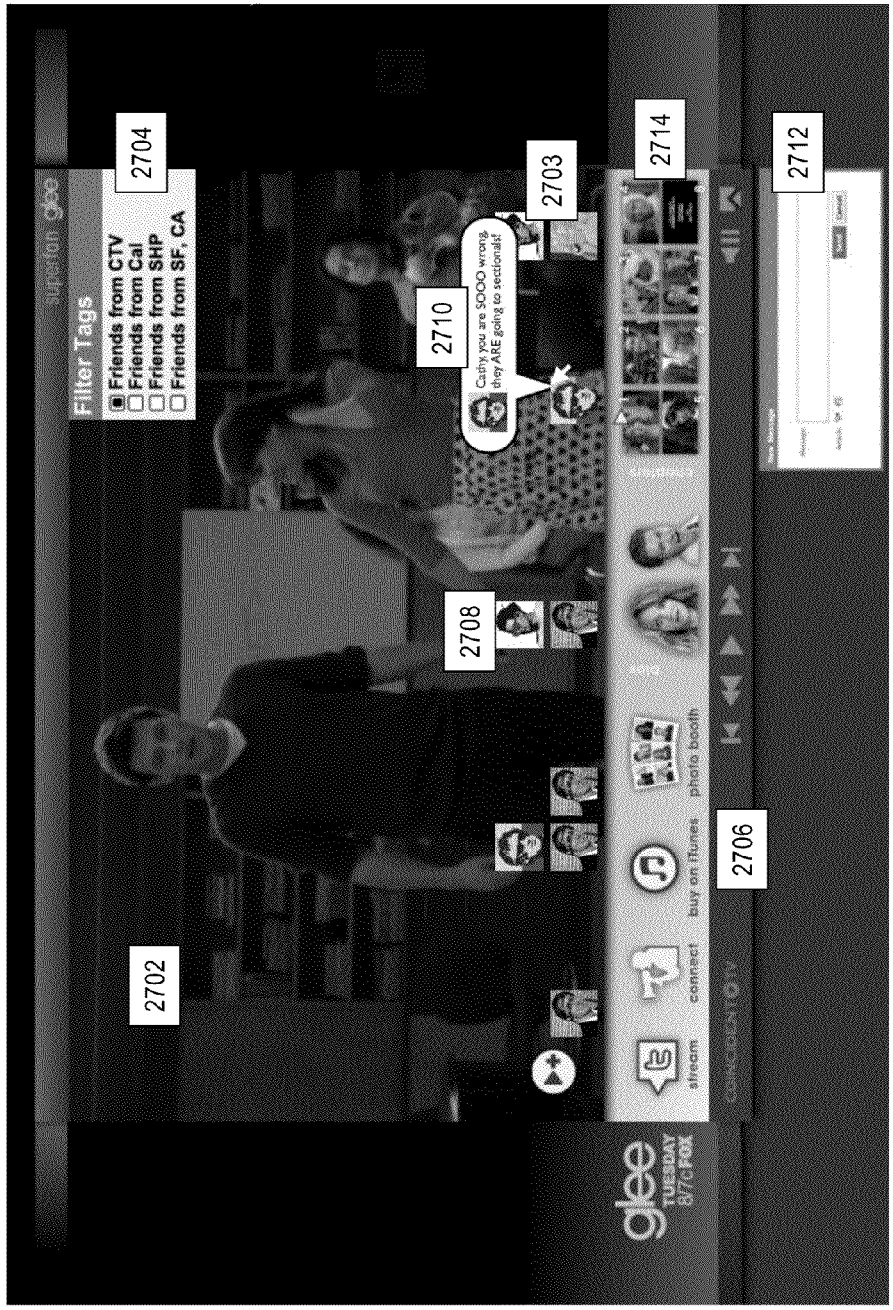
FIG. 27 illustrates an example screen display that may be produced using switched annotations to filter the display of icons having values obtained from an external social graph.

FIG. 27 illustrates an example screen display that may be produced using switched annotations to filter the display of icons having values obtained from an external social graph. In an embodiment, the screen display comprises a player window 2702 that may include a moving video image from a video program. A player control bar 2706 comprises selectable controls which, when selected, cause performing trick play functions such as playing video, fast forwarding, rewind, and jumping to the beginning or end.

In an embodiment, the server computer and player are configured to perform the following:

1. While watching a video as shown in player window 2702, a user can log in to Facebook from within the player and post a comment on what the user is seeing. For example, player control bar 2706 may include a graphical icon which, when selected, causes issuing a network request to the Facebook server to perform a login sequence and causes displaying a panel in which the user can enter login details.

2. Images representing comments of the user or the user's social networking friends on a particular video are shown at the point in playback that corresponds to what the user was watching when the comment was posted. In an embodiment, player window 2702 includes a set of thumbnail images 2703. Each thumbnail image is obtained from the Facebook social graph. Each thumbnail image represents and identifies a comment that was made at that point in the video by the Facebook user who is depicted in the thumbnail image. As the video plays, the set of thumbnail images 2703 moves across the screen from right to left. Thus, when playing the video advances to a scene that is later in time than a particular comment, the thumbnail image associated with that comment will disappear to the left side of the player window 2702 and new thumbnail images will come into view on the right side of the player window. The images on the right side represent comments that were made about later points in the video. The thumbnail images 2703 that appear at or near the center of the video, as in the case of images 2708, represent comments that were made at the current playback point of the video.

3. When multiple users have entered comments at the same time point in the video, the thumbnail images are displayed in a stack, as seen for images 2708. Rounding of time point values may be used so that multiple comments within a range of a few seconds will appear in an ordered vertical stack at the same position.

4. In an embodiment, a message window 2712 may be displayed in a screen position near the player window 2702 and may receive a message from the current user to another user of a social media system. In an embodiment, the player and server computer are configured to send network requests that post messages or short messages, such as Twitter tweets, to the social media system, social graph, or short message service such as Twitter, and are configured to poll for or automatically receive messages or short messages from the social graph or short message service. Consequently, in an embodiment, if another user sends a live comment at the time that the current user is viewing the video, then the player window also shows such live tweets and comments, as indicated for example by tweet 2710.

In an embodiment, hovering a cursor associated with a pointing device, such as the arrow cursor seen in FIG. 27, causes the video player logic 112 to retrieve and display a comment or tweet 2710 that a user indicated by the associated image 2708 had previously made. In other words, each image 2708 may represent a comment and hovering over that image causes the video player logic 112 to retrieve the associated comment from the social graph and display it as seen for tweet 2710.

In an embodiment, selecting one particular friend opens up private messaging to that friend, for example, using message window 2712. Alternatively, selecting an icon in the display of FIG. 27 adjacent to an image 2708 that has cursor focus, such as the ">+" icon of FIG. 27, creates a new image stacked above the prior image and opens a bubble or other graphical widget that accepts a new comment from the current user.

5. The color and opacity of the thumbnail images 2703 may indicate the time of posts. For example, a thumbnail image that is displayed in partly transparent form, or grayed out rather than in full color, may represent a post that was made at a much earlier time.

Figure 36:
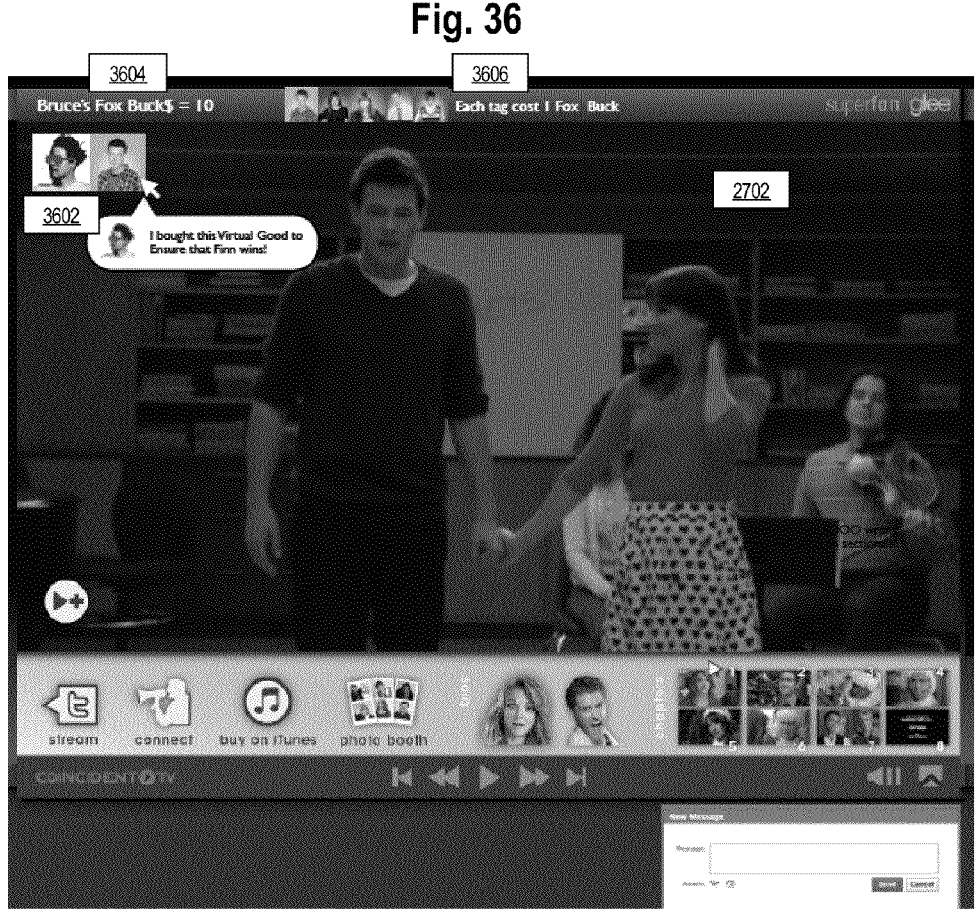
FIG. 36 illustrates an example of the screen display of FIG. 27 in which data relating to virtual goods is displayed.

6. Virtual goods may be displayed in association and allow for game like interactions. For example, images representing virtual goods may be displayed over screen display 2702. FIG. 36 illustrates an example of the screen display of FIG. 27 in which data relating to virtual goods is displayed. In an embodiment, virtual goods images 3502 indicate one or more virtual goods that the current user has purchased and each image may be associated with a stored comment from the current user that is displayed when the cursor associated with a pointing device hovers over a particular image. A total message 3504 may indicate a total amount of virtual goods associated with the current user. For example, the message "Bruce's Fox Buck$=10" indicates that the current user "Bruce" has purchase 10 units of virtual currency denoted "Fox Buck$". A virtual goods option region 3506 may display image icons representing available virtual goods and the cost of the available virtual goods. In an embodiment, selecting one of the virtual goods in region 3506 causes the video player logic 112 to initiate a purchase dialog that can debit funds from a previously established account of the current user or obtain payment information; after completing a payment transaction the video player logic updates the screen display 2702 to show a new or updated image 3502 and message 3504.

7. Displayed friends may be filtered using switched annotations. In an embodiment, each of the thumbnail images 2703 is a switched annotation that is displayed in the player window, or not displayed, based on the current value of a filter key. In an embodiment, the video program displayed in the player window 2702 is associated with metadata that defines an annotation 2704 that displays one or more filter tags with associated radio buttons. Selecting a particular radio button causes annotation 2704, in response, to set the value of the filter key to the selected value.

For example, as seen in FIG. 27, the filter key may be labeled "FilterTag" and may be defined as receiving values friends_from_CTV, friends_from_Cal, friends_from_SHP, friends_from_SF. Further, a particular annotation defining friend David may have the following filter tag defined:

<annotation>
    <filter key="FilterTag" value="friends_from_CTV"/>
    </annotation>

Selecting the radio button labeled Friends from CTV causes setting the value in the datastore of the key FilterTag to friends_from_CTV. Thereafter the filter tag defined for David will match the current value of the key FilterTag, so David's image will be displayed. The player logic is configured to display a particular annotation for a particular one of the thumbnail images 2703 only when the current value in the datastore of the filter key specified in that particular annotation matches one of the values that are also defined in the filter tag for that particular annotation.

Although the examples above specify a single value in the filter tag for an annotation, other embodiments may use lists of multiple values. Thus, for example, David could be defined as both a friend from CTV and a friend from California by appropriate definitions in the filter tag. Definitions in the filter tags may be constructed programmatically by the server computer in response to querying the social graph for the current user. For example, the player logic may be configured to perform, in response to determining that the user has logged into a social media system such as Facebook, issuing a query to the social graph to retrieve a list of the user's friends and attributes of the friends such as group membership or location. Based on data received in response to the social graph query, the player logic may generate and store metadata on-the-fly that defines an annotation for each friend and defines a filter tag containing matching values for each attribute of that friend that has been obtained from the social graph.

The result is that only thumbnail images 2703 corresponding to the selected value in the filter tag annotation 2704 are displayed in the player window, and as the value selected in the filter tag annotation 2704 changes, the displayed thumbnail images 2703 turn on and off in accordance with whether the key is matched.

Figure 28:
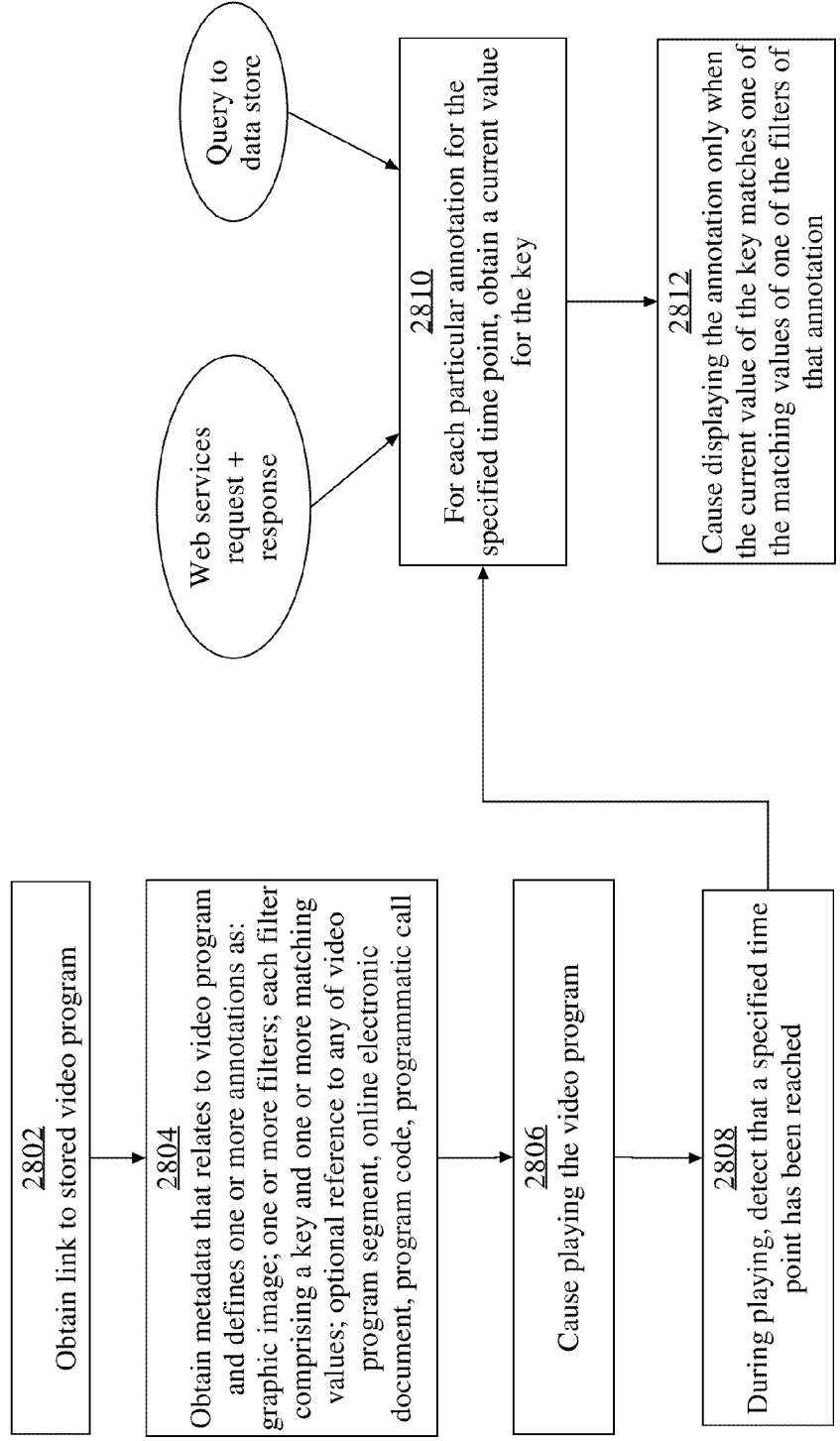
FIG. 28 is a flow diagram illustrating a process for switched annotations.

FIG. 28 is a flow diagram illustrating a process for switched annotations. In an embodiment, at step 2802, a link to a stored video program is obtained. At step 2804, metadata is obtained that relates to the video program and that defines, for a specified time point in the video program, one or more annotations to be invoked at the specified time point. Each of the annotations comprises: a graphic image; one or more filters, each of the filters comprising a key and one or more matching values; and optionally a reference to any of: a video program segment, an online electronic document, a set of program code statements, or a programmatic call.

In step 2806, the computer is caused to play the video program from the link. At step 2808, during playing the video program on a computer, the process detects that the video program is playing at the specified time point. At step 2810, in response to the detecting, for each particular annotation among the annotations for the specified time point, the process obtains a current value for the key. In various embodiments, obtaining a current value for the key may comprise issuing a query to a database, directory, or other data store. In other embodiments, obtaining the current value of the key comprises issuing a Web Services request and obtaining the current value of the key from a response message that is received in response to the Web Services request. In yet another embodiment, obtaining the current value of the key comprises issuing a Web Services request and determining the current value of the key based on one or more values in a response message that is received in response to the Web Services request.

At step 2812, the process causes the computer to display the graphic image associated with that particular annotation only when the current value of the key matches one of the matching values of one of the filters of that particular annotation. When displayed, as with other annotations disclosed herein, the annotation is displayed in the video player window at a particular position, size, and with other attributes as otherwise defined in the annotation.

Using the techniques herein, a video program played on a computer may be supplemented with graphics, links, references to code, or programmatic calls that are selectively displayed based on the value of a stored key. In this manner, annotations to the video program may be switched on and off to yield a variety of graphical experiences and provide for a dynamic, changing video experience that can respond to user input and implement many useful services.

5.4 Content Types

A content type value associated in metadata with a cue point causes differentiated operation of the metadata-capable video player logic 112 at the time of playback. In particular, within the player the content type zeroLen is treated differently than all others (ad_Inline, segment_Inline, prog_Inline, prog_Segment). For example, ad_Inline and ad_Segment are used to skip advertising content coming back from an insertPt.

5.5 Automatic Creation of Cue Points

In an embodiment, a computer program can create one or more cue points and store the cue points in a metadata file, rather than a user obtaining cue points from encoded video, or the user creating the cue points using the video linking editor logic 110. In an embodiment, cue points can be added, updated or completely replaced dynamically using web applications, processes, or other computers that are coupled to computer 102. For example, the unique identifier of a television program, as specified by Society of Cable Telecommunications Engineers, could be used in an update message providing new cut points.

In another example, one or more computer programs can access video and other content databases and use the information gather to generate interactive video experiences based on the cue point language schema that is defined herein. As one example, a Perl script may be configured to access YouTube metadata APIs to construct an interactive video experience based on playing all video matching a particular keyword. In this example, the script may be configured to issue an HTTP-based query to a YouTube server, in which the query conforms to YouTube's APIs, to retrieve a list of all stored videos that include a particular keyword in the metadata maintained by YouTube for the stored videos. In response, the YouTube server sends a responsive dataset. The script may be configured to identify a URL for each video on the YouTube servers that is identified in the responsive dataset, and to write a metadata file 126 that specifies an audiovisual program consisting of a concatenation of all the matching videos. The script could be configured to automatically generate a plurality of annotations, in which each annotation graphically represents a first frame of a different one of the matching videos. In this manner, at playback the user would see a visual menu of each matching video and could activate any desired video by selecting on the image associated with an annotation for one of the videos.

In another example, a program is configured to receive a user query for a particular keyword or phrase and to search a database of movie metadata for matches to the user query. For each match to the user query, an associated database record is selected and retrieved. From each database record, the program retrieves a URL of a video that is stored in third party hosted storage, such as YouTube. The program creates and stores a metadata file 126 that plays the matching videos. For example, the program could be configured to receive a user query to find all video clips in which a character says "Bond, James Bond", assuming such phrases are represented in the database of movie metadata.

In another example, a computer program may be configured to create multiple metadata files 126 based on a single video. For example, a Perl script may be configured to generate multiple versions metadata files 126 for a single video in which each metadata file 126 comprises definitions of annotations for subtitle data in a different language, and the subtitle data is displayed at playing time using the annotations as the subtitle display widget. Additionally or alternatively, automatic creation of cue points may take user behavior into account to create customized cue points for a particular user based upon what is known about the user's behavior as represented in server-side stored data. User behavior can include information what previous cue points have been selected, the elapsed time between selections, whether certain video segments have been skipped, navigation paths as represented by user selections of different video segments in succession, etc.

Thus, embodiments provide flexible means to use output from a database, coupled to a script or other program, wherein the output is optionally selected based on matching user input or queries, to result in automatically creating and storing one or more metadata files 126 which, when played using the video player logic 112, result in displaying enriched interactive videos. While certain examples have stated that the program may cause displaying a concatenation of videos matching a query, concatenation is not required. Instead, a program or script may have any level of complexity and may be configured to write a metadata file consisting of any number of cue points, annotations, or other information based upon the language description that is provided herein. In this approach, metadata may be created dynamically and transmitted to the player over a network connection without storing or saving the metadata in file format. Further, the examples provided herein are merely representative and countless other applications are possible.

5.6 Directories

Figure 10:
FIG. 10 illustrates an example screen display that includes a directory.

A directory comprises, in one embodiment, a selectable, scrollable column on the right part of the video display that appears at cue point boundaries and for a specified period of time, such as four (4) seconds, in response to a movement of a pointing device. FIG. 10 illustrates an example screen display that includes a directory.

Player logic 112 attempts to generate and display a cue point specific, non-modal directory on a cue point by cue point basis. The media points (video and web) within the directory are specified as a cpGroup and must contain story elements if they are to appear in the directory. These points can be whatever the author chooses to make them and are an opportunity to guide the user into interesting, tangentially related information. For example, in a news show, when a story about Great Britain is shown the directory could contain the related online encyclopedia entry and several video segments; when the news program shifts to the next story, the cue point specific directory changes.

5.7 Web Services

In one embodiment, web services may be implemented using a ColdFusion web server. In an embodiment, web services are called with two string arguments comprising the called operation or function and the type of service. The web service returns a string with three fields comprising an operation specific field (e.g., "serviced" for MXMLOverlay calls), a result, and the type of service string.

5.8 Dynamic Layout with Multiple Rectangles

In an embodiment, an author may customize the positioning of a video window and a web window within an overall player window. In an embodiment, dynamic layout is accomplished through user interaction with the video linking editor logic 110.

Figure 21:
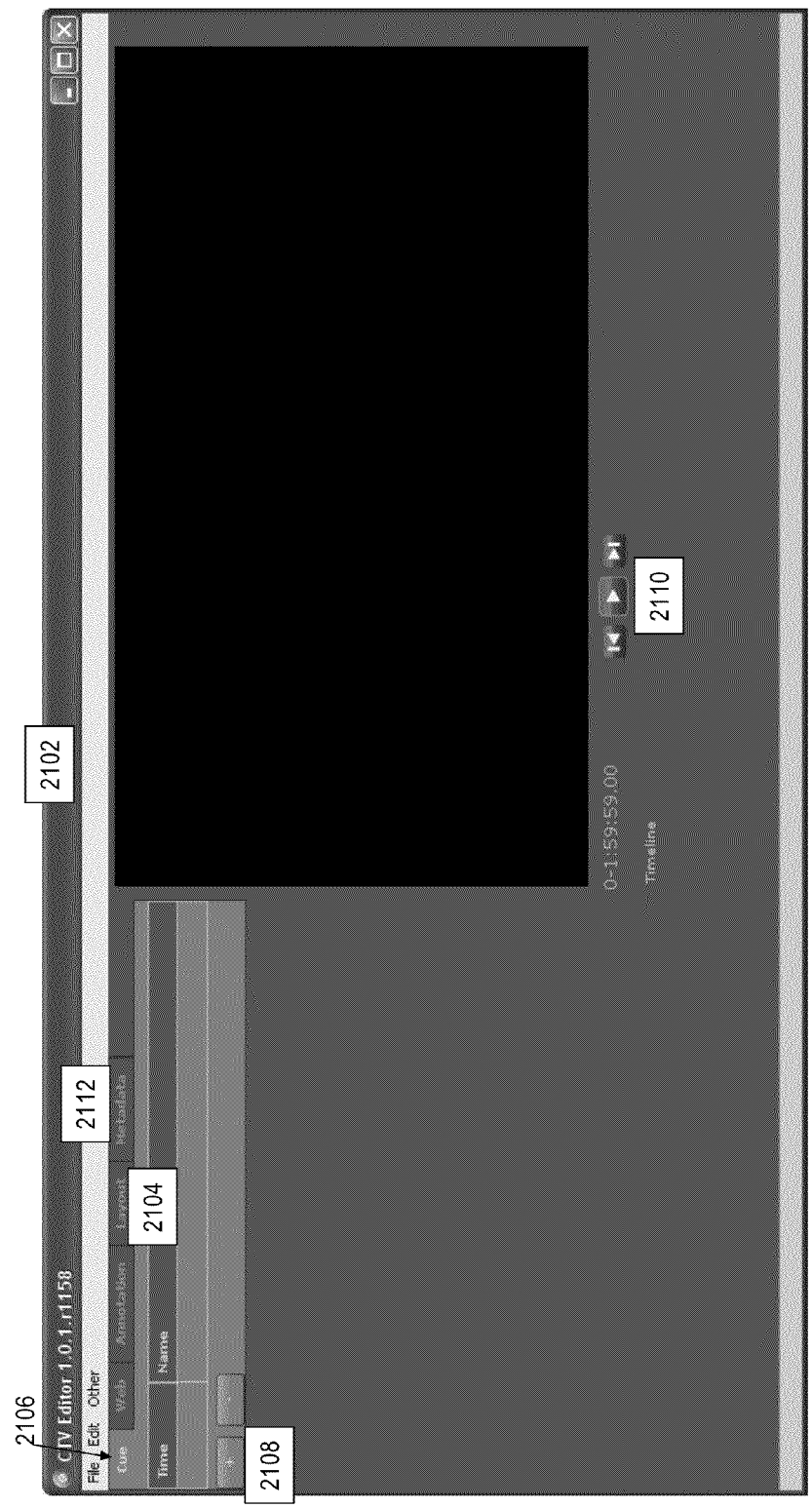
FIG. 21 illustrates an example screen display that the video linking editor logic generates and causes displaying and in which a Cue tab is selected.

A user selects a Dynamic Layout feature under a Layout tab 2104 of an editor screen display 2102 as seen in FIG. 21.

FIG. 21 illustrates an example screen display that the video linking editor logic generates and causes displaying. An author selects a window size for the video to be displayed as part of an enriched video program. For example, a window size may be 1024 pixels wide by 763 pixels tall. Generally, a user selects a new layout control to create a new layout and assigns a unique name to the new layout. The author selects a Positioning function and may select one of a plurality of predetermined layouts of the video window, web window, and static surrounding graphical display space. The user may change the size of the video window or web video using an Advanced tab function. The user may change dimensions in pixels for video width, video left position, video horizontal center position, and video right position. The editor logic stores the changed values in association with the layout name. Changing numeric values of dimensions later results in changing the position of a video window when displayed using the player logic. Each layout may have restrictions on repositioning based on the original layout; in an embodiment, the editor logic 110 prevents the user from entering data for parameters that do not fit a particular layout.

Figure 25:
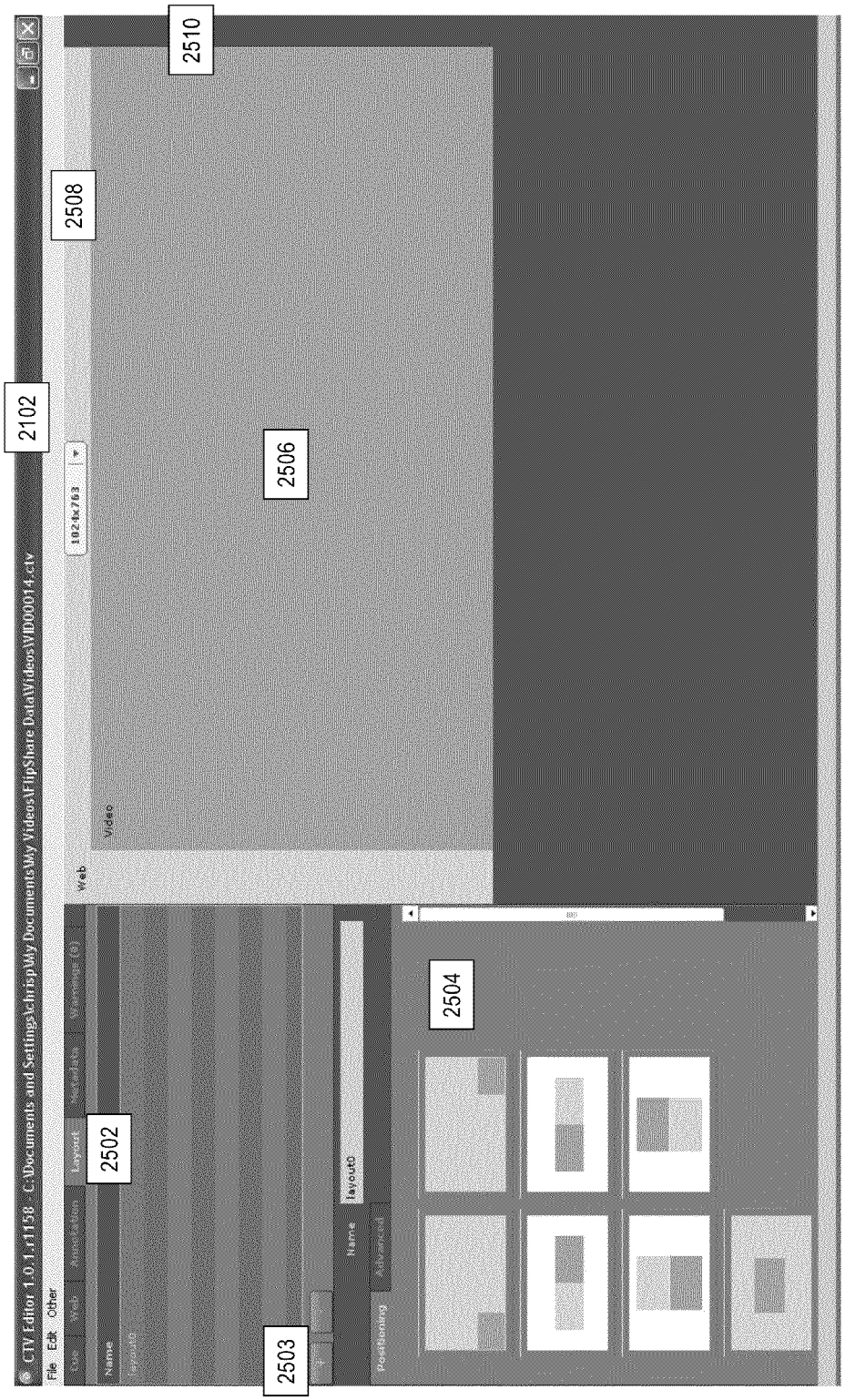
FIG. 25 is a screen display diagram of an example Editor window in which a Layout tab is selected.

FIG. 25 is a screen display diagram of an example Editor window in which a Layout tab is selected.

In an embodiment, example Editor window 2102 comprises a Layout tab 2502 that displays a list of names of selected layouts. Selecting an Add Layout control 2503 causes the editor logic 110 to add a new layout name to the list. In an embodiment, logic 110 can access stored data defining a plurality of predefined player window layouts, which are displayed in an information panel 2504. In each predefined layout, a relative size and position of a video window to be shown in the player window is indicated by a rectangle having a first color, and a relative size and position of a web browser window to be shown in the player window is indicated by a rectangle having a different, second color. In some layouts the video window has a reduced size as compared to a size of the browser window. In some layouts the video window is the same size as the browser window. In some layouts a background is defined that is logically behind or surrounds both the video window and browser window. In some layouts the video window is laterally or longitudinally adjacent to the browser window. In some layouts the video window is offset in a corner of the browser window, or centered.

In an embodiment, selecting a predefined layout from panel 2504 causes editor logic 110 to display an enlarged view 2510 of the selected layout in which the relative size and position of the browser window 2508 and video window 2506 are shown. The author also can further customize the layout to obtain different effects using the parameters accessible using an Advanced tab of the editor window as shown in panel 2504.

A layout may be linked to a particular cue point. In an embodiment, a user selects a Cue tab in the editor screen display and selects a cue point to link to the layout. The user may select a Description tab in a Parameters pane and select a Browse button next to the Web View Layout and the user may select the Layout that the user created.

In this approach, an author has control over the location of a video window and web window. Further, a particular layout that the author deems aesthetically preferable for a particular combination of video and web content may be injected into the metadata so that the layout changes appropriately when a particular cue point is reached.

5.9 Cue Point Language Example

TABLE 1 presents an example of a complete metadata file of the type that can be created and stored as one of the metadata files 126.

TABLE 1

CUE POINT LANGUAGE EXAMPLE

```
<MediaProgram xsi:noNamespaceSchemaLocation="CPL_v-10_
validator.xsd"
    xmlns.xsi="http://www.w3.org/2001/XMLSchema-instance">
  <cuePt nameCue="A" cueType="reg"
    interestURL="" contentType="prog_Inline">
    <progLevelMetadata xProgLevelDir="false" xVersionCPL="-10"
    xUniqueID="123">
    </progLevelMetadata>
  </cuePt>
  <cuePt nameCue="B" cueType="insertPt"
    interestURL="" contentType="prog_Inline">
    <cpGroup>
      <targetSeg
        association="default" cuePointName="D"></targetSeg>
    </cpGroup>
  </cuePt>
  <cuePt nameCue="C" cueType="progEnd"
    interestURL="" contentType="zeroLen">
  </cuePt>
  <cuePt nameCue="D" cueType="reg"
    interestURL="" contentType="ad_Segment">
  </cuePt>
  <cuePt nameCue="E" cueType="returnEnd"
    interestURL="" contentType="zeroLen">
  </cuePt>
</MediaProgram>
```

In an embodiment, the base element is MediaProgram and encloses all other elements. The element progLevelMetadata is required and specifies information that applies to the whole MediaProgram. In the sample code above, in the cue point named B, the cueType is "insertPt" which jumps to a cue point (in this case D) while establishing a return point. In B, the target segment is specified within a cpGroup (a cue point group); in this case it has only one target and the association attribute is "default". There is nothing to check and there is only one place to jump. In E, the target segment is a cueType=returnEnd which means it will return to where it came from (rather than goto another target). Further, anytime that no video immediately follows a cue point, the cue point has a contentType="zeroLen" (cue point C is also zeroLen).

TABLE 2 presents an example schema for the Cue Point Language.

TABLE 2

EXAMPLE SCHEMA

```
CPL_v1.0_schema.xsd.xsd
<?xml version="1.0" encodtrig="UTF-8"?>
<xs:schema xmlns:xs="http//www.w3.org/2001/XMLSchema"
    xmlns:mx="http://www.adobe.cm/2006/mxml">
  <xs:import namespace="http://ww.adobe.com/2006/mxml">
  </xs:import>
  <xs:element name="MediaProgram">
    <xs:complexType>
      <xs:sequence>
        <xs:element ref="progLevelMetadata" maxOccurs="1"
        minOccurs="1"/>
        <xs:element ref="cuePoints" maxOccurs="1"
        minOccurs="0"/>
        <xs:element ref="webPoints" maxOccurs="1"
        minOccurs="0"/>
        <xs:element ref="annotations" maxOccurs="1"
        minOccurs="0"/>
        <xs:element ref="layouts" maxOccurs="1"
        minOccurs="0"/>
      </xs:sequence>
    </xs:complexType>
  </xs:element>
  <xs:element name="progLevelMetadata">
```

TABLE 2-continued

EXAMPLE SCHEMA

```
    <xs:complexType>
      <xs:attribute name="xVersionCPL" type="xs:string"
fixed="1.0.0" use="required"/>
      <xs:attribute name="videoSource" type="wwwRefererce"
use="required"/>
      <xs:attribute name="xWebServiceLoc" type="wwwReference"
use="optional"/>
      <xs:attribute name="loggingServce" type="wwwReference"
use="optional"/>
      <xs:attribute name="skinButtons" type="wwwReference"
use="optional"/>
      <xs:attribute name="backgroundTML" type="wwwReference"
use="optional"/>
      <xs:attritute name="videoWidth" type="positiveInteger"
use="optional"/>
      <xs:attritute name="videoHeight" type="positiveInteger"
use="optional"/>
      <xs:attritute name="videoViewLayout" type="cplReference"
use="optional"/>
      <xs:attritute name="webViewLayout" type="cplReference"
use="optional"/>
    </xs:complexType>
  </xs:element>
  <xs:element name="cuePoints">
    <xs:complexType>
      <xs:sequence>
        <xs:element ref="cuePt" maxOccurs="unbounded"
minOccurs="0"/>
      <xs:sequence>
    <xs:complexType>
  </xs:element>
  <xs:element name="webPoints">
  <!--web point are cue points with the cue type set to webPoint and
defined here;
to use them they go in directoryList and targetList elements
        defined in cue points-->
    <xs:complexType>
      <xs:sequence>
        <xs:element ref="cuePt" maxOccurs="unbounded"
minOccurs="0"/>
      <xs:sequence>
    <xs:complexType>
  </xs:element>
  <xs:element name="annotations">
    <!-- this is where to define annotations; to use them
      they go in an annotationList inside a cue point-->
    <xs:complexType>
      <xs:sequence>
        <xs:element ref="annotation" maxOccurs="unbounded"
minOccurs="0"/>
      <xs:sequence>
    <xs:complexType>
  </xs:element>
  <xs:element name="layouts">
    <!-- this is where to define layouts; to use them
      they go in anannotationListinside a cue point-->
    <xs:complexType>
      <xs:sequence>
        <xs:element ref="layout" maxOccurs="unbounded"
minOccurs="0"/>
      </xs:sequence>
    </xs:complexType>
  </xs:element>
  <xs:element name="cuePt">
    <xs:complexType>
      <xs:all>
        <xs:element ref="annotationList" maxOccurs="1"
minOccurs="0"/>
        <xs:element ref="directoryList" maxOccurs="1"
minOccurs="0"/>
        <xs:element ref="targetList" maxOccurs="1"
minOccurs="0"/>
        <xs:element ref="story" maxOccurs="1"
minOccurs="0"/>
      </xs:all>
      <xs:attribute name="name" type ="xs:string" use="required"/>
      <xs:attribute name="cueType" type ="xcueType"
```

TABLE 2-continued

EXAMPLE SCHEMA

```
use="required"/>
        <xs:attribute name="tags" type ="xs:string" use="optional"/>
        <xs:attribute name="interestURL" type ="wwwReference"
use="required"/>
        <xs:attribute name="query" type ="queryForm" use="optional"/>
        <!-- not for webpoints -->
        <xs:attribute name="time" type ="xs:decimal" use="optional"/>
        <xs:attribute name="zeroLen" type ="xs:boolean"
use="required"/>
        <xs:attribute name="cannotskip" type ="xs:boolean"
use="optional" default="false"/>
        <xs:attribute name="pauseOnEntry" type ="xs:boolean"
use="optional" default="false"/>
        <xs:attribute name="modalOnEntry" type ="xs:boolean"
use="optional" default="false"/>
        <xs:attribute name="soft" type ="xs:boolean" use="optional"
default="true"/>
        <xs:attribute name="backgroundHTML" type ="wwwReference"
use="optional"/>
        <xs:attribute name="coincidentWebPoint" type ="cplReference"
use="optional"/>
        <!-- only for webpoints -->
        <xs:attribute name="pauseOnDisplay" type ="xs:boolean"
use="optional" default="false"/>
        <xs:attribute name="webViewLayout" type ="cplReference"
use="optional"/>
      <xs:complexType>
    </xs:element>
    </xs:element name="targetList">
      <xs:complexType>
        <xs:sequence>
          <xs:element ref="target" maxOccurs="unbounded"
minOccurs="1"/>
        <xs:sequence>
        <xs:attribute name="backgroundPicLoc" type ="xs:string"
use="optional"/>
        <xs:attribute name="headerText" type ="xs:string"
use="optional"/>
        <xs:attribute name="operation" type ="xs:string"
use="optional"/>
      </xs:complexType>
    </xs:element>
    <xs:element name="directoryList">
      <xs:complexType>
        </xs:sequence>
          <xs:element ref="target" maxOccurs="unbounded"
minOccurs="1"/>
        </xs:sequence>
        <xs:attribute name="headerText" type ="xs:string"
use="optional"/>
      </xs:complexType>
    </xs:element>
    <xs:element name="annotationList">
      <xs:complexType>
        <xs:sequence>
          <xs:element ref="target" maxOccurs="unbounded"
minOccurs="1"/>
        </xs:sequence>
      </xs:complexType>
    </xs:element>
    <xs:element name="annotation">
      <xs:complexType>
        <xs:all>
          <xs:element ref="target" maxOccurs="1"
minOccurs="1"/>
          <xs:element ref="story" maxOccurs="1"
minOccurs="1"/>
        </xs:all>
        <xs:attribute name="name" type ="xs:string" use="required"/>
        <xs:attribute name="clickBehavior" type ="xClickBehavior"
use="required"/>
        <xs:attribute name="x" type ="xs:decimal" use="required"/>
        <xs:attribute name="y" type ="xs:decimal" use="required"/>
        <xs:attribute name="skipOnReturn" type ="xs:boolean"
use="optional" default="false"/>
        <xs:attribute name="showIcon" type ="xs:boolean"
use="optional" default="false"/>
      </xs:complexType>
```

TABLE 2-continued

EXAMPLE SCHEMA

```
    </xs:element>
    <xs:element name="layout">
      <xs:complexType>
        <xs:attribute name="videoHeight" type ="xs:string"
use="optional"/>
        <xs:attribute name="videoVCenter" type ="xs:string"
use="optional"/>
        <xs:attribute name="videoTop" type ="xs:string"
use="optional"/>
        <xs:attribute name="videoBottom" type ="xs:string"
use="optional"/>
        <xs:attribute name="videowidth" type ="xs:string"
use="optional"/>
        <xs:attribute name="videoHCenter" type ="xs:string"
use="optional"/>
        <xs:attribute name="videoLeft" type ="xs:string"
use="optional"/>
        <xs:attribute name="videoRight" type ="xs:string"
use="optional"/>
        <xs:attribute name="webHeight" type ="xs:string"
use="optional"/>
        <xs:attribute name="webVCenter" type ="xs:string"
use="optional"/>
        <xs:attribute name="webTop" type ="xs:string"
use="optional"/>
        <xs:attribute name="webBottom" type ="xs:string"
use="optional"/>
        <xs:attribute name="webWidth" type ="xs:string"
use="optional"/>
        <xs:attribute name="webVCenter" type ="xs:string"
use="optional"/>
        <xs:attribute name="webLeft" type ="xs:string"
use="optional"/>
        <xs:attribute name="webRight" type ="xs:string"
use="optional"/>
      </xs:complexType>
    </xs:element>
    <xs:element name="target">
      <xs:complexType>
        <xs:attribute name="cuePointRef" type ="xs:cplReference"
use="required"/>
        <xs:attribute name="association" type ="xs:string"
use="optional"/>
      </xs:complexType>
    </xs:element>
    </xs:element name="story">
      <xs:complexType>
        <xs:attribute name="balloonText" type ="xs:string"
use="optional"/>
        <xs:attribute name="picLoc" type ="xs:string"
use="optional"/>
        <xs:attribute name="picOverLoc" type ="xs:string"
use="optional"/>
      </xs:complexType>
    </xs:element>
    <xs:simpleType name="xCueType">
      <xs:restriction base="xs:string">
        <xs:enumeration value="regular" />
        <xs:enumeration value="programEnd" />
        <xs:enumeration value="returnEnd" />
        <xs:enumeration value="goto" />
        <xs:enumeration value="userChoice" />
        <xs:enumeration value="webPoint" />
        <xs:enumeration value="overlay" />
        <xs:enumeration value="insertPt" />
      </xs:restriction>
    </xs:simpleType>
    </xs:simpleType name="xClickBehavior">
      <xs:restriction base="xs:string">
        <xs:enumeration value="regular" />
        <xs:enumeration value="decoration" />
        <xs:enumeration value="returnEnd" />
      </xs:restriction>
    </xs:simpleType>
    <xs:simpleType name="queryForm">
      <xs:restriction base="xs:string">
        <xs:pattern value="((\S+)((\+S+)*))*" />
      </xs:restriction>
```

TABLE 2-continued

EXAMPLE SCHEMA

```
        </xs:simpleType>
        <!-- reference to a www resource. e.g. an image,
HTML file, SWF, ect. -->
        </xs:simpleType name="wwwReference">
            <xs:restriction base="xs:string">
            </xs:restriction>
        </xs:simpleType>
        <!-- reference to a CPL entity. e.g. a cue point, web point,
annotation, or layout element -->
        <xs:simpleType name="cplReference">
            <xs:restriction base="xs:string">
            </xs:restriction>
        </xs:simpleType>
</xs:schema>
```

6. Playing Video and Linked Media (the Coincident Player)

6.1 Trick Play Functions, Timeline, Always-Available Web Link

Figure 11:
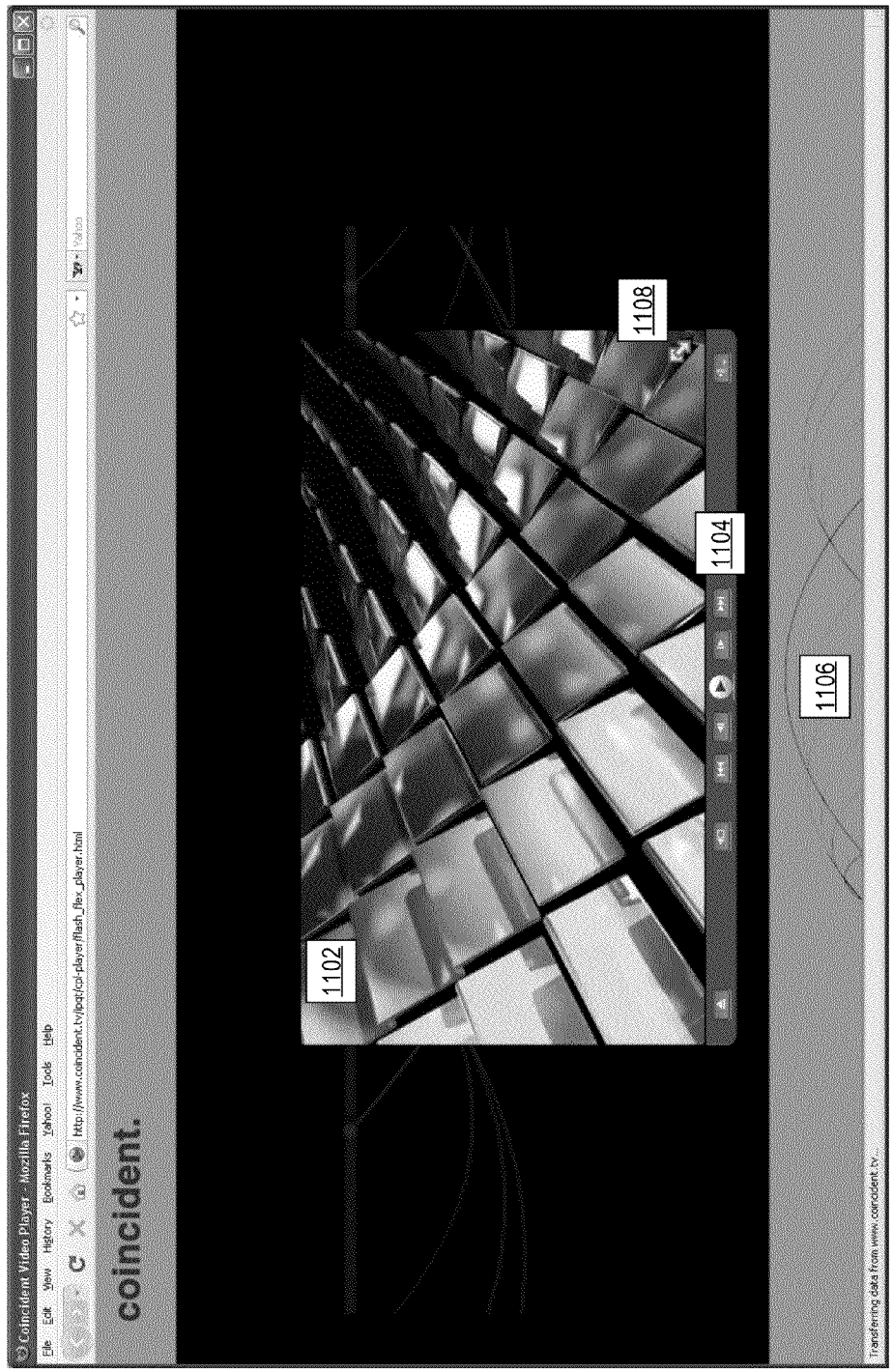
FIG. 11 illustrates an example screen display that illustrates a player screen that may be generated and displayed in a computer display unit by metadata-capable video player logic.

FIG. 11 illustrates an example screen display that illustrates a player screen that may be generated and displayed in a computer display unit by metadata-capable video player logic. The video display unit may comprise a computer monitor, video monitor, digital TV, CRT, or other display unit that is driven from an appropriate output of computer 102.

In various embodiments, the player screen display may be implemented as an application that is displayable within a web browser, or using standalone application program logic; in either case the player is not video specific and will work with various existing video formats (Flash, Silverlight, QuickTime, etc.) and can be adapted to new video formats as they are defined.

Figure 20:
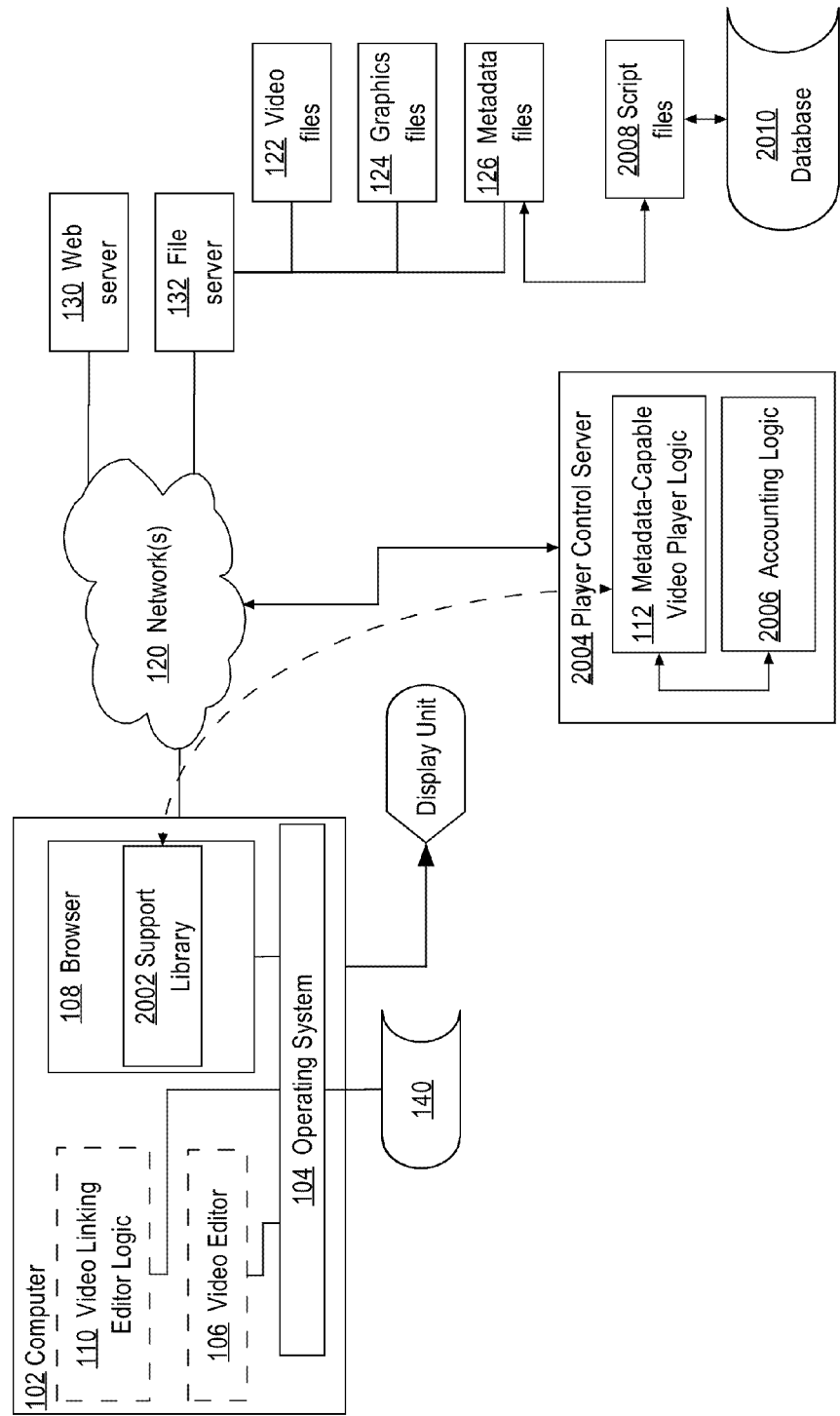
FIG. 20 illustrates an example arrangement of digital computer elements that can be used to implement certain embodiments with a browser-based player for enriched video programs.

FIG. 20 illustrates an example arrangement of digital computer elements that can be used to implement certain embodiments with a browser-based player for enriched video programs. In an embodiment, a computer 102 is coupled directly or indirectly through one or more networks 120 to a web server 130 and optionally to a file server 132. In various embodiments, network 120 may comprise a local area network (LAN), wide area network (WAN), an internetwork, or a combination. Web server 130 hosts one or more video files, HTML documents, HTTP servers or application servers, or other web content. File server 132 stores or hosts video files 122, graphics files 124, and metadata files 126, which may include or be associated with HTML and browser executable program code, such as JavaScript code. Optionally file server 132 stores or hosts script files 2008 that can issue queries to a database 2010 and automatically generate the contents of one or more metadata files 126 based on result sets received from the database in response to the queries.

Computer 102 hosts or executes an operating system 104 that supervises I/O, storage management, and execution of application logic. In an embodiment, computer 102 optionally comprises a video editor 106; as indicated by broken lines, the video editor may be omitted. In an embodiment, computer 102 comprises a browser 108 that hosts or can access a support library 2002. Commercially available examples of support library 2002 include Macromedia Flash and Silverlight.

In an embodiment, computer 102 is coupled to storage 140, which broadly represents any data storage device, storage area network (SAN), network attached storage (NAS), or network file system (NFS) unit or server. Storage 140 may reside on network 120 or on a server coupled to the network. Storage 140 stores application programs but is not required to store video files or metadata files; instead, video files may be received through streaming video delivery from file server 132 and metadata files 126 may be received on the fly directly to browser 108 or support library 2002 under control of an instance of metadata-capable video player logic 112.

In an embodiment, computer 102 optionally comprises video linking editor logic 110, which may be omitted entirely as indicated by broken lines. In an embodiment, a separate player control server 2004 comprises metadata-capable video player logic 112 and may comprise accounting logic 2006. The metadata-capable video player logic 112 is generally configured to open metadata files and associated video files, and to play the video files while interpreting and responding to links and related information and instructions in the associated metadata files. Other more specific functions of metadata-capable video player logic 112 are described in other sections herein. In an embodiment, player control server 2004 controls delivery of instances of the player logic 112 to authorized clients, and in certain embodiments interactions with accounting logic 2006 determine whether a particular client in the form of computer 102 can receive an instance of the player logic. Additionally or alternatively, accounting logic 2006 determines amounts for invoices, other billing, or other charges to a video producer, studio, content owner, or other party that owns or controls the file server 132 and its contents.

In another embodiment, computer 102 comprises player logic 112 and does not have an editor such as editor logic 110; such an embodiment might be used by an end user who is viewing video programs that have been prepared by someone else, and who does not use a browser to view video programs based on receiving the player logic over a network from a server computer as described above.

In one embodiment, an end user or viewer invokes browser 108 and connects to web server 130, which offers links to play audiovisual media such as video files 122. The viewer selects a link for a particular video file 122. In response, the browser 108 downloads from the file server 132 one or more elements of HTML and browser executable program code, such as JavaScript code, which the browser executes. Consequently, the browser 108 renders a page in the display unit of computer 102. The rendered page includes code to invoke an instance of metadata-capable video player logic 112. The player logic 112 accesses one or more metadata files 126, and accesses video files 122. The video files 122 may be on file server 132, or stored in another networked location, or on a third party server or quasi-public hosting site such as YouTube. Based on instructions in the associated metadata files 126, the player logic 112 then streams the video files 122 and provides metadata from metadata files 126 to the support library 2002 of browser 108. As a result, one or more of the player screen displays described herein appears and can play video within the browser 108 in the manner described herein.

In an embodiment, each time that browser 108 invokes use of the player logic 112 data is recorded at the player control server 2004, or at a third party server site, to indicate the invocation. Invocation data may include data identifying a referring web site, that is, the web site at which the end user selected a video for playing, such as web server 130. Invocation data also may identify a producer of the video, if the producer is different than the owner or operator of the referring web site.

In an embodiment, the end user of computer 102 may be denoted a first party; a second party may own or operate web server 130 at which the first party selects videos for playing, and the second party may comprise a producer of the videos; and a third party may owner or operate the player control server 2004 and may control delivery and use of instances of the player logic 112, and may be entitled to payment from the second party for each use of the player by the first party or each stream that the player facilitates delivering from the second party to the first party. Thus, a copy of the player logic 112 or other browser executable code may be delivered from the third party to first party browsers only a specified maximum number of times per day, week, month or year in consideration for payment of a specified fee attributable to each day, week, month or year. In an embodiment, if the specified maximum number of first party video player invocations is reached, then the third party may cease providing additional first parties with access to the browser executable code that implements or accesses the player. Additionally or alternatively, the third party may deliver the browser executable code to an unlimited number of first parties who select videos at the second party's web site and may invoice the second party for a variable amount that is based upon or proportional to the actual number of first parties.

In this arrangement, the invocation data is recorded in a database that is owned or operated by the third party. The third party configures one or more computer programs to periodically analyze or compile invoicing data from the database, based on the number of streams that the second party delivered using the player or the number of first parties who connected and used the player. Based on the data analysis or compilation, the third party may invoice the second party. In all such arrangements, the third party retains control over use of the metadata-capable video player logic 112 and its use by second party producers or first party end users, and the third party is entitled to collect fees or revenue from one or more of the second party and/or the first party in consideration for the use of the metadata-capable video player logic 112 to provide enriched videos to end users.

In another embodiment, computer 102, logic 112, and a video display unit may form a special-purpose computer performing the functions described herein.

In one embodiment, a player as in FIG. 11 comprises a video display window 1102, a control bar comprising trick play icons 1104, a timeline 1106, and a web hyperlink 1108. The video display window 1102 displays a video segment of a media program. The trick play icons 1104 may be selected through user input from a pointing device or remote control. In one embodiment, trick play icons 1104 provide functions for video playback, fast forward at one or more speeds, and rewind at one or more speeds. Other controls may be provided including an end playback or "eject" control, an audio volume adjustment control, and a video window size control.

In an embodiment, the timeline 1106 provides a graphical indication of the player's current position within a video segment, the position of cue points, and the relationship of branches to other cue points and other video segments. For example, in one embodiment the timeline 1106 graphically displays cue points as dots or circles, branches to other cue points as arcs, and video segments as straight lines. The lines, dots, and arcs are arranged in a temporal order so that the first video segment is arranged at the far left side of the display and the last cue point of the last video segment to which a branch can occur is displayed at the far right. As the player plays video, a graphical icon in the timeline 1106 moves from left to right in proportion to the time that has elapsed during playback or the amount of video that has been played. As cue points are reached and branches are traversed, the player logic 112 modifies the video display unit to update the timeline to indicate a user's current logical position in a media program as a physical icon shown among the lines, arcs and dots. Therefore, the timeline 1106 enables a user to visually identify upcoming cue points, branches, and branch destinations.

In an embodiment, web hyperlink 1108 is continuously displayed in the screen display in an overlay manner over any video program that is shown in video window 1102. Thus, the web hyperlink 1108 is always available during operation of the player logic 112. In an embodiment, selecting the web hyperlink 1108 causes the player logic 112 to modify the display unit so that the video display window 1102 is redisplayed in a reduced size format, for example, in a small rectangular window at the bottom right corner of the screen display. Further, the video display window is overlaid on a web browser window that displays web content associated with the web hyperlink 1108. In this manner, the player logic 112 appears to generate a picture-in-picture form of display in which the background picture shows web content and the foreground, reduced size picture shows the video program. The video program continually runs during such a transition.

In an embodiment, the screen display of FIG. 11 further comprises a TV button which, when selected, causes the player logic 112 to restore the video display window 1102 in a large size as seen in FIG. 11 and to discontinue displaying web content.

6.2 Keyboard Controls

In an embodiment, computer 102 uses either a remote control or a computer keyboard to provide user input to the metadata-capable video player logic 112.

In an embodiment, user input selecting hot keys on the keyboard results in controlling playback. In an embodiment, the following key commands cause the metadata-capable video player logic 112 to perform the following functions:

| KEY | COMMAND - FUNCTION |
| --- | --- |
| B | Browse for a file to open |
| Left arrow | Move one chapter back based on the cue points; this command always lands on a chapter boundary (unlike ","). In an embodiment, all back commands implement a "close" behavior: if the user is within a short time from a preceding chapter boundary then the user is presumed to be moving to the previous chapter boundary rather than the current one. |
| Right arrow | Move one chapter forward |
| P | Play/Pause toggle |
| , | Video Back. If the user is 10 seconds into chapter A and jumped to B, then a video back command (",") before the end of B would cause the logic 112 to move the player head to the point in time that the user started from in A. Implements "close" as described above. |
| S | Stop |
| 1 | Jump back |
| 4 | Jump back more |
| 3 | Jump forward |
| 6 | Jump forward more |
| 7 | Fast reverse, each push increments the speed; these are buggy, jumpy stopgaps |
| 9 | Fast forward, each push increments the speed; these are buggy, jumpy stopgaps |
| W | Move to web. In an embodiment, whenever video is playing a "W" command causes the player logic 112 to initiate displaying associated webcontent, and the video is reduced to a picture-in-picture size. Whenever the web content is on the screen, a "TV" button is displayed which when selected causes moving the user back to full screen video. When the W button is pushed, if the cue point has an interestURL, it is used, if not, and if a query exists, it is used as the basis of a search engine query, if no web specification exists (both interestURL and query attributes are blank) the W button provides a blank search engine query page. The appearance of the W button changes to reflect the existence of nothing, a query, an interestURL or an optional, cue point specific directory to guide browsing. |

6.3 Playback Applications

Various embodiments facilitate production of enriched audiovisual programs that combine Internet web content and video content. Examples of playback applications are now described.

Figure 13A:
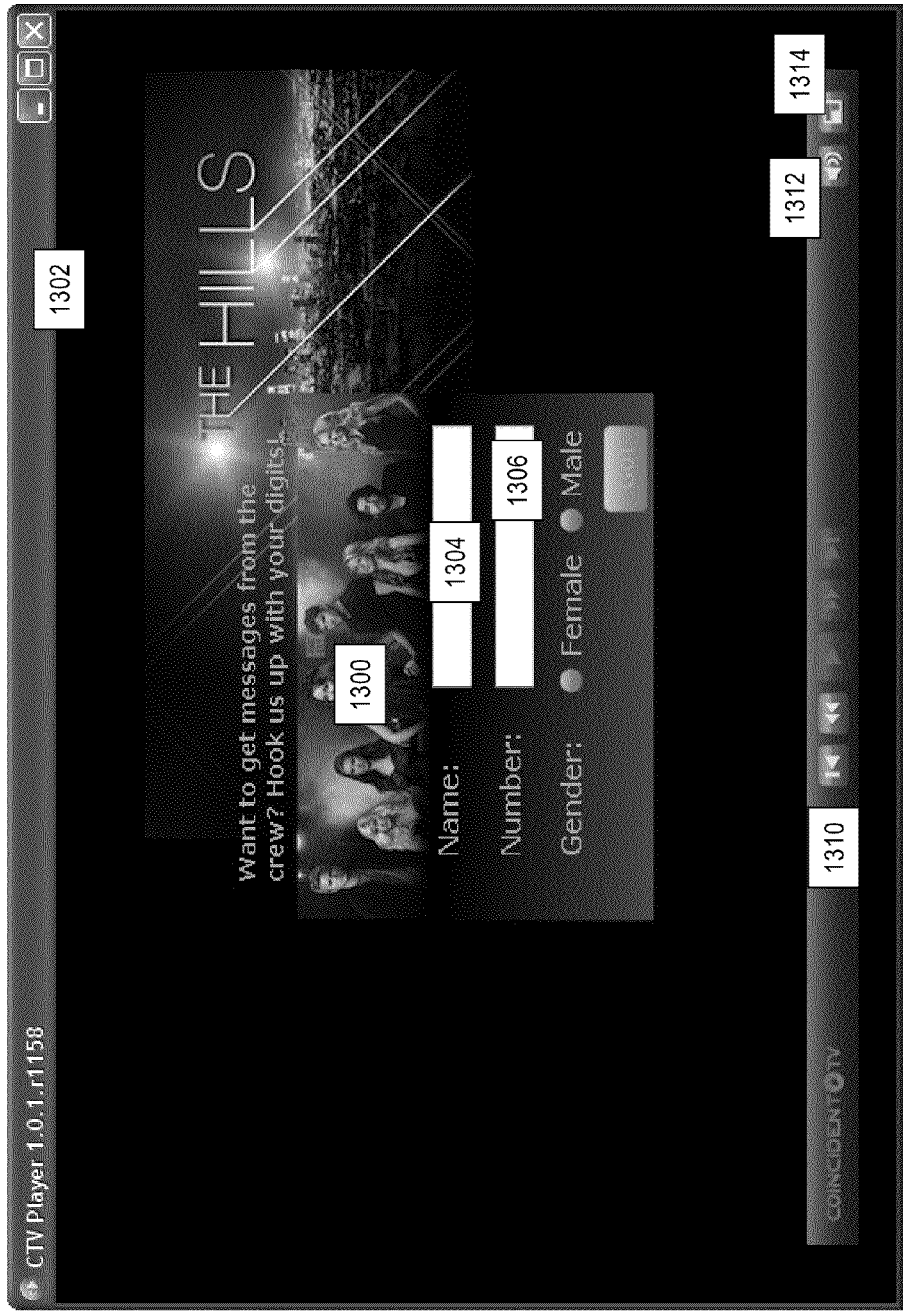
FIG. 13A illustrates an annotation coupled to a web service providing automated text messaging in association with an enriched video program.

FIG. 13A illustrates an annotation coupled to a web service providing automated text messaging in association with an enriched video program. In an embodiment, metadata-capable video player logic 112 displays a player window 1302 on a computer desktop or within a browser. Player logic 112 is configured to generate the player window 1302 and to facilitate the functions that are further described herein for FIG. 13A. Player window 1302 includes playing, segment, and chapter navigation buttons 1310 which when selected cause playing a video segment, performing trick play functions, or skipping to other defined chapters.

Figure 17A:
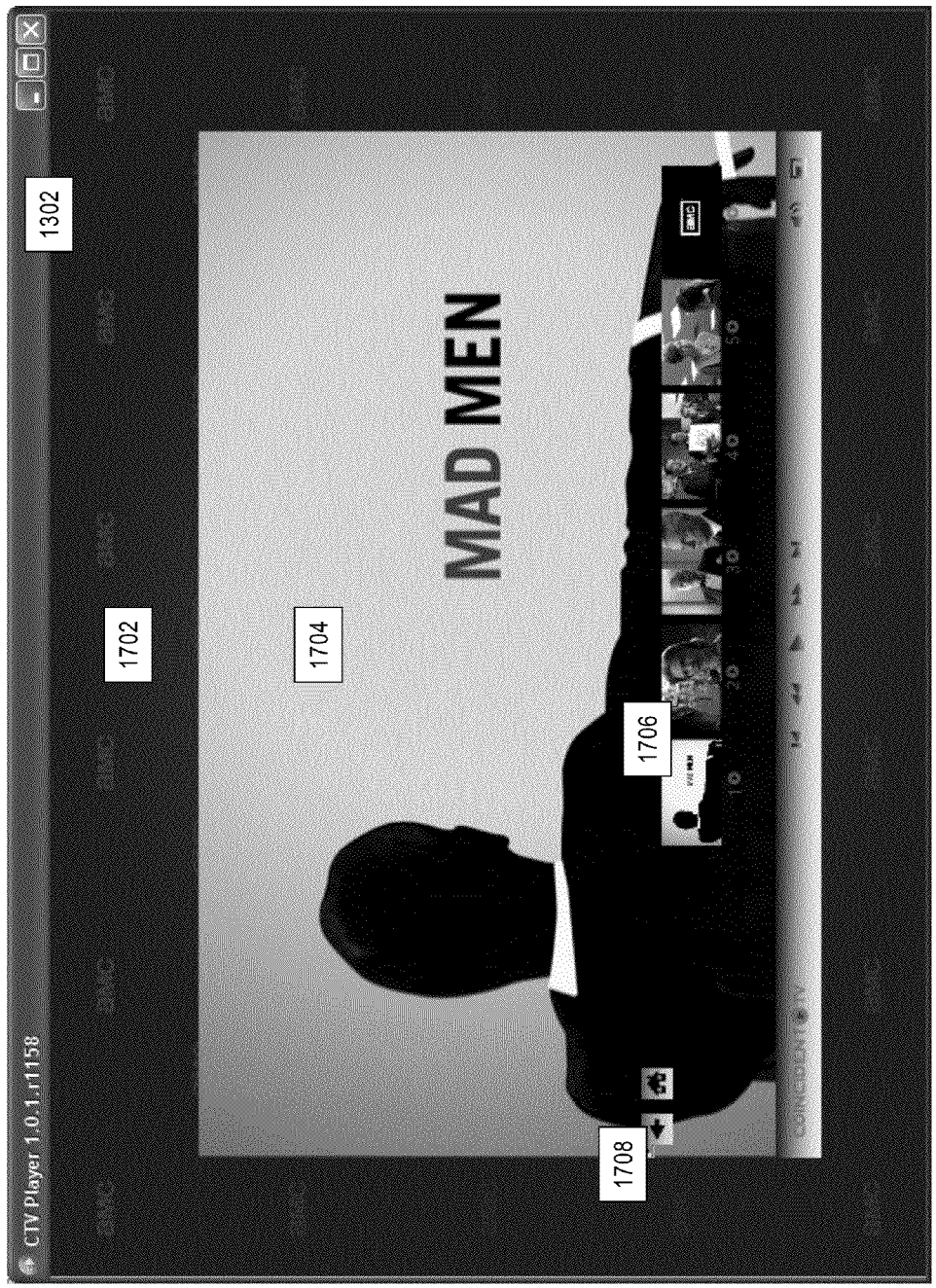
FIG. 17A illustrates an example of playing an enriched audiovisual program with annotations that implement chapter selections.

In an embodiment, buttons 1310 may be associated with an HTML document that applies a specialized appearance or skin to the buttons 1310. In an embodiment, skinning buttons 1310 is performed using the editor logic 112 to display editor window 2102 (FIG. 21), selecting the Metadata tab 2112, selecting a Skin Buttons field and entering an HTML URL. With button skinning, buttons 1310 may have a different appearance in different videos at playback; for example, comparing FIG. 13A, FIG. 17A shows buttons 1310 with different styles and appearance.

Player window 1302 includes an audio icon 1312 which when selected causes muting sound from the video and a full screen icon 1314 which when selected causes displaying the video in full screen mode. In response to appropriately defined annotations and cue points associated with a video program, which in this example is an excerpt from a program named "The Hills," metadata-capable video player logic 112 causes displaying an annotation 1300 that prompts a viewer to enter a viewer's name, phone number, and gender in data entry fields 1304, 1306, and using radio buttons. In an embodiment, when a viewer enters values in the fields and selects the Go button, metadata-capable video player logic 112 temporarily stores the values in memory for referencing and use by other logic when a particular cue point is reached that calls for invoking a text messaging function.

Figure 13B:
FIG. 13B illustrates a frame of an enriched video program as displayed in a player window.

FIG. 13B illustrates a frame of an enriched video program as displayed in a player window. In an embodiment, player window 1302 as previously seen in FIG. 13A is displaying a video segment depicting a character 1320 who is using a text messaging device 1322. In the example of FIG. 13B, player window 1302 further comprises show and character icons 1324, web site icons 1326, and service icons 1328. In an embodiment, a cue point associated with an invocation of a web service may be defined for a time point of the frame illustrated in FIG. 13B. When the video program is played and the frame illustrated in FIG. 13B is reached, the metadata-capable video player logic 112 is configured to invoke a web service that can retrieve the stored value of the phone number that was received as user input at FIG. 13A, and dispatch a specified text message to that phone number. The specified text message may comprise information appearing to come from character 1320. The video editor linking logic 110 may be used to define the cue point that can cause a specified text message to be sent automatically when the cue point is reached during playback.

In an embodiment, show and character icons 1324 each comprise a graphical image that is associated with an annotation. In an embodiment, a first one of the show and character icons 1324 is an annotation associated with a URL for a web site of the show, which in the example of FIG. 13B is the MTV show "The Hills," that provides further information about the show. In an embodiment, second and third ones of the show and character icons 1324 each comprise annotations that are associated with sequences of video segments relating to the characters that are depicted in the icons. In the example of FIG. 13B, selecting the "Heidi" icon causes the metadata-capable video player logic 112 to branch within the associated metadata file 126 to a point associated with a sequence of video segments that feature the character "Heidi." Playing the video program then continues with the sequence of segments that feature "Heidi." Similarly, selecting the "Audrina" icon causes the metadata-capable video player logic 112 to branch within the associated metadata file 126 to a point associated with a sequence of video segments that feature the character "Audrina."

In an embodiment, web site icons 1326 provide linkages to Internet sites that feature social networking and other services. For example, in an embodiment the video linking editor logic 110 may be used to create an annotation, symbolized by a Twitter icon, which is associated with the Twitter service and a web service to invoke the Twitter service. Thus, in one example embodiment, at playing time, when a viewer selects the Twitter icon, the metadata-capable video player logic 112 generates and displays a new window that contains a feed of Twitter posts relating to the video program of FIG. 13B. The other web site icons 1326 similarly each comprise an annotation that is associated in metadata files 126 with a web service, URL or other reference to executable code that can cause integration and use of the web service that is represented by the icon.

In an embodiment, each of the service icons 1328 is an annotation represented by a graphic image that provides access to an external service or web site. For example, in one embodiment, a music purchase icon may comprise an annotation that is associated with a web site that features downloads of songs, as further described herein for FIG. 14. In an embodiment, a commercial sponsor icon may comprise an annotation that is associated with a commercial advertising web site or online information about a commercial product. Additionally or alternatively, the target of an annotation that is displayed as a commercial sponsor icon may be a video program segment comprising a commercial for a specified product. In the example of FIG. 13B, selecting the Dos Equis service icon causes the metadata-capable video player logic 112 to branch to and play a video segment containing a commercial for Dos Equis brand beer.

FIG. 14 illustrates a frame of a video program having a highlighted service icon. In the example of FIG. 14, video window 1302 is displaying a frame 1402 of a program that includes background music at the time of playback. A first service icon 1404 comprises an annotation that is associated with a highlighted graphic image as indicated by short lines radiating from the icon; in contrast, in the example of FIG. 13B, the same one of the service icons 1328 is not highlighted. In the example of FIG. 14, the highlighted icon signifies that the song that is then currently playing in the background of the scene of frame 1402 is available for purchase or downloading. If a viewer selects the first service icon 1404, then in response, the metadata-capable video player logic 112 accesses and displays a web site that offers the associated song for downloading or purchase. To implement such a function, an author may use video linking editor logic 110 to associate a specified web service, URL, or program code with an annotation and graphic image for the service icons 1328. The URL may be a complex URL that includes a domain name, service name or script name, and one or more embedded parameters or attributes. For example, an attribute of the URL may be set equal to a file name for the song that is known to play at the associated cue point. Thus selecting the first service icon 1404 causes the metadata-capable video player logic to invoke the URL specified in an associated annotation, effectively passing the name of the then-currently playing song to a third party web site, which extracts the song name and can offer the song identified in the parameter for purchase or downloading.

FIG. 15A illustrates an annotation that provides a user choice. In the example of FIG. 15A, video window 1302 displays a plurality of annotations 1502 in a video window 1506. First, second, and third annotations labeled Heidi, Spencer and Audrina are associated with static graphic images of the named characters and are linked to a target cue point for a sequence of video segments that feature the associated character. A fourth annotation comprises a graphical image prompting the user to select one of the characters as a favorite character. In response to user input selecting one of the first, second or third annotations labeled Heidi, Spencer or Audrina, metadata-capable video player logic 112 branches within the metadata files 126 to instructions associated with playing a sequence of video segments that feature the selected character. For example, if Spencer is selected then the metadata-capable video player logic 112 branches and begins playing a first segment of video featuring the Spencer character, as represented by the frame of FIG. 13B.

In an embodiment, when a particular character is selected as a favorite character, then the video segments featuring that particular character are also authored to include annotations identifying the other, non-selected characters, for possible future selection. For example, as seen in FIG. 13B, in a video segment in which Spencer has been selected as featured character, the show and character icons 1324 display only icons for annotations associated with other characters, namely Audrina and Heidi.

In contrast, FIG. 15B illustrates a frame of a video segment in a sequence for which Audrina is the featured character; therefore, show and character icons 1324 depict Heidi and Spencer, but not Audrina, and the icons are associated with annotations which, when selected, cause playing sequences of video segments featuring Heidi or Spencer, respectively. FIG. 15B also illustrates different service icons 1328 in which a third service icon is associated with a different commercial product or retailer. Thus, an author using video linking editor logic 110 may define different annotations in the position of service icons 1328 for different commercial products, merchants, retailers, or other web sites or service providers in association with different cue points arising at different time points in a program. For example, an annotation associated with a graphic image or icon depicting a first merchant or product may be associated with a cue point at the start of a first scene of a video program that somehow involves, uses or shows the associated product, which a second merchant, product or service may be associated with a second cue point at another point in the program that shows, uses or involves the second merchant, product or service.

Figure 16:
FIG. 16 illustrates concurrent playing of an enriched video program and displaying an associated web page.

FIG. 16 illustrates concurrent playing of an enriched video program and displaying an associated web page. The video player window 1302 comprises a video window 1602 that is overlaid on a browser window 1610. The video window 1602, in the example of FIG. 16, is displayed in reduced size but contains the same navigation icons 1310 as in FIG. 13A. The video window 1602 is configured to play a streaming video program. The metadata-capable video player logic 112 is configured to concurrently cause playing a streaming video program in the video window 1602 and to display a web page 1612 associated with the video.

For example, an author using the video linking editor logic 110 may define a cue point at the frame shown in FIG. 16, which is from a title scene in the show "Glee" that depicts the names of actors who portray characters in the show. At the frame of FIG. 16, the name of actor "Cory Monteith" is displayed. A cue point may associate the time of that frame with a URL for an Internet Movie Database (IMDB) page containing information for the named actor. As the video continues to play in video window 1602, the metadata-capable video player logic 112 may reach other cue points referencing other URLs. At each cue point, the metadata-capable video player logic 112 accesses a referenced URL and causes the browser window 1610 to display the referenced web page. In this manner, cue points defined for a video segment can cause web content to be "pushed" to a browser window that underlies the video window. Content in the browser window thus changes dynamically as the video plays and as specified cue points are reached by the player.

The foregoing applications and others provide the capability to display video over web content or to display web content in association with video in entirely new and different ways. As a first example, embodiments provide the capability to display video in a "picture in picture" layout in which a video plays in a video window 1602 that is reduced in size in comparison to a browser window 1610 that is concurrently showing related web content. The metadata-capable video player logic 112 is configured to allow the end user to watch video and scroll web content in the same screen without tabs or special windows. The author of the metadata files 126 for the program has control of whether the video in video window 1602 plays or pauses, and what is rendered in the video window 1602 and the browser window 1610.

For purposes of illustrating a clear example, FIG. 16 shows a first rectangle comprising video window 1602 and a second rectangle comprising browser window 1610. In other embodiments, any number of rectangular display areas for video or browser content may be provided.

As another example, annotations can be configured so that invoking the Twitter web site icon 1326 causes the metadata-capable video player logic 112 to display a third rectangle to the right of the video window 1602, while maintaining a display of the browser window 1610 conceptually behind the other rectangles or windows. The third rectangle displays a feed of Twitter posts using HTTP data transfers and rendering of HTML within the third rectangle. In this manner, a streaming video may be played at the same time that an HTML window is dynamically updated. Both the video window 1602 and the browser window 1610 have equal conceptual weight within the player window 1302.

FIG. 17A illustrates an example of playing an enriched audiovisual program with annotations that implement chapter selections. Player window 1302 displays a graphical background 1702 that surrounds a video window 1704 that displays a video program, based on an associated metadata file 126. A plurality of enriched program navigation icons 1708 and chapter selection images 1706 are displayed over the video in the video window 1704. In an embodiment, each of the enriched program navigation icons 1708 and chapter selection images 1706 is an annotation as described herein, associated with a particular position, graphic image or animation, and operational behavior. In an embodiment, enriched program navigation icons 1708 include a Back navigation icon and a Home navigation icon, comprising annotations that associate static graphical images. Selecting the Back navigation icon causes the metadata-capable video player logic 112 to branch to a prior video program that was previously played or a web page that had been previously displayed in a browser window area of the player window 1302. Selecting the Home navigation icon causes the logic 112 to branch to a starting video segment representing a home position of the video program.

The chapter selection images 1706 each represent an annotation that is associated with a branch to a different cue point in the video program associated with a different video segment for a chapter, episode, or other discrete video element. During playing, selecting one of the chapter selection images 1706 causes the player logic 112 to branch to and start playing an associated video segment.

The example of FIG. 17A indicates an aspect of the flexibility inherent in the concept of annotations as described herein. Both the icons 1706, 1708 can be represented using annotations that define different positions, graphic images and operational behavior. However, even though the annotations are different, an author is not required to learn and use a large number of different programming techniques; instead, the same features and functions are used to define all the annotations.

Figure 17B:
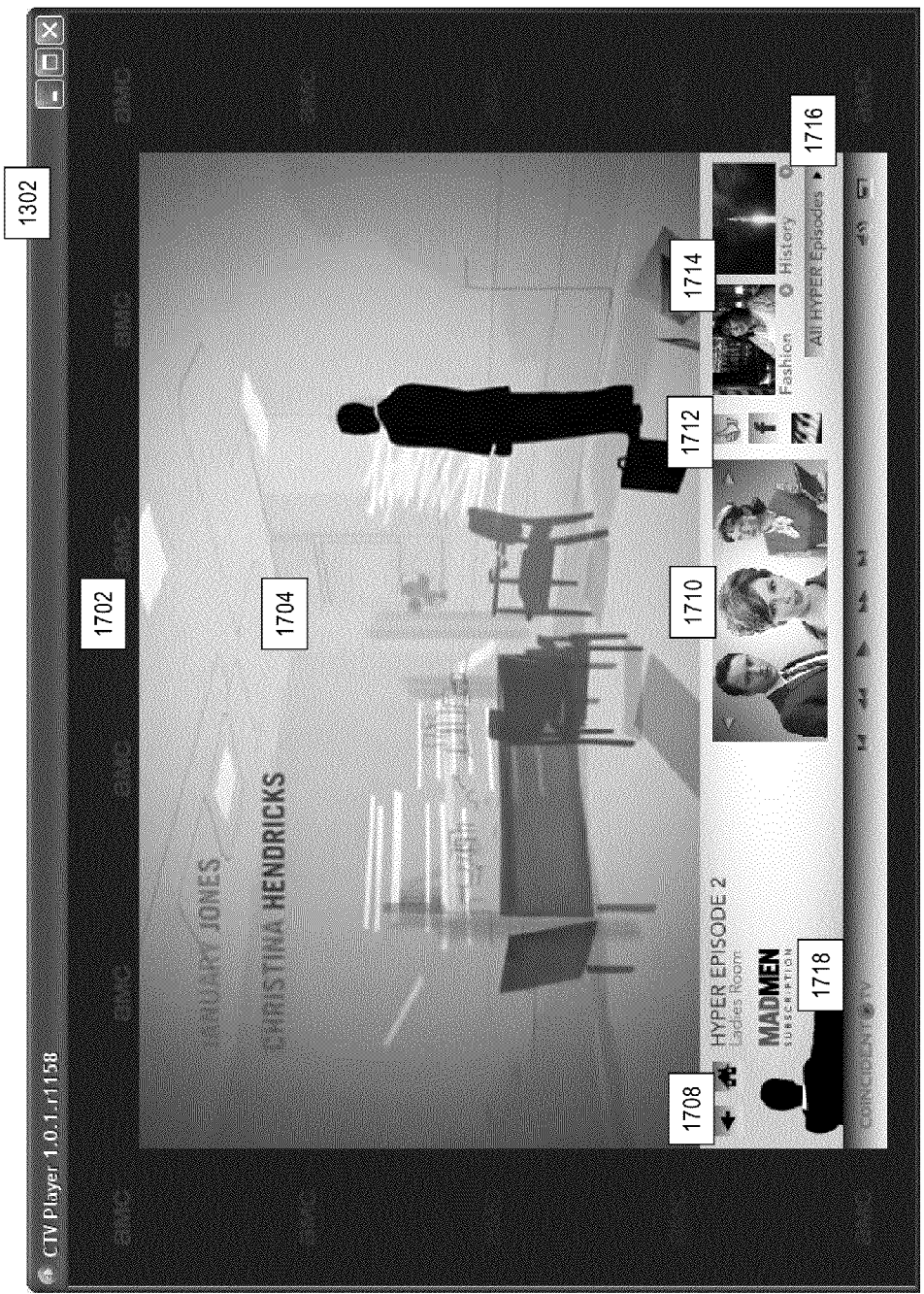
FIG. 17B features a navigation animation, web integration icons, topic launch icons, and menu access link.

FIG. 17B illustrates playing an audiovisual program in which annotations have multiple different forms and provide multiple different functions. In an embodiment, player window 1302 comprises the graphical background 1702, video window 1704, and enriched program navigation icons 1708 as described for FIG. 17A. Additionally FIG. 17B features a navigation animation 1710, web integration icons 1712, topic launch icons 1714, and menu access link 1716. In an embodiment, navigation animation 1710 represents an annotation that is associated with an animated graphical object and a plurality of cue points for each of a plurality of characters shown in the animation at different positions within the animation. For example, during playing, a viewer can use a pointing device to cause a cursor to hover over the navigation animation 1710, and in response, the navigation animation scrolls graphically left or right in response to movement of the pointing device. Selecting a particular region showing a particular character causes the player logic 112 to branch to a chapter of the video program that features the selected character.

The web integration icons 1712 each represent an annotation that is associated with a static graphical image and an interactive operation relating to web content. For example, a Facebook icon represents an annotation that defines a link to a Facebook page for the program shown in the video window 1704. During playing the program in the video window 1704, selecting the Facebook icon causes the player logic 112 to redisplay the video window 1704 in smaller form and to access and display a Facebook page for the program in a browser window that is conceptually or logically under the video window 1704. The topic launch icons 1714 represent annotations that define branching behavior to other video program segments relating to topics such as costumes used on the program or show and the history of the show. Additionally or alternatively, one or more of the topic launch icons 1714 may be associated with a web page; thus, selecting one of the topic launch icons can result in either playing a video segment or displaying web content in a browser window under the video window.

In an embodiment, menu access link 1716 represents an annotation associated with branching behavior that causes the player logic 112 to branch to code in a metadata file 126 that causes displaying a list or menu of a plurality of video program episodes that are collected or associated with a subscription. In an embodiment, during playing, selecting the menu access link 1716 causes the player logic 112 to display a video window having the form of FIG. 17C.

Figure 17C:
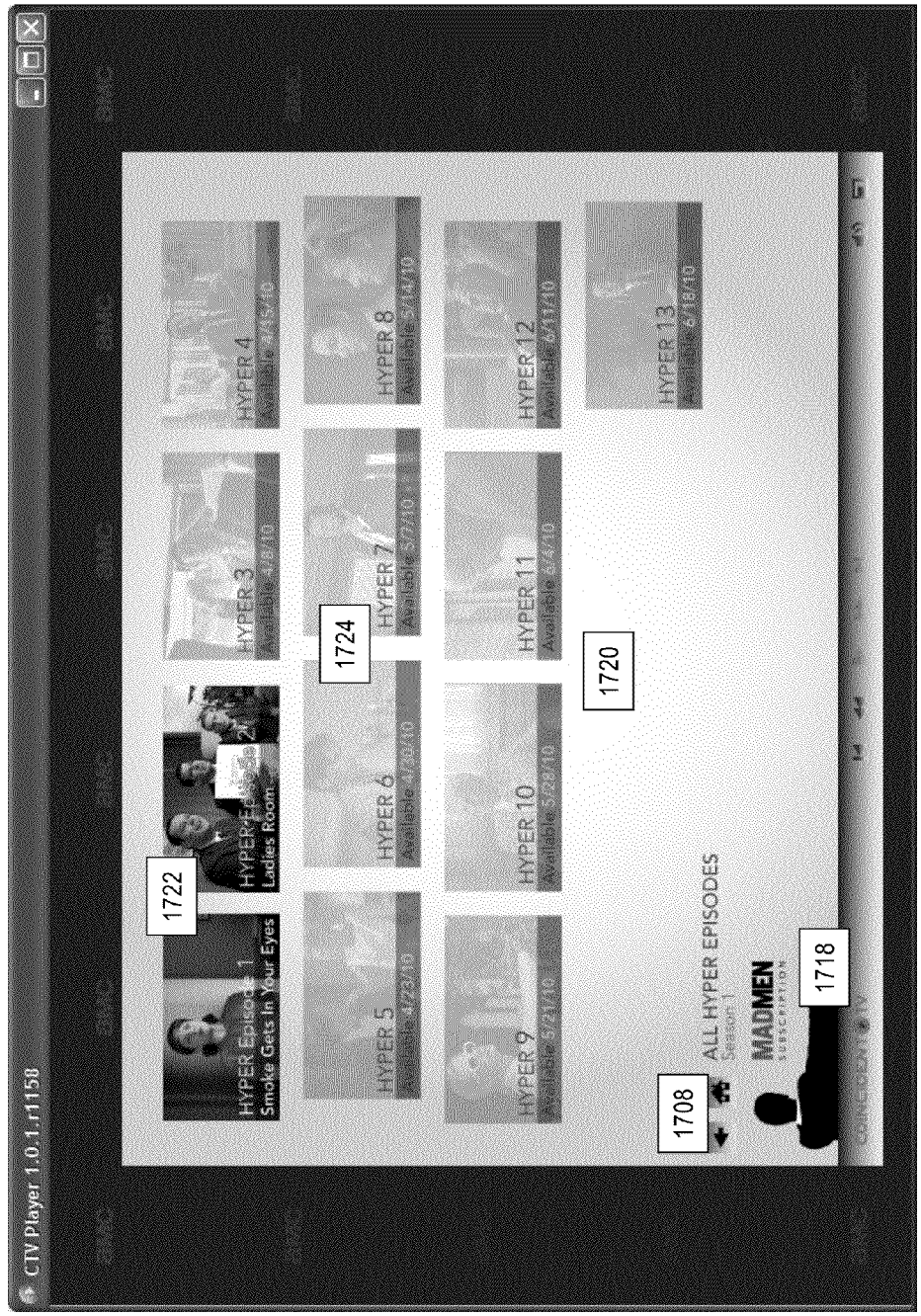
FIG. 17C illustrates a video window providing a menu of episodes in a collection or associated with a subscription.

FIG. 17C illustrates a video window providing a menu of episodes in a collection or associated with a subscription. The nature and use of subscriptions for video programs is further described below. In an embodiment, video window 1720 comprises a plurality of available episode icons 1722 and a plurality of unavailable icons 1724. "Available," in this context, means released by a producer or program owner for viewing by viewers who have purchased or otherwise validly accessed a subscription, and "unavailable" means not yet released and normally planned for the future.

An available episode icon 1722 represents an annotation that is associated with a static graphical image representing the particular episode, and associated with branching behavior that causes the player logic 112 to play the particular episode in video window 1720, replacing the icons 1722, 1724. An unavailable episode icon 1724 represents an annotation that is associated with a static graphical image, or decoration, representing the particular episode that is unavailable. As decorations, unavailable episode icons 1724 are not selectable and not associated with branching behavior or other action. In an embodiment, the graphic images associated with unavailable episode icons 1724 may include an episode name and release date for the purpose of attracting viewer interest in future program material.

Figure 17D:
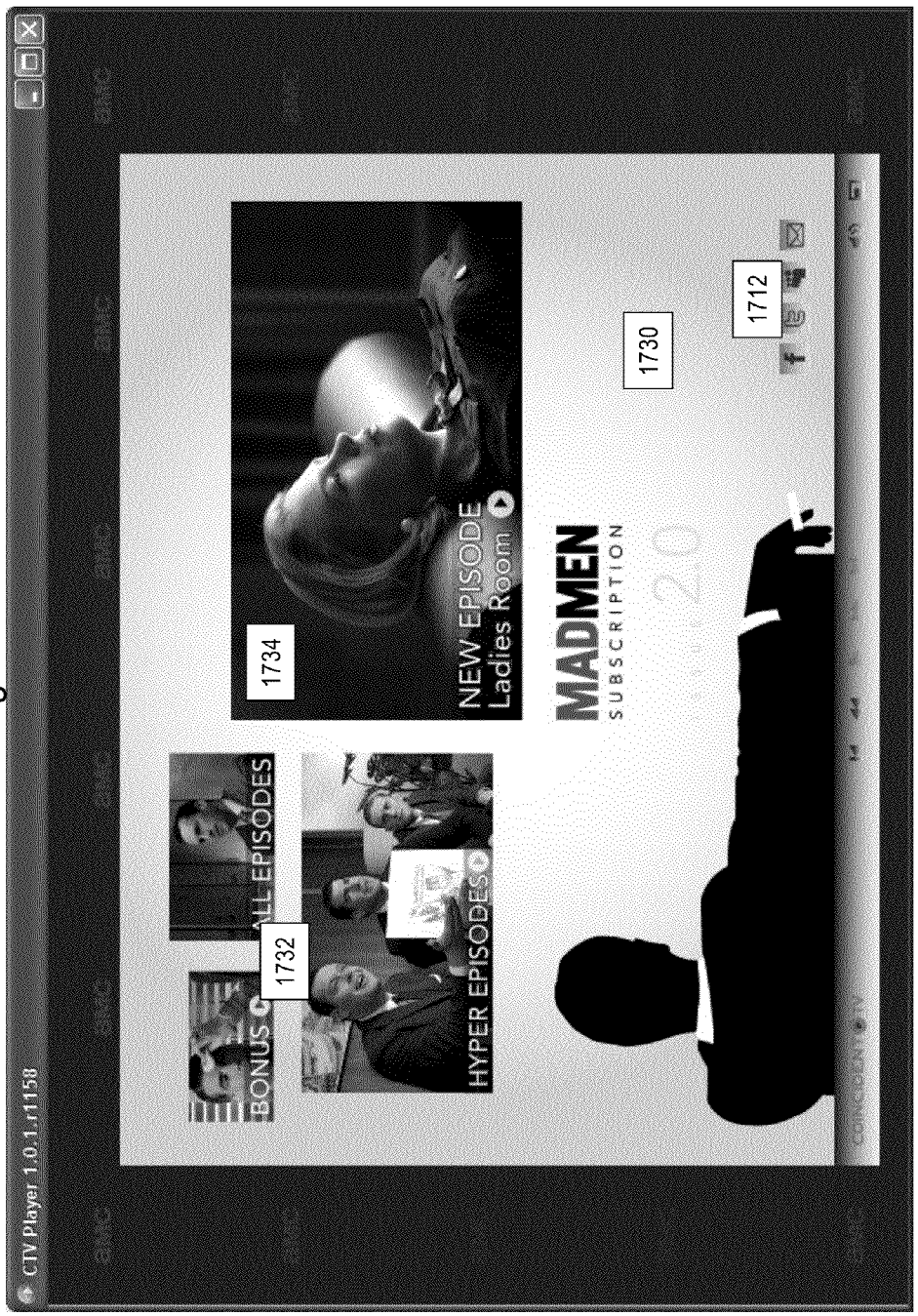
FIG. 17D illustrates use of annotations to form elements of a main menu page for a video program subscription.

FIG. 17D illustrates use of annotations to form elements of a main menu page for a video program subscription. In an embodiment, a video window 1730 in a player window comprises a plurality of the web integration icons 1712 as previously discussed, located in a different position of the video window 1730. The same annotations may be used to define the web integration icons 1712 as for FIG. 17C, with different values for screen position attributes. In an embodiment, video window 1730 further displays a plurality of program link graphics 1732, 1734, which comprise static images each associated with a different animation having different responsive operational behavior. For example, program link graphics 1732 represent annotations that are associated with static graphical images and branching behavior to cause the player logic to branch to metadata in a metadata file 126 that causes playing a bonus episode, or displaying a menu of other annotations having graphics representing short episodes or all available episodes. Program link graphic 1734 represents an annotation which when selected causes branching in the metadata to code that causes the player logic 112 to play a particular video program episode.

Thus, multiple different kinds of annotations can be authored and associated with different graphics, branching behavior, and targets, including static graphics and video programs. Annotations also can cause playing pages that consist solely of other annotations, to await selection of one of the annotations to cause other navigation or to cause playing various program materials.

Figure 18A:
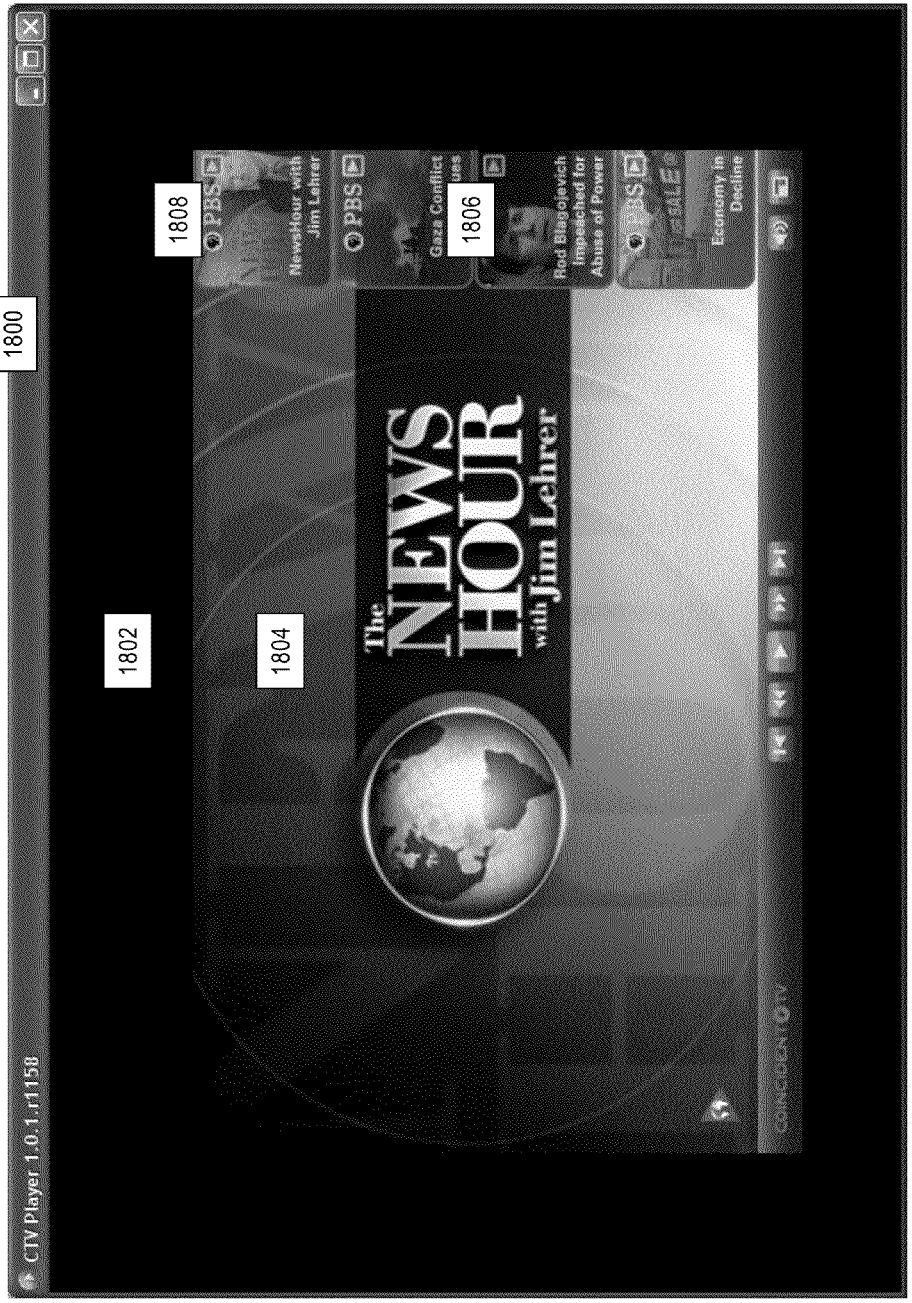
FIG. 18A illustrates an example news program in which annotations may be used to provide a directory or menu of a plurality of news stores, features, segments, or related information.

FIG. 18A illustrates an example news program in which annotations may be used to provide a directory or menu of a plurality of news stores, features, segments, or related information. In an embodiment, the player window comprises a video window 1804 surrounded by an undecorated background 1802. In other embodiments, background 1802 may carry advertisements, program logos, or other information. In an embodiment, a plurality of program links 1806 is arranged in a column 1808 at one side of the video window 1804. Each of the program links 1806 is associated with an annotation. Each of the annotations defines a position, graphical image, and behavior in response to selection of the annotation. Each annotation may be associated with a video program or an Internet site, so that selecting a particular annotation causes the player logic 112 to either play the associated video program or to access and display information from the Internet site in a new browser window, depending on the defined responsive behavior. The graphical images may include a blend of images and text to indicate what kind of program or site is associated with the program link 1806.

Figure 18B:
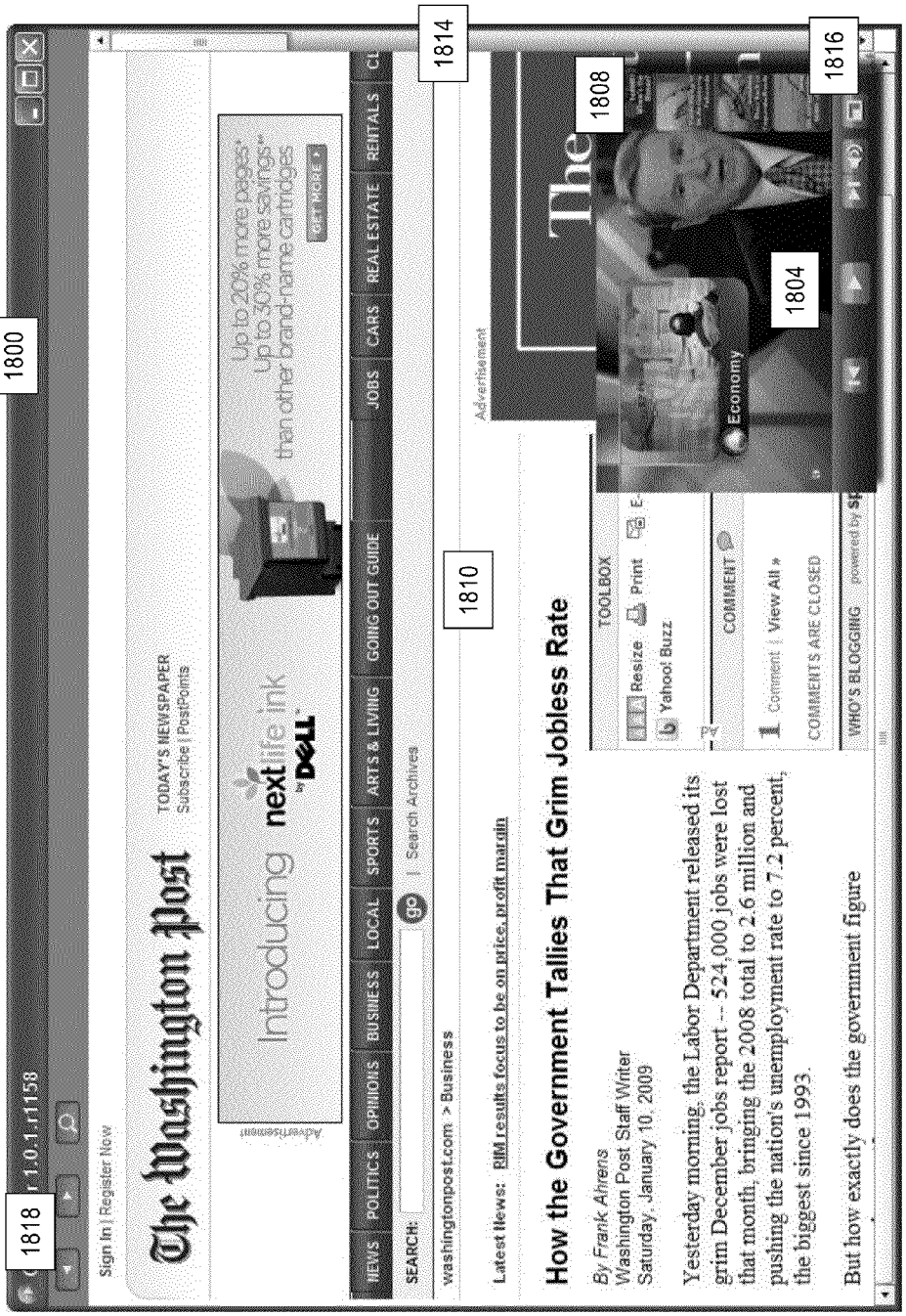
FIG. 18B illustrates the news program of FIG. 18A after a viewer has selected a program link that is defined using an annotation having an association to a website.

FIG. 18B illustrates the news program of FIG. 18A after a viewer has selected a program link 1806 (FIG. 18A) that is defined using an annotation having an association to a website. During playback, in response to receiving user input that selects a particular program link 1806 (FIG. 18A) that is defined using an annotation having an association to a website, player logic 112 obtains a URL for a web page from within the code of metadata files 126 that defines the annotation, issues an HTTP request for the URL, and generates a browser window 1810 that renders the resulting HTML. At about the same time, player logic 112 redisplays the video window 1804 in a reduced size within the player window 1800. The column 1808 of program links remains displayed in reduced size within the video window 1804.

The browser window 1810 may include a scroll bar 1814 that is movable in response to user input from a pointing device such as a mouse, touchpad or trackball. The scroll bar is scrollable to cause the web page in browser window 1810 to scroll up or down independent of the video window 1804.

Figure 18C:
FIG. 18C illustrates the browser window of FIG. 18B after the scroll bar has been moved.

FIG. 18C illustrates the browser window 1810 of FIG. 18B after the scroll bar has been moved. While the content of the web page has moved downward in browser window 1810, the position of video window 1804 remains fixed within the player window 1800. In this approach, the video remains visible and the viewer can retain context for the associated web page content. At any time, the viewer can select a full screen icon 1816, which is also defined using an annotation. In response to selecting the full screen icon 1816, player logic 112 causes the browser window 1810 to close and the video window 1804 is redisplayed to occupy all of the player window 1800.

The browser window 1810 may comprise a plurality of browser navigation buttons 1818. In an embodiment, the browser navigation buttons 1818 include forward, backward, and magnification buttons. Selecting a backward navigation button causes the player logic 112 to redisplay, in the browser window 1810, a most recently displayed previous web page. If the most recently displayed previous web page was generated when the player logic 112 was playing a different video program, then it is possible that using the backward navigation button may cause displaying a web site that is unrelated to the current video program.

FIG. 19A illustrates playing a video program in which annotations are associated with multiple different responsive behavior types. In an embodiment, player window 1900 comprises a video window 1902 that plays a video program. A plurality of annotations defined in metadata files 126 are associated with graphic images displayed as page links 1904, video links 1906, and voting buttons 1908. In an embodiment, annotations for page links 1904 are associated with URLs for web pages that correspond to an individual who is depicted in the page link.

Figure 19B:
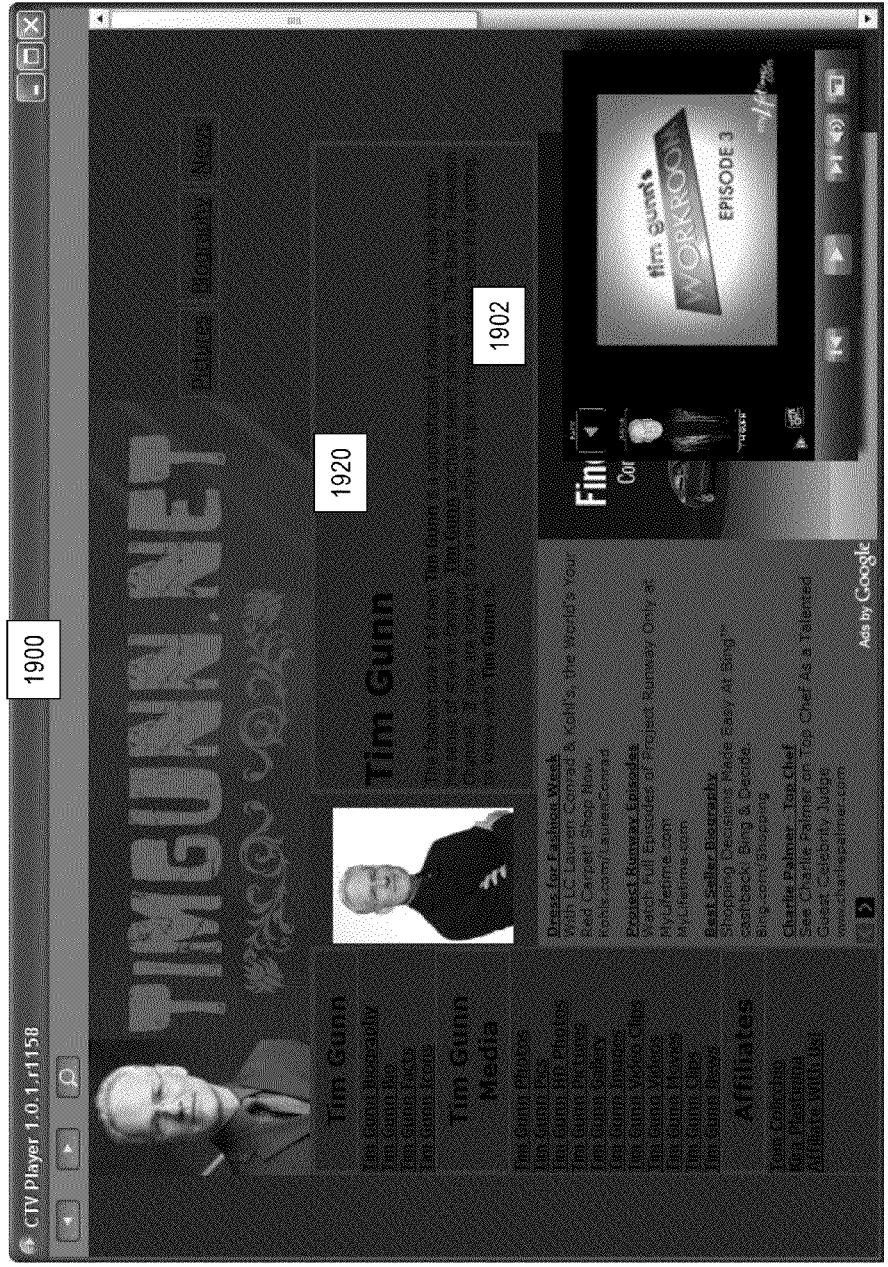
FIG. 19B illustrates an example of displaying a separate browser window below or behind the video window of the player window.

Thus, in the example of FIG. 19A a viewer who selects a page link 1904 for fashion critic Tim Gunn causes the player logic 112 to access and display a web page associated with Tim Gunn in a separate browser window in the manner shown for FIG. 18B, FIG. 18C. FIG. 19B illustrates an example of displaying a separate browser window 1920 below or behind the video window 1902 of the player window 1900. As in FIG. 18B, 18C, the browser window is scrollable independent of the video window 1902, the video window is automatically displayed in a reduced size representation, and the video window may be restored to fully occupy the player window 1900 by selecting a full screen icon in the video window.

If the viewer selects one of the video links 1906, player logic 112 branches within the code of a metadata file 126 and causes playing an associated video segment. In the example of FIG. 19A, the associated video segments may comprise commercials or infomercials associated with brands, products or merchants, but in other embodiments the video segments may be noncommercial.

In an embodiment, voting buttons 1908 also represent annotations that cause the player logic 112 to invoke a web service that communicates a vote indicated by a particular voting button to a vote collecting server. Thus, FIG. 19A provides an example of how annotations may be used to link a viewer through interactive services to Internet servers that collect information or perform specified actions.

6.4 Skinning Via Html Background Pages

In an embodiment, HTML and HTTP may be used to display a graphical format, termed a skin, for the player window 1302, for a background area of the player window 1302, and for various user interface elements such as annotation icons. In an embodiment, graphical backgrounds, skins, and UI elements all can be defined for, and thus synchronized at, any one or more of: video cue points; a metadata file 126 that describes a collection of video segments that are rendered into a single file; or a folder, directory, or collection of metadata files 126 making up a complex media presentation.

For example, an author can configure cue-point level synchronization to show character background information as different characters come on stage. The author can use file-level synchronization to have different backgrounds for commercials as compared to program content. The author can use folder- or directory-level synchronization to change the color scheme used in backgrounds, windows and other UI elements on an episode-by-episode basis. In this context, UI elements include annotations and associated graphic images.

In an embodiment, a user may specify an HTML file to display in the background as the video is playing. In an embodiment, specifying a background skin is performed by a user accessing a Metadata tab 2112 of screen display 2102, as seen in FIG. 21, FIG. 22.

Figure 22:
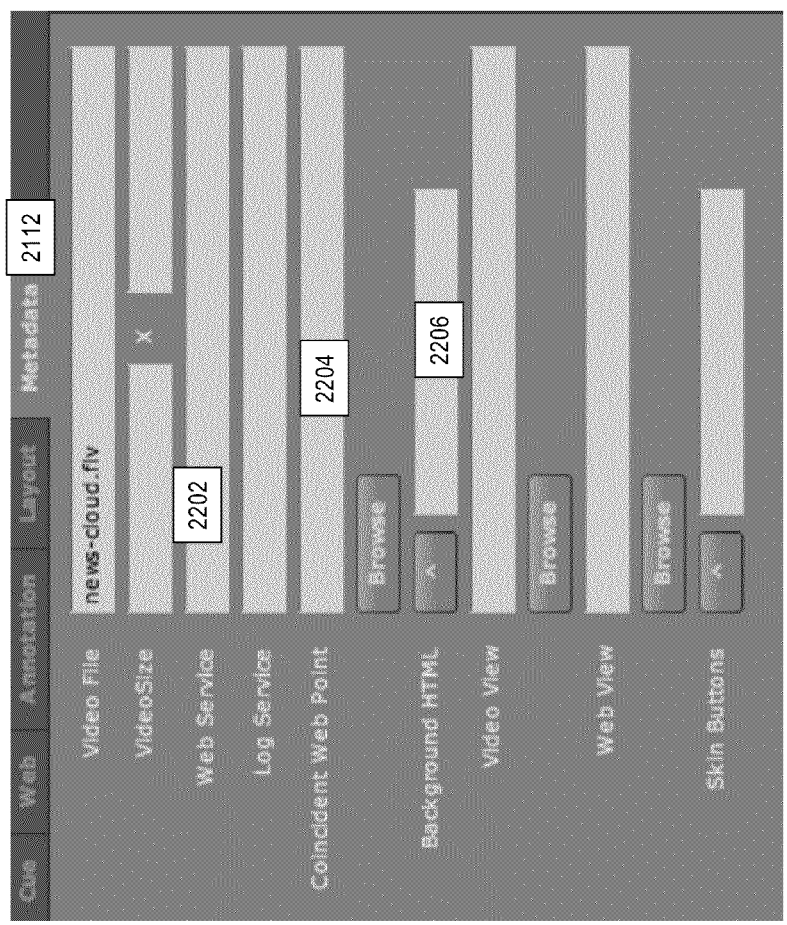
FIG. 22 is a screen display diagram of the Metadata tab of an example Editor window.

FIG. 22 is a screen display diagram of the Metadata tab. In an embodiment, a user enters a URL of an HTML document that contains a background image in a Background HTML field 2206. The editor logic 110 stores the URL in metadata for the video. At playback time, the player logic 112 loads the URL and displays the contents as background behind or around the video window. Background images may include graphics, text, product branding, or other information.

Metadata tab 2112 also displays and allows user entry of values for other parameters for other player functions that are described further herein. As an overview, a Video File field identifies a filename of a video file with which the user is currently working and that is associated with the other metadata. A Video Size field identifies a size in pixels of a video window generated by the player logic 112 and that will display the video program at playback time. A Web Service field 2202 displays a reference to a web service that can be invoked at one or more cue points to provide external functions or processing. A Coincident Web Point field 2204 may receive user input of a synchronized web reference to display at a particular cue point. A Skin Buttons field may receive a reference to an electronic document that defines an appearance for play and trick play buttons of the player.

6.5 Subscription Video

In an embodiment, video linking editor logic 110 may be used to author and configure, for playing using metadata-capable player logic 112, a live, refreshable collection of media with navigation metaphors. A subscription video collection differs from a traditional magazine or program subscription in that time is an element of authoring; thus, the media elements that are available to a subscriber change over time. The media elements change over time not in the sense of an animation, which involves changes frame to frame, but for a season of a show. In a subscription video collection as provided herein, the subscription may feature mixed HTML and video content, authored to incorporate additions, deletions and updates over time.

In an embodiment, a subscription video collection is authored as at least a first video segment that comprises a plurality of annotations; each annotation may be represented by a graphic image or animation which, at playing time, is overlaid on the first video segment. Each of the annotations is associated with a different one of a plurality of episodes or clips.

For example, a show may have 22 planned episodes and at a particular time of year, there may be 8 of 22 episodes available for viewing to a subscriber. An end user accesses a subscription at a web site associated with a producer or distributor of the show. The end user presents authentication credentials, such as user name and password, is authenticated and admitted to the subscription. In response, the metadata-capable video player logic 112 plays a first video segment that features 8 icons indicating episode names with graphics, and 14 icons indicating "Episode to be Available in the Future." The annotations may be authored in the same single one of the metadata files 126 or may be in multiple different metadata files. For example, a first metadata file 126 for a show season may contain references to multiple other metadata files that contain actual annotations for each episode of the show. Selecting a particular episode to view is an invocation of the annotation associated with that episode and effectively causes a branch within the associated metadata file 126 to result in playing the selected video episode.

7. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
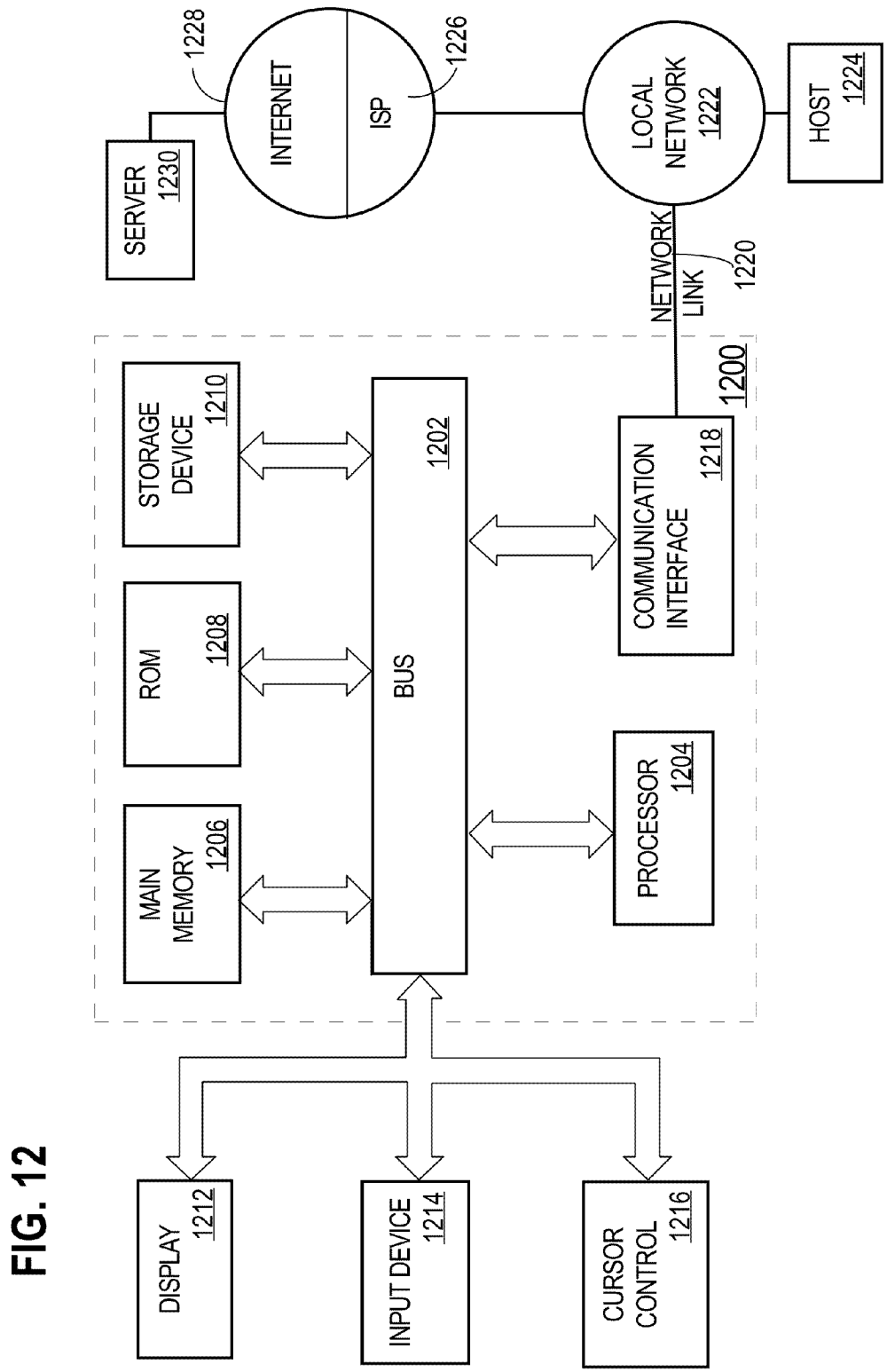
FIG. 12 is a block diagram that illustrates a computer system upon which an embodiment of the invention may be implemented.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

8. Advanced Techniques for Displaying Audiovisual Experiences

Familiarity is assumed with the disclosures set forth in prior U.S. patent application Ser. No. 12/779,262, US patent application publication US 2010/0293190 A1, filed May 13, 2010; U.S. provisional patent application 61/177,726, filed May 13, 2009; and U.S. provisional patent application 61/321,076; the entire contents of which are hereby incorporated by reference for all purposes as if fully set forth herein.

For purposes of this description, the following terms may have the following meanings:

ID—identifier

CTV—Coincident.TV, or a computer of a service provider that is configured to implement the service techniques that are described further herein.

API—Application programming interface

URL—Uniform resource locator or hyperlink

HTML—Hypertext markup language, e.g., HTML 3.0 or later

Javascript—Any programmatic scripting language that can be executed within a browser program.

8.1 Deep Linking

In an embodiment, the video player logic 112 and server computers (FIG. 20) are configured with instructions responsive to load and play videos based on requests that specify both a video and a particular time point or range within the video to play. For example, in one embodiment, universal resource locator (URL) format is used to specify a video and a time point or range. Such URLs may provide links to a player window with associated videos and web pages, at a location other than the start of the video or experience. The technique facilitates interoperability with websites that use HTML. Further, when the video player logic 112 is installed on an end-user computer and associated with a protocol handler of a video playing protocol reflected in such URLs, a web browser receiving a URL that references a particular CPL-compatible video, time point or range can replace the screen with an audiovisual experience of the type described herein by recognizing the protocol identifier in the URL and invoking the support library 2002 to use video player logic 112 to play the video. This also allows embedding an audiovisual experience with a defined structure that will be consistent whenever the web page is rendered.

In an embodiment, a range parameter in the URL specifies a time range in seconds to show a portion of the video. Other parameters specify multiple cloud stored videos for annotations. These parameter values enable retrieving thumbnail images from cloud storage and showing them as icons. Further, such links may support point-and-click authoring of interactive videos in the manner further described in other sections herein.

8.2 Javascript Client-Side Metadata Creation

Prior sections of this document have described metadata files 126, which may hold CPL instructions and may be termed CTV files, as hand authored or created on the server side at web server 130 or file server 132 (FIG. 20) under program control. In an embodiment, the server computers of FIG. 20 may implement a Javascript client-side API. In this approach, an HTML document in browser 108, running Javascript, can create and store a metadata file on client-side storage 140. In an embodiment, the same format as for metadata files 126 may be used, with CPL and stored as a CTV file in storage 140. The browser 108, with support library 2002, can use the local file from storage 140 to control the audiovisual experience.

In an embodiment, client-side code running in browser 108 can provide other, more complex logic. For example, assume that client-side Javascript script code running in browser 108 forms and submits a query to a CDN, such as YouTube, to find specified videos. The script then forms and plays an audiovisual experience with support library 2002 in browser 108 that includes the search results.

A benefit of this approach is that a public video serving site is less likely to blacklist the client for submitting repeated searches. In contrast, if the server computers 130, 132 send a high volume of queries from the same network address range, then certain public video serving sites are likely to blacklist the network address range and decline to respond to the queries.

Embodiments also can be used to circumvent technical limitations of the computer 102. For example, assume that computer 102 has not installed the Flash player, but browser 108 supports HTML5. In this arrangement, support library 2002 in conjunction with client-side code running in browser 108 can provide animation effects when Flash is not usable.

8.3 Client Browser Database for Determining Flow Analytics

In an embodiment, data relating to video usage is locally stored in storage 140, or in a browser database, in a form that is domain limited and organized. In this context, domain limited means that data relating to videos originating from one domain is stored together in the browser database, and servers at other domains cannot obtain the data for a different domain. An indexed database API or indexed DB may be used. In an embodiment, support library 2002 is configured to periodically transfer data captured in the database and associated with a particular domain of the publisher of a video, to that domain or publisher for use in determining user viewing characteristics. In this approach, the domain or publisher can perform individualized evaluation of user viewing habits, and can customize playback of videos on a per-user basis to improve user experience based on that user's history of behavior.

For example, assume that data in the browser database for videos originating from a particular domain indicates that past activity of a particular user involves always clicking on car ads, but never clicking on travel ads. In response, the publisher of the videos for that domain can select and provide videos to the user that relate to cars or that include car ads. Thus, in one embodiment a server computer at the domain of the video publisher is configured for adjusting the content based on the user's history and also for performing the adjustment at the client side.

8.4 Ad Layer Above Existing Video

In various embodiments, the insertion of advertisements into videos may be undesirable for certain content creators or for individuals who do not have access to advertising relationships, contracts or content. In an embodiment, the server computers 130, 132 may be configured to supplement the metadata files 126 of a particular audiovisual experience to introduce advertisements in a layer or frame that surrounds the playback window of the video, so the ad is associated with the video but not actually in it. Further, this approach can introduce advertising content that is not available at a public online video storage site such as YouTube.

Figure 32:
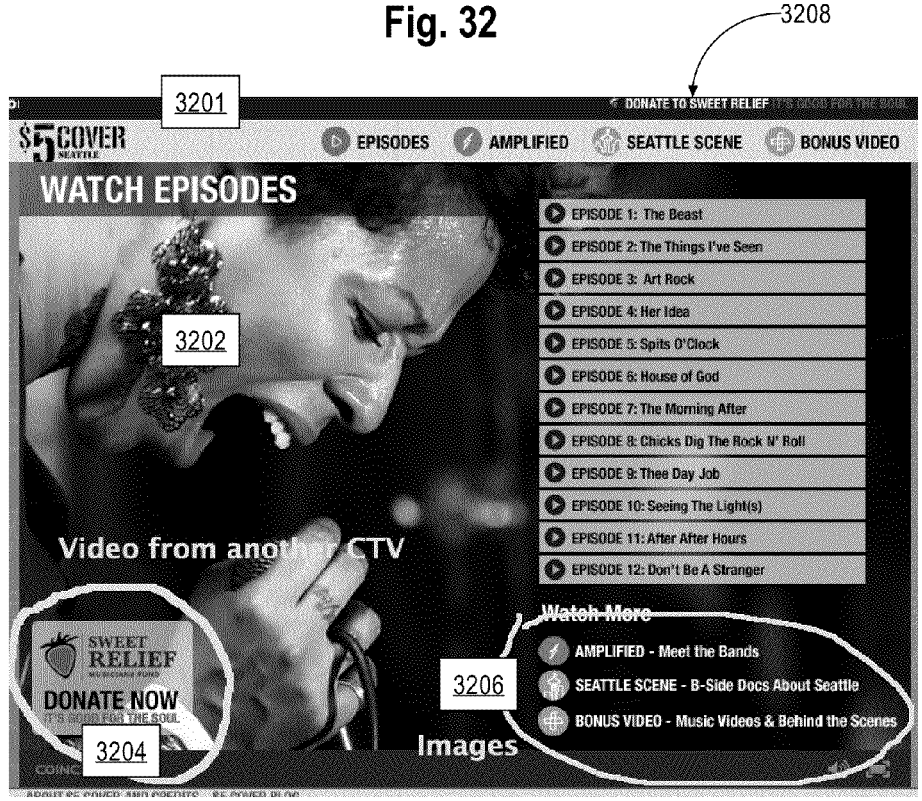
FIG. 32 illustrates an image of an audiovisual experience illustrating the use of multiple annotations of different types.

FIG. 32 illustrates an image of an audiovisual experience illustrating the use of multiple annotations of different types. In an embodiment, screen display 3201 further comprises an advertisement 3208 in a frame of the first video 3202. The position and content for the advertisement 3208 may be specified in the CPL instructions of the metadata files 126 for the video 3202 as an annotation. In an embodiment, server computers 130, 132 may automatically amend or supplement the CPL instructions of the metadata files 126 to add instructions that cause displaying the advertisement 3208.

8.5 Fractional Downloading for Complex Experience Changes

In an embodiment, the support library 2002, video player logic 112, and server computers 130, 132 are configured with logic to download a part of the video files 122, graphics files 124 and metadata files 126 for an audiovisual experience rather than all of it. For example, in some embodiments the CPL instructions in a particular one of the metadata files 126 may comprise large XML files. Administrators or operators of a particular audiovisual experience may wish to modify or update the large XML files from time to time to cause changes in experiences. In an embodiment, specified chunks of XML that define an experience in the metadata files 126 can be selectively modified and replaced using the video editor 106. Consequently, rapid changes in experiences are more easily managed.

In one approach, a first metadata file 126 comprises a just-in-time loading instruction in association with a reference to a second metadata file 126. When playing a particular video file 122, the first metadata file 126 is used to govern the audiovisual experience. Video player logic 112 is configured to respond, when reaching and reading the just-in-time loading instruction, to load and process the second metadata file 126. The reference to the second metadata file 126 may be a network location rather than a local file. In this manner, the first metadata file 126 may specify a particular location that causes the video player logic 112 to make a network request to download a segment of metadata to substitute in at that point and immediately interpret and execute in the player. This approach greatly improves the dynamism of experiences; for example, the second metadata file 126 could be updated and edited frequently or in real time to enable rapid modification of the user playback experience.

In an embodiment, the Live Injector technique described further herein may be integrated with the technique of this section. The Live Injector technique may serve as an enabling concept for live unified media content.

8.6 Focus on a Sub Stream Using Mouse Actions

Figure 30:
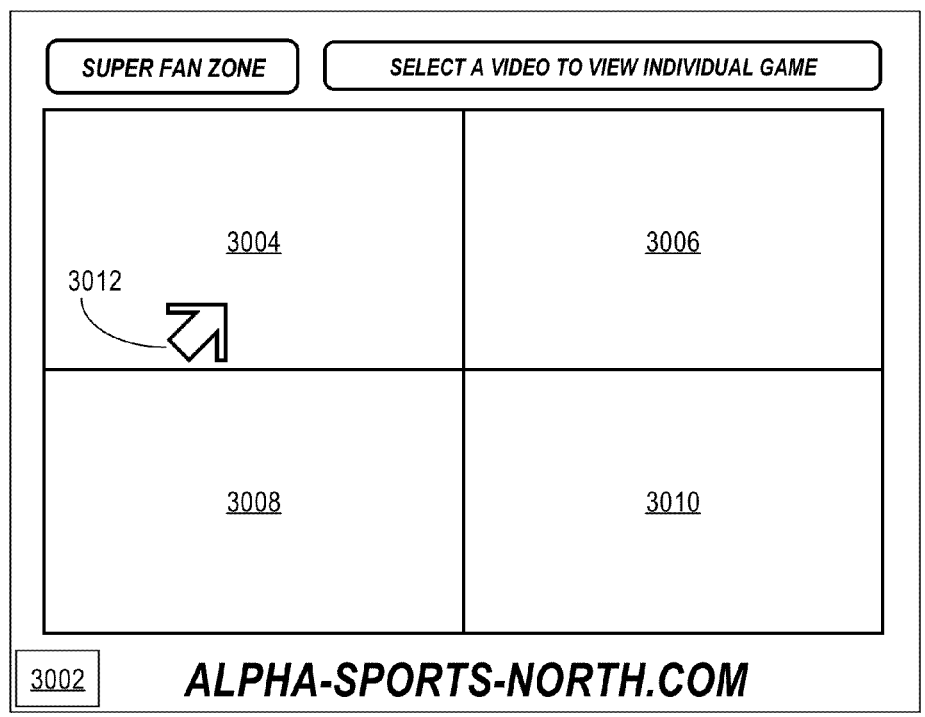
FIG. 30 illustrates a screen display for an audiovisual experience in which four (4) sub-streams of video are displayed.

FIG. 30 illustrates a screen display for an audiovisual experience in which four (4) sub-streams of video are displayed. A main window 3002 comprises first through fourth video regions 3004, 3006, 3008, 3010, each of which may display a different video streamed or played from among video files 122 or from an internet resource. Video player logic 112 may generate and cause displaying the main window 3002. A cursor 3012 such as an arrow may be positioned anywhere in main window 3002 using a pointing device such as a mouse or trackball. In the example of FIG. 30, cursor 3012, is positioned in region 3004.

In an embodiment, video player logic 112 is configured to detect mouse events or other pointing device movement events using operating system calls, event interrupts, or other techniques and to determine which region 3004, 3006, 3008, 3010 currently contains the cursor 3012. When the cursor 3012 is within a particular region 3004, 3006, 3008, 3010, that particular region is considered to have the focus of the cursor. Video player logic 112 is configured to detect a change in focus of the cursor to a different one of the regions 3004, 3006, 3008, 3010, such as through a mouse enter event indicating movement of the cursor to a different region, and to take specified action in response to detecting a change in focus.

In various embodiments, the specified action may include any of the following. The video stream that has the focus of the cursor may be made active and may change the audiovisual playback experience globally across all media to match that video's content. The video player logic 112 may cause routing the audio associated with the stream having focus, such as the stream of region 3004, to the active audio output device or audio subsystem of the computer 102, and making inaudible other audio data associated with second or other video programs that are shown in the other regions 3006, 3008, 3010. The video player logic 112 may select and display chat text content that is associated with the region having focus, such as region 3004, and not displaying or removing any chat text content that is associated with other regions 3006, 3008, 3010. The video player logic 112 may cause the other streams that do not have focus to be displayed as faded or with reduced intensity as compared to the region 3004 that has focus, for example so that the region 3004 appears brighter.

As other examples of the specified action, the video player logic 112 may pause playback of the streams in regions other than the region with focus. The video player logic 112 may display one or more stream-specific advertisements that are related to the content shown in the stream of the region 3004 that has focus. The video player logic 112 may cause displaying a scoreboard, online links, related media, or other data from a non-video stream on or near the region 3004 that has focus. The video player logic 112 may cause changing one of the regions 3004, 3006, 3008, 3010 that does not have focus to show web content, information from related videos, graphical logos, or any other desired data.

In an embodiment, each sub stream of the regions 3004, 3006, 3008, 3010 is structured as a video annotation in one of the metadata files 126.

8.7 Separate Story Media and Actions for Annotations

In an embodiment, the video player logic 112 is configured to respond to CPL instructions specifying annotations of multiple different media types that provide the capability of linking stories and actions to each other independently. As described in part above with respect to annotations, in various embodiments any media type can be used in an annotation. Example media types include: still image; video stream; CTV experience; live video stream; HTML insert; SWF movie. Actions that occur in response to selecting an annotation may be static or dynamic. Examples of static actions include: load and display a web page; switch to playing another audiovisual experience; execute specified executable code or scripts. Examples of dynamic actions include evaluating business rules, or web services calls, to result in selecting one of the static actions.

In the example of FIG. 32, a screen display 3201 is generated by the video player logic 112 for the computer 102 and has a main video region 3202 in which a first video is played. In an embodiment, an annotation in one of the metadata files 126 associated with the audiovisual experience shown in FIG. 32 may specify a second video and a second video region 3204 in which the second video is played. The video player logic 112 may open multiple different streaming video connections to multiple video files 122 or other networked video resources, receive streaming data on the multiple connections, and display the video in the screen display 3201. Further, in an embodiment, an annotation in one of the metadata files 126 associated with the audiovisual experience shown in FIG. 32 may specify a plurality of images 3206 and an image region in which the images should be displayed. In the example of FIG. 32, the images 3206 are unrelated to the second video in region 3204. However, annotations may be linked so that selecting one of the images 3206 could result in automatically updating second video region 3204 to display a different second video.

8.8 Live Injector

Figure 31:
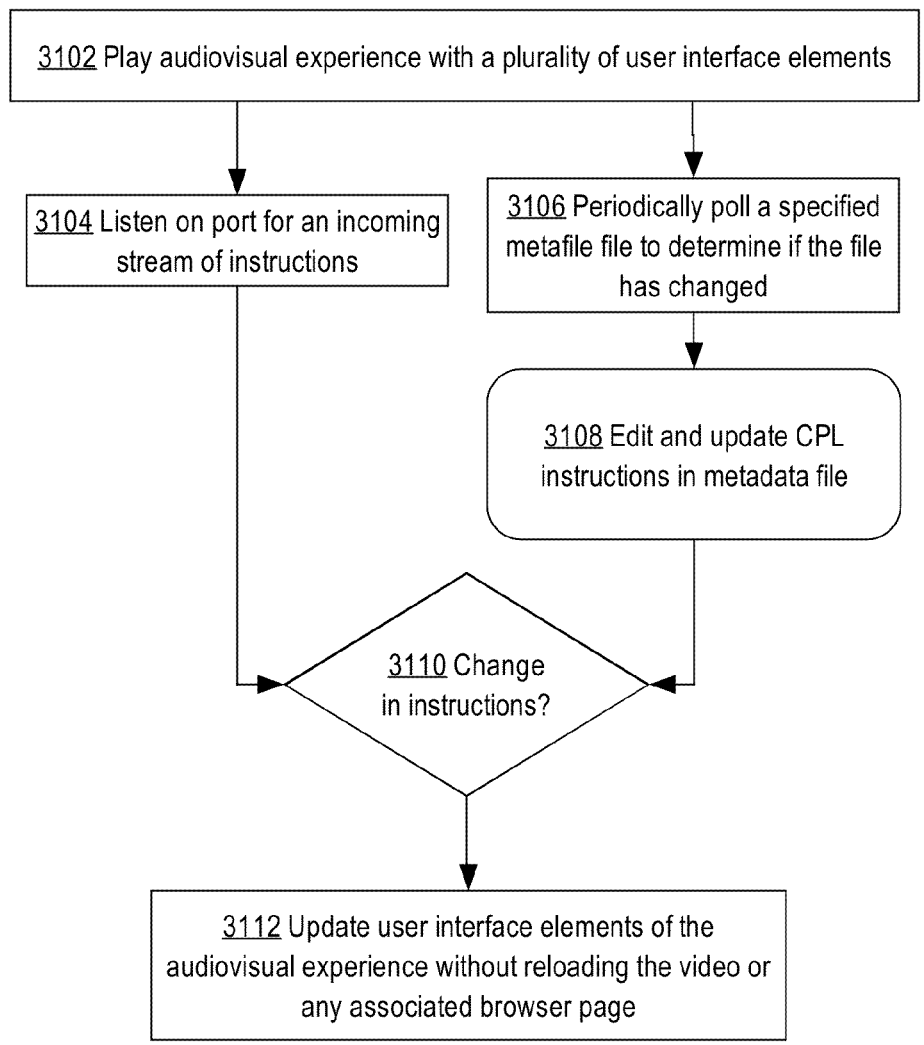
FIG. 31 illustrates an example live injection process.

In an embodiment, video player logic 112 is configured with instructions which, in operation, can update the user interface displayed on computer 102 dynamically in real time based on instructions in metadata files 126 that use the cue point language (CPL). FIG. 31 illustrates an example live injection process.

In an embodiment, the video player logic 112 plays an audiovisual experience that comprises a plurality of user interface elements, as shown at 3102. For example, assume that the audiovisual experience of FIG. 18B, which is a news show, is played. In an embodiment, at 3104 the video player logic 112 is configured to listen to a data stream, from metadata files 126 or another source of instructions in CPL, to obtain cue points that cause the video player logic to change operation as previously described in connection with cue points. Alternatively, at 3106 the video player logic 112 is configured to poll a file, such as one of the metadata files 126, on a server that contains one or more changes in CPL instructions.

For example, an operator in a studio that is producing a news program could make periodic changes to one of the metadata files 126 by editing the CPL in the file and saving the file, in real time as the news program is going on, as seen at 3108. The video player logic 112 may be configured to poll one of the metadata files 126 every n seconds to determine if the file has changed. In response to detecting a change in the metadata file 126 or stream, as tested at 3110 the video player logic 112 updates the user interface elements shown in FIG. 18A without reloading the video or browser page, as shown at 3112. As a result, an operator may cause the video player logic 112 to inject new content into the audiovisual experience on demand or on a real-time basis.

In an embodiment, the present technique may be combined with the Fractional CTV technique that is described further herein. In an embodiment, the present technique enables providing live, cross-media interactions.

8.9 Simultaneous Streams from Multiple CDNs in One Player

Referring again to FIG. 30, in an embodiment an audiovisual experience may include two or more streams of video displayed in multiple regions. For example the main window 3002 comprises first through fourth video regions 3004, 3006, 3008, 3010, each of which may display a different video streamed or played from among video files 122 or from an internet resource. In an embodiment, video player logic 112 is configured with interface instructions that support obtaining and displaying multiple video streams in the main window 3002. Further, in an embodiment, each video stream in the two or more regions may be obtained from a different content delivery network (CDN). Examples of CDNs currently in commercial use include Akamai, the Platform, YouTube, and Brightcove, but any other CDN may be used.

Typically each CDN defines a URL format, application programming interface (API) or other calling mechanism that is distinct and different as compared to other CDNs. Consequently, in typical practice, obtaining a video from a first CDN requires issuing a first kind of call over networks 120 and obtaining a video from a second CDN may require making a completely different call or using a different format. In an embodiment, video player logic 112 is configured with instructions that issue calls for videos using a normalized request format. Player control server 2004 is configured with a plurality of interface units, each configured to transform a request in the normalized request format into a particular API call format or other request format that is required by a particular one of the different CDNs. Consequently, authors of metadata files 126 and the video player logic 112 do not need to know the particular call formats or APIs that are used by all the CDNs. Instead, metadata files 126 and the video player logic 112 can use a single form of API call for a video and the player control server 2004 handles transformation of the single form of API call into one or more requests to any of the different CDNs.

8.10 Video Analytics

In various embodiments, a server computer such as web server 130 or file server 132 (FIG. 20) is configured with instructions providing data compilation, analysis and display processes that may be used to generate and display a plurality of different charts, reports, and other interpretations of the data (collectively "analytics").

Figure 33A:
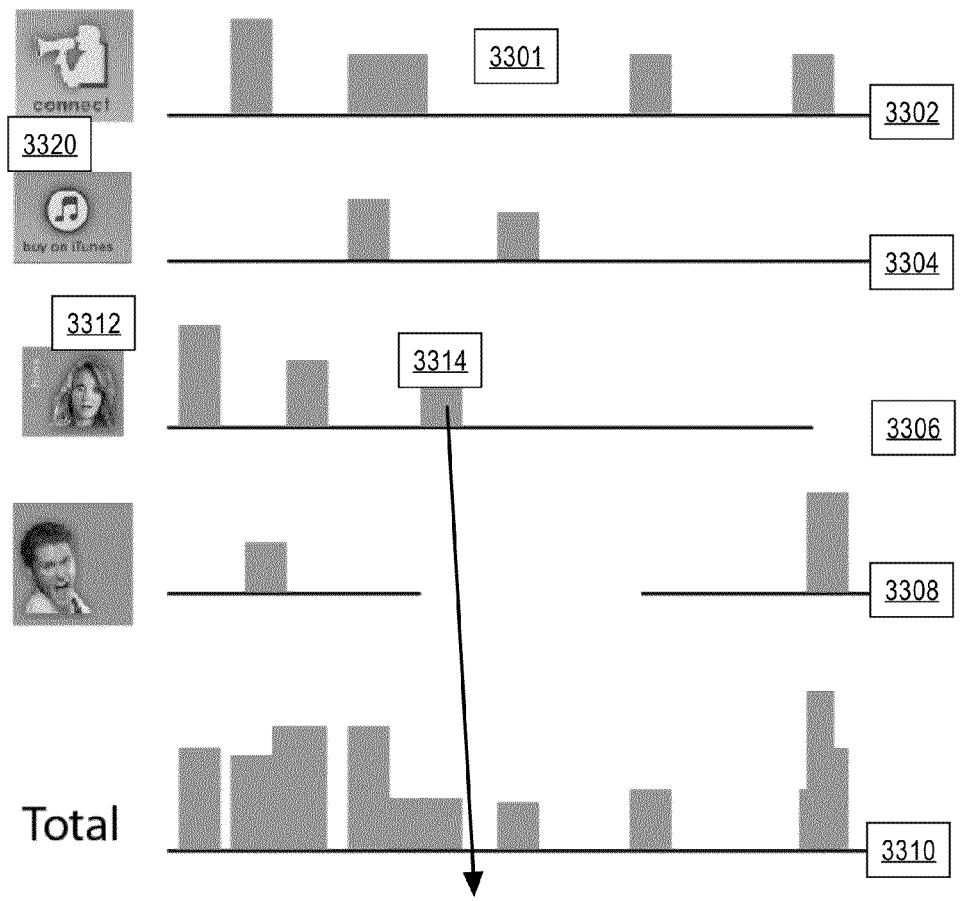
FIG. 33A, FIG. 33B illustrate screen displays that may be used with annotation lifetime analytics.
Figure 33B:

In one embodiment, analytics involve displaying data about the lifetime of an annotation. FIG. 33A, FIG. 33B illustrate screen displays that may be used with annotation lifetime analytics. Referring first to FIG. 33A, the server computer may be configured to receive data from a plurality of instances of the video player logic 112 indicating which annotations users have selected (clicked on) during playback of a particular video, and the time point at which a particular annotation was selected, to store the data at the server side, and to generate a histogram or bar chart in which bars represent the number of clicks at particular points in time during playback of the associated video in response to a request or command of an administrative user of the server computer.

In the example of FIG. 33A, an analytics chart 3301, which may form part of an administrative screen display, comprises a plurality of bar graphs 3302, 3304, 3306, 3308 each associated with a particular annotation in video 3316 (FIG. 33B) as indicated by icons 3320, 3312. For example icons 3320 correspond to annotations 3322 in the video 3316. In each of bar graphs 3302, 3304, 3306, 3308, the horizontal axis represents time, and each bar such as bar 3314 represents a count of selections or clicks of all users who viewed video 3316. In an embodiment, the horizontal axis of bar graphs 3302, 3304, 3306, 3308 corresponds to the length in time of video 3316, and gaps or spacing between bars 3314 indicate that different counts of selections of a particular annotation occurred at different relative times during playback of the video. For example, bar graph 3304 indicates that a user, or groups of users, tended to select one of the annotations 3322 at two different times spaced apart during playback of the video.

In an embodiment, in a screen display with analytics chart 3301 each of the bars 3314 comprises a link which, when selected, causes the video player logic 112 to retrieve and display the video 3316 at the relative time point indicated by the particular bar 3314 that was selected. For this purpose, an administrative user of the server computer may execute an instance of the video player logic 112 on an administrative computer that is connected to the server computer in the manner similar to an end user viewer of the video.

To facilitate operation of this function, data stored at the server computer may combine multiple data points received from end users into a smaller set of time points or buckets. For example, if a video is 180 seconds long and has been viewed by 500 different users who collectively selected a particular annotation at 100 different time points in the video, the time points at which selection actually occurred may be rounded off to the nearest n second interval. For example, n may be 10 seconds. This approach enables the bar graphs 3302, 3304, 3306, 3308 to have a reasonable number of bars 3314 each associated with a larger number of selections that will be meaningful for analysis, rather than a very large number of bars each associated with relatively few selections.

In an embodiment, the server computer is configured to build and display a burn-down chart and allow the user to click on the bars to view the associated part of the video. A burn-down chart reflects the common phenomenon that the number of users who continue to view a video tends to decrease in proportion to the length of the video, although there are exceptions that the burn-down chart can help isolate.

Figure 34:
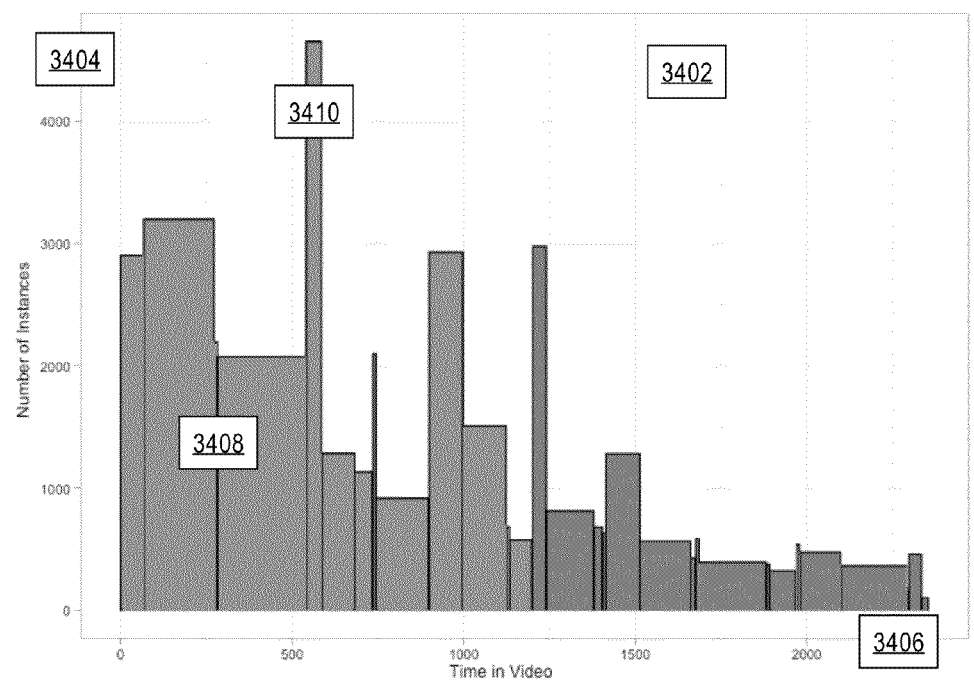
FIG. 34 illustrates an example burn-down chart.

FIG. 34 illustrates an example burn-down chart. In the example of FIG. 34, a burn-down chart 3402 for a particular video comprises a vertical axis 3404 indicating a count of instances at which users stopped watching the video and a horizontal axis 3406 indicating a time point within the video at which instances of stopping occurred. Chart 3402 further comprises a plurality of bars 3408 that indicate counts of instances at which users stopped watching the video at an associated time point.

In the example of FIG. 34, the general trend in values of the bars is downward as time progresses to the right of the chart. However, chart 3402 also includes at least one peak bar 3410 that represents a departure from the downward, left-to-right trend. In an embodiment, in a screen display with analytics chart 3402 each of the bars 3408, 3410 comprises a link which, when selected, causes the video player logic 112 to retrieve and display the video at the relative time point indicated by the particular bar that was selected. Consequently, by selecting bar 3410, a user can jump to a point in the associated video at which an unusually large number of users ceased watching the video and can review the substantive video content at that point to determine whether the video needs revision or improvement in order to cause a larger number of users to continue watching.

In an embodiment, the burn-down chart approach of FIG. 34 may be implemented as follows. For a particular video in video files 122, an administrative user creates and stores a metadata file 126 having cue points that are spaced apart approximately 2 to 3 seconds throughout the entire time of the video. Each such cue point is associated with a segment of executable code that is configured to cause the video player logic 112 to notify a server computer such as web server 130 (FIG. 20) when the associated cue point is reached as a user views the video. The web server 130 or an analysis application on the web server is configured to store data in a database indicating that a user passed the cue point. The resulting data can be used to generate a burn-down chart of the form shown in FIG. 34. The burn-down chart can indicate whether the video has parts that are particular interesting and/or how quickly viewers leave the experience.

In an embodiment, similar techniques may be used to generate data indicating which parts of a video appear to be interesting or frequently viewed by significant numbers of users. As a user is viewing a video and a control bar is used to jump forward to another video, the player of the audiovisual experience is configured to generate a signal or call to the server computer to provide and causing storing the time point at which a movement occurred in association with data about the user and identifying the movement, but without stopping or otherwise interrupting playback of the audiovisual experience. Thus, for example, if a user is playing an audiovisual experience and then stops playing it, or branches to another video segment within the same experience, or selects web content, the timepoint at which such an action occurred and the nature of the action are sent in a web services call or API call to the server computer. The server computer stores the data in a log, database table, or other repository.

The server computer may be configured to aggregate, analyze and generate one or more reports based on data of this type, for a group of users all of whom have viewed or interacted with same audiovisual experience, for the purpose of illustrating viewing trends for that audiovisual experience. Examples include burn-down reports, cliff reports, and others that show when and at what rate users ceased watching a video or moved from a particular location to other media content, including web content. Examples include viewer retention reports; video views from start to final section; video views from start to first and final section; episodic view views completion by section, also termed cue point burn-down; annotation engagement reports indicating which annotations users clicked on, by number or percentage of users or both; types of annotation clicks within episodes; numbers of website picture-in-picture launches using the player; average time spent using the player; picture-in-picture web pages that result in users pausing the video, alone or in comparison to PIP web pages that result in users continuing to play the video; Other analytics can provide valuable usage information for content providers such as television networks that provide online video experiences to internet users. Analytics may be used, for example, to determine how far through a particular video most users watched, or whether a particular advertisement was viewed and by how many viewers.

For example, in an embodiment, the video player logic 112 is configured to detect the use of a trick play control, such as play, pause, seek back 10 seconds, rewind, or fast forward, and to generate an event or send data to the server computer in response to detecting the use of a trick play control. Each such event or data set includes a time point within the video at which the use of a trick play control occurred. The server computer is configured to store records indicating which trick play event occurred and the time point in the video at which the trick play event occurred. The server computer is further configured to generate a report or chart that indicates a plurality of time points in the video and counts of numbers of users who performed a trick play function at the time point, in association with actual play of the video.

FIG. 35 illustrates an example screen display and chart that may be used to indicate data about interesting parts of a video. In the example of FIG. 35, a screen display 3502 comprises a video player window 3504 and a video timeline 3506 displayed in conjunction with the video player window. In an embodiment, video timeline 3506 represents a portion of the duration of the associated video in which earlier time is to the left and later time is to the right. A play head indicator 3508 signifies where in the timeline the video in video player window 3504 is currently playing. One or more bars 3510 indicate counts of instances of users operating trick play functions of the video player logic 112 when they were playing the video. Positions of bars 3510 on timeline 3506 indicate relative points in time, during playing the video, at which users operated trick play functions of their instances of the video player logic 112. The relative height of bars 3510 indicates differences in counts of instances at time points at which the bars appear on timeline 3506.

As the video in window 3504 plays, bars 3510 move from right to left; when a particular bar is aligned with the play head indicator 3508, then the video in video player window 3504 corresponds to the point at which users performed a trick play function. Consequently, an administrative user of screen display 3502 can perform analysis of the video content shown in window 3504 at the time of a large bar 3510 to determine whether action should be taken to change the content of the video or perform other actions in response to the use of trick play functions by the users. Thus, in general, bars 3510 may indicate interesting parts of the video 3504.

In an embodiment, in screen display 3502 each of the bars 3510 comprises a link which, when selected, causes the video player logic 112 to retrieve and display the video in video player window 3504 at the relative time point indicated by the particular bar that was selected. For example, selecting the first bar 3510 causes the video shown in window 3504 to jump to the time point associated with the first bar and immediately begin playing in the video player window; concurrently, the first bar and the video timeline 3506 move to the left so that the first bar is aligned with the play head indicator 3508.

Using these techniques, user interaction with the control bar of the video player logic 112, such as the icons 1104 seen in FIG. 11, may be stored in association with a user session identifier at a server computer such as web server 130 or file server 132 and then later used to report video analytics potentially for every second of a video. The analytics may comprise a plurality of data values stored in a spreadsheet, database, other data repository, or output in a report. Analytics may comprise data for a group of users or for an individual and may describe who is watching a particular audiovisual experience and what part for how long. The analytics may be useful, for example, for teachers making educational videos to show what students were doing, for example, repeating video segments multiple times. For entertainment, analytics data may reflect the relative effectiveness of the video. In an embodiment, the current play head position is determined in response to a control bar interaction and sent to the server computer for storing in a data repository in association with data describing the video and the user.

Integrated with a social networking graph, the data may be used to connect a user with other users who interacted with the control bar with the same video in the same way, or emphasize what parts of the video their friends or a social networking group watched repeatedly. Face icons may indicate locations in the video timeline where friends interacted with the video. As an example, in one embodiment a social networking application can display the player window within the social networking site page and show the social networking profile photo of a friend of the current user with an indication of what action that friend took in the playback of the audiovisual experience or with respect to the control bar. Profile information other than photos may be displayed for friends. Information for a plurality of friends may be shown.

Log entries stored at file server 132 for control bar interactions may comprise values for time, user, video, and an action indicator. In an embodiment, video player logic 112 may send values indicating only that a particular user has had some undefined form of interaction with the control bar at a particular time for a particular video; reporting the log entry may be triggered at the video player logic by any form of interaction with the control bar. Example interactions may include selecting an annotation that is referenced in an audiovisual experience, stopping, pausing, jumping forward or back, and exiting. Other embodiments may include a skip indication and a first time value and second time value.

In an embodiment, the server computer may be configured to analyze the log data and determine at least one output report that indicates that users have jumped backward in time in a particular audiovisual experience. This report provides the benefit of indicating when a group of users may have special interest in a particular video experience because the users have elected to view the experience starting from the beginning more than once. For example, the log data may store both a time point in video time at which a control bar interaction occurred, and a time point in real time for the particular user, for example based on the system clock of the user computer; when analysis of the log records indicates that the same user began viewing the same video at different system clock times or real times, then logic in the server computer may determine that the user repeatedly watched the video or performed a control bar interaction equivalent to jumping backward to the beginning. The results may be used to reach a determination that a particular sub segment of an audiovisual experience is valuable or is correlated with particular social or consumer behavior. Inferences about user social interaction with other users may be determined Thus, the viral impact of a particular sub segment of video on behavior of one person versus friends of that person may be determined Logic of the server computer may be configured to determine that a particular user is the source of responsive viral social interactions of other users and the particular number of responsive users (fan-out) may be determined; that particular user may be determined to be especially valuable to the content provider. Thus if a particular user is shown to repeatedly cause N other friends to perform responsive actions such as viewing the same audiovisual experience, segment, advertisement, etc., then that particular user may be determined to be more valuable than other users.

In a related technique, the player logic may be configured to accept user input representing a comment on a particular time point of the audiovisual experience and to cause storing the comment at the server computer in association with information identifying the video and the user. The server computer may be configured to cause publishing the comment to friends of the commenting user at the time that those friends view the same video, with the comments and photo thumbnails of the commenting users displayed in association with the control bar of the video when the time points of comments is reached during playback.

For example, assume that user John is viewing an audiovisual experience comprising an annotated online episode of the television show Glee. When John reaches time point 03:16 of the show, John sees a funny scene. John accesses a function of the player that allows entering a comment about the scene. The player creates and sends a POST request to the server computer that identifies John, Glee, 03:16, and provides the text of the comment, and the server computer stores the data. A few seconds or days later, John's friend Susan is viewing the same episode of Glee. Each second, or at another specified interval, Susan's player sends a request to the server to deliver one or more comments that are associated with the current time point of playback. Therefore, when Susan's player reaches time point 03:16, the server responds with John's comment. The player issues a call to the Facebook social graph server to retrieve John's profile photo thumbnail image. The player displays the thumbnail image in or near the control bar or another portion of the player window with the comment. The image and comment move leftward in the player window as the pointer in the control bar advances to later time points and eventually the image and comment disappear from the player window as Susan reaches much later time points.

If Susan has other friends who have also commented at 03:16, the profile thumbnail images of those friends and their comments may be displayed at the same point, for example, in a stack or row of images and comments. A priority ranking algorithm may be implemented to determine which friends' comments are displayed when a large number of comments are available and the amount of screen space cannot accommodate displaying photo thumbnails of all friends who have provided comments.

8.11 Code Execution

In an embodiment, metadata files 126 may reference one or more arbitrary sets of computer program code for execution; the code may comprise ordinary executables in storage 140 or file server 122, browser-executed code such as Javascript to be executed in browser 108, Adobe ActionScript actions, or any other code that the browser can access and run or that the video player logic 112 can access and run. In this embodiment, for example, a cue point may be configured using the user interface of FIG. 22 with an additional field in which a file of computer program code may be specified. In various embodiments, such cue points may be configured to execute arbitrary code based on reaching waypoints in a temporal map of the media experience, and the user response to choices presented at those waypoints. For example, embodiments may be configured to create a temporal map of user-guided playback, including interaction by segment, and map or associate the temporal map to execution order of code segments.

The code segments themselves can dynamically change the playback, including manipulating these mechanisms.

In one example of use, one of the metadata files 126 for a particular audiovisual experience is configured with a plurality of cue points. Each of the cue points references a first executable code segment which, when executed, causes storing in database 2010 data indicating that a particular user has visited the associated cue point. Data identifying which user is active in a particular session may be obtained from computer 102 via support library 2002 or player logic 112, either of which may be configured to obtain a user name, machine identifier, machine address, or other user identifying information. The metadata files 126 also may be configured with a plurality of annotations, each associated with a reference to a segment of executable code that is automatically executed at computer 102 or in player control server 2004 when the associated annotation is selected. In this example, the executable code causes storing, in database 2010, data indicating that the associated annotation was selected.

An embodiment may further include code in script files 2008 that is configured to retrieve the data from database 2010 to determine, based on dynamic business rules that are completely decoupled from the media, which video to insert at an insert point. In this example, when player logic 122 is playing a media asset and reaches an insert point, the player logic may query the database 2010 for the data indicating which prior cue points and annotations the user interacted with, apply the data to business rules embodied in the script files 2008 or other logic, and select one of a plurality of other media assets to play at that insert point.

In an embodiment, invocation of code is implemented using metadata files 126 that express an audiovisual experience in terms of cue points and annotations that generate events which in turn trigger actions. In an embodiment, events include click, enter, fire, and return. An annotation generates a click event when a user selects or clicks on an annotation. A text input annotation generates an enter event when a user selects the ENTER or RETURN key for the annotation. A cue point generates a fire event when the cue point is reached normally during playback of the associated video; a return event is generated when the cue point is reached as a result of a return from another action.

In an embodiment, actions may be inserted into any cue point or annotation. Each action is invoked based on whether its event attribute matches the event that occurred. An action's event attribute defaults to the default event for the object it is in. The default for cue points is "fire". The default for annotations is "click".

In one embodiment, in a metadata file 126, the actions for a particular object are set forth between <actions></actions> tags. In an embodiment, player control actions include:

modal—turn on or off player controls <action type="modal" value="true\false"/> pause—pause video <action type="pause"/> play—player video <action type="play"/> skipBack—same as clicking chapter back button <action type="skipBack"/> skipForward—same as clicking chapter forward button <action type="skipForward"/> end—stop player (programEnd)<action type="end"/>

In an embodiment, actions may express invocation of a service or script code. Service or script invocation actions may have a regularized calling syntax for passing named arguments using the arg tag. The arg tag is used to specify which name-value pairs to pass to the invocation function. The values can come from storage 140 or file server 132, or may be directly specified. In addition, in an embodiment, the following three arguments are passed: _head—the current playhead position; _url—the full URL of the current CTV file; _cp—the name of the current cuepoint.

In an embodiment, the <arg> element takes several parameters including the name of the argument. If a value is given it is used as the arg's value. If a value is not given, then the key is used to look up the value in storage. If the key is not given, then it defaults to the name parameter. In summary, arguments include: [required] name—the name for this argument; [optional] key—the key to use to look up the argument (defaults to the name); [optional] value—the value of this argument (defaults to the value contained in storage for the key).

A webservice action also has the URL to call in its href attribute. When this action is invoked, the args are passed in the URL as url-encoded POST data. An example of a webservice action is:

<action event="click" type="webService" href="http:// . . . "><arg name="bike"/><arg name="style" value="fast"/></action>

In an embodiment, a Javascript action has a func attribute which specifies which Javascript function to call. This function is expected to exist within the player's HTML file. A single parameter is passed to the function which is a Javascript object containing the args as keywords and values. For the Javascript action, an alternate invocation pattern may be used in which a script with its arguments is called directly. The script attribute contains the script to be called and any <arg> tags are ignored. For example:

<action type="javascript" script="alert('hello world')"/>

In an embodiment, actions expressed in Adobe ActionScript may be implemented in the player logic 112, or a file (such as an SWF file) that implements the action may be dynamically loaded.

8.12 Using Tags to Automate Content Creation

In an embodiment, video player logic 112 is configured to identify a tag value associated with a cue point, and in response, to perform a search for media assets that have been tagged with the tag value, to select one or more of the media assets, and do dynamically create and save updated metadata files 126 that reference the selected media assets. Additionally or alternatively, embodiments may be configured to use tags as a basis to retrieve sets of video files 122 for use in subsequent processing.

As background, embodiments recognize that many media assets, such as video clips, are available on the web or in public internet resources that may be accessed through networks 120. In some cases, those who store media assets in online resources, such as YouTube, write and store tag values in association with the media assets. In other cases, authors interacting with the system of FIG. 20 may elect to create one or more tag values for video files 122. In any case, authors can apply free form tags to media assets and these tags may be used to automate the creation of complex multimedia content.

As a result, authoring audiovisual experiences using video editor 106 involves a semantic domain in which the author performs creative activity by specifying ideas rather than media addresses. For example, rather than performing a search for video clips that have a particular tag, obtaining a URL of one of them, and inserting the URL in a particular place in the audiovisual experience such as with a cue point or annotation, video player logic 112 is configured to automatically perform a search based on a tag and arrange for access to video clips that match the tag.

For example, assume that an audiovisual experience consists of a news program that has a cue point named "segment1" associated with playing a first news segment at a particular time. The cue point also includes metadata that identifies a particular tag values such as (tag=Gardening). When the audiovisual experience plays and the "segment1" cue point is reached, video player logic 112 is configured to identify the tag value, initiate a search either in video files 122, internet sources via networks 120, or both, for videos that are tagged with the tag value. For internet searches, parameterized search queries using URL formats or other interfaces, specified by the internet resources, may be used according to open protocols published by the internet resources.

In response, video player logic 112 receives responses typically identifying a plurality of URLs, file names, or other identifiers of video assets. Video player logic 112 is configured to select a subset of the video assets. Selection logic may use various criteria, such as selecting assets that are recent, have usage rights granted, are less than or greater than a specified size or playing time, or simply the first n assets. Video player logic 112 then automatically writes instructions in updated metadata files 126 to associate and give access to the selected assets.

As another example, a parameterized URL carrying a search tag value may be used to request and obtain a set of videos for use in authoring experiences or other aspects of the system here. For example, video editor 106 may be configured with logic that prompts the end user to enter a keyword such as "Gardening." The video editor 106 is configured to create an HTTP request that includes a parameterized URL comprising a search query and send the request to one or more internet resources. In response, video editor 106 receives responses typically identifying a plurality of URLs, file names, or other identifiers of video assets. Video editor 106 may be configured to display a list of identifier of matching videos and to enable a user to select one or more of the video assets for use in authoring. In one embodiment, the video editor 106 is configured to enable the user to drag and drop a plurality of identifiers of videos into a specified set of slots, buckets or other UI widgets. For example, the request might return 50 results each indicating a video and the user might be allowed to drag 4 of the results into slots in an authoring application. The video editor 106 or video player logic 112 then automatically writes instructions in updated metadata files 126 to associate and give access to the selected assets or to create a new audiovisual experience that includes the selected results. Thus, using the techniques herein, automated content creation becomes possible using a relatively simple user interface and automatic keyword-based searching of video files 122 in internet resources.

8.13 Cloud-Based Editor and Playback

Referring to FIG. 20, in an embodiment, file server 132 may be located in a data center, server co-location facility, or any other suitable location coupled to networks 120 and not necessarily owned or operated by the same party as player control server 2004, web server 130, computer 102, or other elements of FIG. 20. Cloud-based or other networked data storage may be used for file server 132. In such an embodiment, video editor 106 may be configured to identify and use video files 122 and/or metadata files 126 that are in networked cloud locations. For example, rather than storing CPL instructions in metadata files 126 that reference a local file in storage 140, the instructions in the metadata files may reference networked storage locations for video files 122 that are at a cloud-based data center. Moreover, the video files 122 may be located in public content delivery networks or shared video storage sites that the user of computer 102 does not own or operate, and the video files may be controlled in accounts of parties other than the user of computer 102.

In particular, video transition effects for an audiovisual experience may be created and modified based solely on cloud-based streams with no local storage of the streams at storage 140. As an example, assume that video files 122 represent a first video and a second video that are stored at a public, cloud-based CDN such as YouTube. A metadata file 126 may specify playing the first video by referencing a URL that uniquely identifies the first video at YouTube. The same metadata file 126 may define a cue point located midway through the first video at which the user of computer 102, acting as author of the metadata file 126, wishes to transition to the second video. The cue point may reference the URL for the second video as the target of the cue point. Thereafter, another user who loads and runs an instance of video player logic 112 with the same metadata file 126 will receive an audiovisual experience consisting of seeing the first video, reaching the cue point midway through the first video, and continuing with the second video.

Thus, metadata files 126 for the video player logic 112 may be configured to define how to process, transition between, and otherwise use video files 122 that are received as cloud-stored streams. In this arrangement, users can use video editor 106 to accomplish the equivalent of non-linear editing without having any local storage for video at storage 140.

8.14 Point and Click Multimedia Authoring

In an embodiment, video editor 106 comprises instructions that implement a mechanism with which end users lacking media authoring skill can create multimedia content. In one embodiment, video editor 106 implements instructions to perform the following. A user watches a first video from among video files 122 using video editor 106. An automatic authoring mechanism pauses the video, either automatically at a preselected point indicated in the metadata files 126 for the video, and waits for user input specifying another video. The prompt for the user input may be configured as an annotation in the metadata files 126. In various embodiments, the prompt may request the user to specify a particular second video for input, or to select the second video from among a plurality of specified videos from a multiple choice list that is defined in the metadata files 126, or to interact with a browse dialog for the purpose of selecting a local video file to be uploaded as the second video. In response to user input, the metadata files 126 are updated to identify the second video that the user selected, specified or uploaded.

Thereafter, during playback of the same first video, the first video is not paused at the prior pause point but the second video is played immediately.

As a result, an author having a relatively low skill level or who desires a simple and fast way to specify an audiovisual experience can build the audiovisual experience readily from among multiple video assets.

In another embodiment, the video editor 106 may be configured with a mechanism to select media from social networking sites and include it in the context described above. For example, assume that a user watches the first video from among video files 122 using video editor 106. An automatic authoring mechanism pauses the video, either automatically at a preselected point indicated in the metadata files 126 for the video, and waits for user input specifying a social media element. The prompt for the user input may be configured as an annotation in the metadata files 126. For example, in an embodiment, a social media system profile picture is fetched and is applied as an icon for comments to be provided about the first video. The metadata files 126 are updated either with a reference to graphics files 124 at which the profile picture has been stored, or a reference to a location in the social graph from which the profile picture can be retrieved again at a later time.

Thereafter, when the first video is played again, and the same pause point is reached, the video player logic 112 is instructed based on the metadata files 126 to retrieve the profile picture either from graphics files 124 or from the social graph and to immediately display the profile picture as an icon at the indicated location.

8.15 Ad Server in the Cloud; Cloud-Based Editor

In an embodiment, annotations may be used to automate the presentation of advertisements during playing a video, with viewing an advertisement either optional or mandatory. For example, referring again to FIG. 32, the second video in region 3204 may comprise an advertisement video or a static graphic image that presents a video. Further, an annotation in metadata files 126 that governs presentation of the advertisement at region 3204 may be configured to cause the video player logic 112 to automatically switch to and play an advertisement video when a cue point associated with the annotation is reached in playing the first video 3202. The foregoing is an example of a mandatory advertisement.

Additionally or alternatively, the cue point and annotation that cause presentation of the advertisement at region 3204 may configure the advertisement as a graphical image associated with a hyperlink, so that only selection of the hyperlink associated with the region 3204 causes the video player 112 to switch to playing the advertisement video. If no selection of the hyperlink at region 3204 occurs, then the first video 3202 continues playing and, in some embodiments, later cue points may specify that the second region 3204 is removed from the player window 3201. The foregoing is an example of a voluntary advertisement.

Video streams for advertisements used in any of the foregoing approaches may be obtained from CDN cloud storage, so that an author of an audiovisual experience can introduce ad breaks that play other videos from the cloud. Ad breaks can be mandatory or optional; an optional ad break plays only when the associated annotation is selected. The author does not need direct access to any of the videos.

In a related technique, late binding of one video segment to another segment is provided. In such an embodiment, the video experience that the author creates, using CPL instructions in metadata files 126, contains an abstract reference to an insertion that may be an advertisement or other video segment. The abstract reference to an insertion is bound to a real advertisement at a later time, for example, at the time that the audiovisual experience plays.

In an embodiment, an author of an audiovisual experience specifies, during authoring, insertion points with references to advertisements or other video segments that can be inserted from networked storage, such as cloud storage, at the time of playback, potentially based upon business rules or other conditions.

In an embodiment, an editor for use in creating audiovisual experiences is configured to receive and store definitions of one or more video segments or sources that are located in network accessible locations. The definitions are stored in metadata that is associated with the audiovisual experience that the author is creating or editing. Network accessible locations may include internet content server locations or other server computers that are coupled to an internetwork and accessible using internet protocols. The network accessible locations may be public or may be subject to access security controls. The video sources may be in cloud storage or other online storage as opposed to locations in a LAN or LAN segment or sub domain that contains the computer on which the editor is running Editing may involve defining one or more jump cuts or transitions from multiple video sources from different networked locations, storing the definitions in metadata and implementing the cuts or transitions using the player logic at the time that the audiovisual experience is played. For example, a single audiovisual experience may initially play a first media asset from a website associated with the British Broadcasting Company (BBC) and then cut to, dissolve to or otherwise transition to another video segment that is stored on a networked server that is owned and operated by a studio such as Paramount. Any number of video assets stored on any of a plurality of internet accessible servers may be referenced using the editor logic in the metadata for a single audiovisual experience and played together with transitions using the player logic.

As an example, the author creates and stores a cue point A that comprises a jump to a next cue point B, and metadata for cue point B specifies a video source as a URL to an internet networked resource. The metadata further specifies a location within a video clip at the video source, what to do with audiovisual content within the clip. At playback, the audiovisual experience reaches cue point B and issues an access request to the video source that is specified in the metadata for the cue point. The audiovisual experience continues by playing video that is streamed from the specified networked video source.

8.16 Temporal Templates

In an embodiment, video editor 106 may be configured with template management logic that generally operates to open the metadata files 126 for a particular audiovisual experience, display the experience with the original media in place, demote or remove the media while extracting the metastructure of the experience, and build a new version of the experience with different media and timing.

As background, often audiovisual experiences such as television episodes have the same general structure, in terms of graphical windows or framing, annotations, and other non-media visual elements, and vary only in the specific media that is placed in the structure, and the times, though not the structure, at which events occur. Therefore, in an embodiment, the editing and construction of multiple versions of a similar audiovisual experience can be made more efficient through a way to abstract and store the structure of an existing asset while allowing time points for playing media to change. As a result, authoring tasks involved in episodic programs are simplified and involve replacing the media within a template structure and adjusting time points.

Templates also may be configured to provide mechanisms to maintain consistent branding and provide fine grained control over what elements and types of elements the author can change. For example, a template may embody controls that specify whether a production assistant who is setting up multiple TV show episodes from a template is allowed to swap images, change targets, change target types, change start time points or transition time points, or perform other operations. Thus, in an embodiment, template authoring functions in video editor 106 facilitate rapid and efficient authoring of audiovisual experiences. The method for hierarchical control of what distinct classes of people are allowed to change is also of broad applicability.

In an embodiment, templates facilitate abstracting structure away from particular media. For example, assume that using video editor 106, a user has created and stored an audiovisual experience comprising a video promotion for a particular motion picture film titled Alpha, which is a futuristic science fiction epic. The audiovisual experience includes background graphics, button images, and other stylization that is particular for the theme, look and feel of Alpha. Now further assume that the user wishes to create an audiovisual experience for a second motion picture film Beta using a similar screen structure or layout, but with completely different graphic stylization for Beta, which is a Western film set in the 1880s. The video editor 106 is configured to convert a particular audiovisual experience into a template that can be re-populated with different media assets that may include different playable audiovisual segments as well as different graphical stylization and look and feel. The video editor 106 may expose, in its graphical user interface, a "Convert to Template" or "Make Template" function for this purpose.

Figure 29:
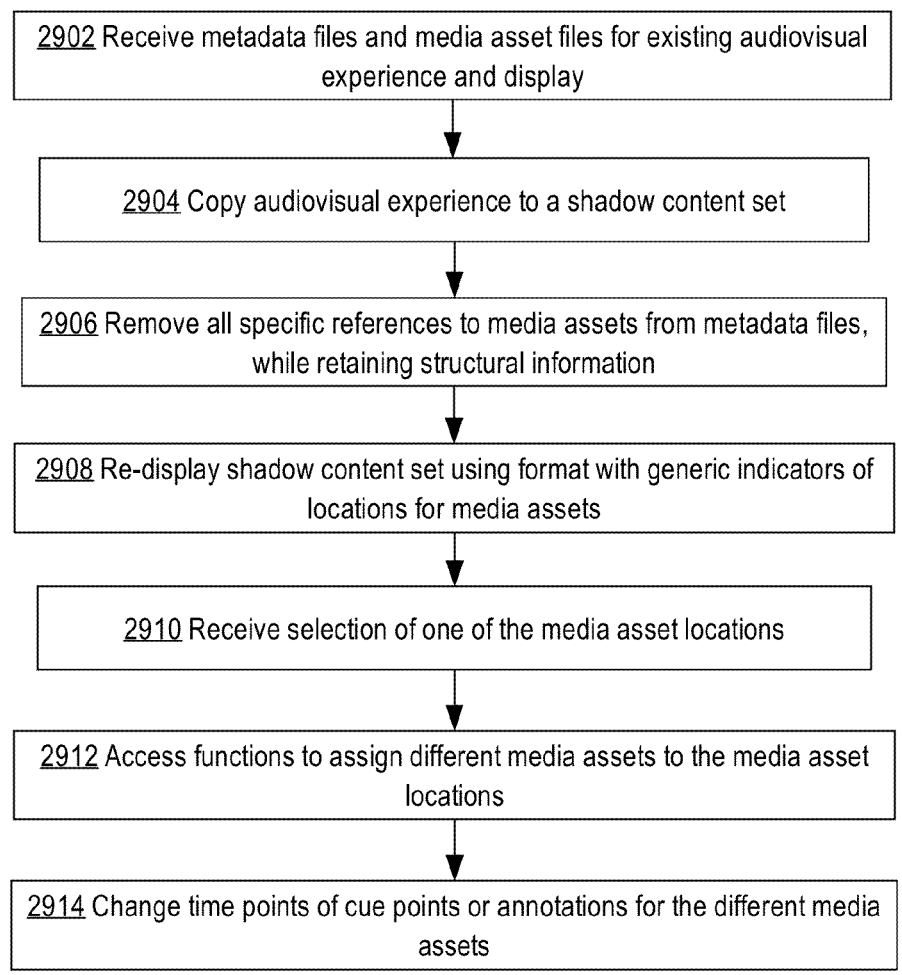
FIG. 29 illustrates an embodiment of transforming a particular audiovisual experience to a template.

FIG. 29 illustrates an embodiment of transforming a particular audiovisual experience to a template. In an embodiment, at 2902, the process receives metadata files and media asset files for an existing audiovisual experience. For example, video editor 106 accesses video files 122, graphics files 124, and metadata files 126 for a particular audiovisual experience and presents a display having a form similar to that shown in FIG. 17B. At 2904, the process copies the audiovisual experience to a shadow content set; the shadow content set ultimately becomes a template through further processing.

At 2906, in association with the copying, all specific references to media assets that were the existing audiovisual experience are removed, including time points, but structural information such as the size in pixels of annotations or other elements is retained. At 2908, the resulting shadow content set is re-displayed in a format in which locations for media assets are represented generically, for example, as gray rectangles.

The user then may select one or more of the media asset locations, as seen at 2910, and access functions to assign different media assets to the media asset locations, as seen at 2912. The user can save the resulting modified shadow content set as a new audiovisual experience, for example, for Beta.

Figure 37A:
FIG. 37A illustrates a screen display of an audiovisual experience.
Figure 37B:
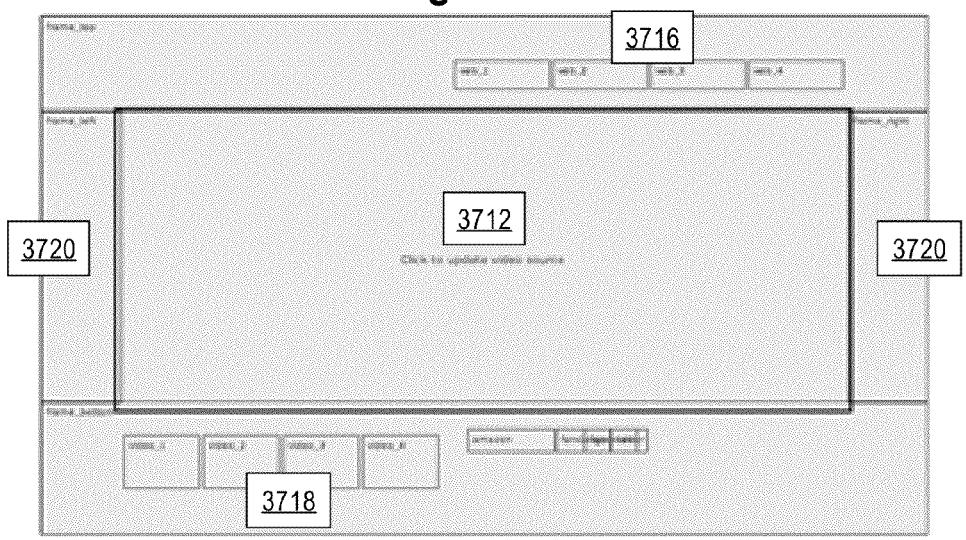
FIG. 37B illustrates a screen display of a template for the same audiovisual experience that has been produced using the process of FIG. 29.

FIG. 37A illustrates a screen display of an audiovisual experience comprising a main video region 3702, graphic image 3704, first annotations 3706 and second annotations 3708. FIG. 37B illustrates a screen display of a template for the same audiovisual experience that has been produced using the process of FIG. 29. FIG. 37B indicates that all media assets shown in FIG. 37A have been removed, but the overall structure and location of media assets and annotations has been retained. For example, main video region 3712 has the same size and location as region 3702; first annotation rectangles 3716 correspond in size, arrangement and location to first annotations 3706; second annotation rectangles 3718 correspond to second annotations 3708. In FIG. 37B, other structural rectangles 3720 indicate the location, size and arrangement of basic structural elements of the audiovisual experience such as headers, sidebars, footers and other elements surrounding the region 3712. Any of the elements shown in FIG. 37B may be selected and replaced with other media assets.

Figure 38:
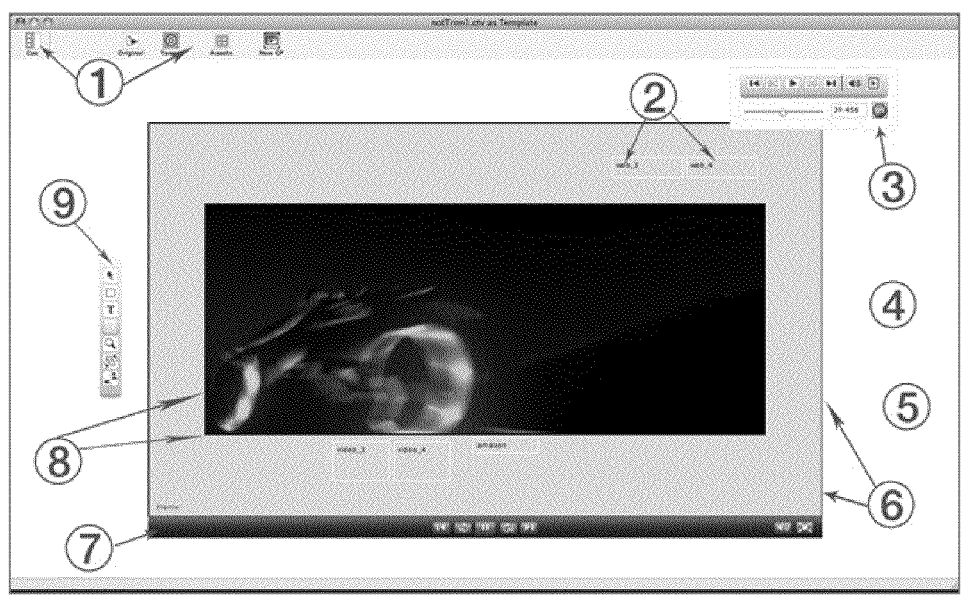
FIG. 38 illustrates an example user interface that may be generated by the video editor for use in creating audiovisual experiences based on templates.

FIG. 38 illustrates an example user interface that may be generated by the video editor for use in creating audiovisual experiences based on templates. In an embodiment, video editor 106 integrated with template-based creation logic features a Fixed Bar 1 that enables selecting or assigning cue points, media assets, original media, and other functions. Annotations 2 are indicated. A Playbox 3 may provide video controls for playing assets that are shown in the editor. A Stage 4 serves as a background area for showing the audiovisual experience in relation to a computer experience. A Background HTML Area 5 shows the background HTML on the stage 4 if background HTML is loaded; background HTML is depicted behind the frame. An example of background HTML may be seen in FIG. 17D and consists of repeated instances of the text "AMC" and a colored background. Frame 6 comprises an area in which all media elements such as annotations and a video rectangle are located. A Control Bar 7 indicates the position of trick play icons 1104 (FIG. 11) as they will appear in an end user's view of the experience, but is not active during editing using video editor 106; instead the playbox 3 is used to control the video. A Video Rectangle 7 indicates an area in which the main video plays. A Tool Bar 9 contains a plurality of icons which when selected may invoke editing tools for modifying the template. For example, icons may be provided to access tools to create annotations, create image elements, create text annotations, zoom the frame, reorder annotations, and/or align or distribute elements.

A more detailed implementation example is set forth in the document entitled "Andromeda Functional Spec ver 0.5.8," which forms part of the provisional disclosure and this disclosure.

A benefit of this approach is that the user who creates the Beta audiovisual experience may have a lower degree of artistic skill or technical skill than the user who created the original Alpha audiovisual experience including defining the locations of media assets, annotations, or other elements in terms of screen position, pixel sizes, and interactive behavior. For example, the user who creates Beta only needs to have the ability to select new media assets for Beta and assign them to existing media asset locations in the template; there is no need for more advanced authoring skills such as defining the behavior of annotations. The same functional behavior is retained in the Beta audiovisual experience but references and uses different media assets. In one embodiment, assigning new media assets to the template may include performing certain basic graphic operations such as rotation and scaling.

In an embodiment, the editor logic is configured to enable a user, working from a template, to change the time points in new media assets at which specified interactions occur, as seen at 2914. This logic recognizes the fact that the particular time point within a Beta media asset, such as a video segment, at which a desired action should occur—such as displaying an annotation or website item or jumping to another video segment—is extremely unlikely to be the same time point as for the prior Alpha media asset. In an embodiment, the user may access a cue point and may change the play head time point associated with a change in playback behavior.

Thus, in certain embodiments, templates may facilitate a process of rapid creation of audiovisual experiences that may be termed template-based one-click experience creation. The following process may be used. With video editor 106, a user of computer 102 selects a template by browsing among metadata files 126 and using a file open dialog to identify and open a selected template file. The video editor 106 displays the template in the form of a screen display structure defined in the template with gray rectangles, or other indicators of placeholders, in locations that the user is permitted to change. The user selects a particular one of the placeholders and selects a control that is configured to accept an identification of a video identifier. The user operates a file open dialog to specify a particular video asset among video files 122 or in local storage 140. In response to the user selecting the particular video asset, video editor 106 associates the video asset with the selected placeholder location, and the user may store a new metadata file 126 representing the template with the particular video asset either in local storage 140 or using file server 132. A similar technique may be used to select available placeholders for annotations, and to select graphics or web pages as icon representations or targets for the annotations.

In some embodiments, the author also may modify time points of the media assets so that the media assets start and end at desired times, and the modified time points are stored as part of the metadata file 126.

As a result, authoring a new audiovisual experience may consist of a simplified process of selecting placeholder locations within a defined structure and selecting media assets to plug into the template. Thus an author may use the generalized audiovisual experience authoring platform described herein with template-based one-click experience creation to rapidly create one or more applications for particular purposes. Further, pop-up audiovisual experiences may be authored using templates based on editor logic that is similarly configured and further described in the appendices that are submitted concurrently herewith.

9.0 Extensions, Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing method comprising:

at a computer, obtaining a link to a stored video program and obtaining metadata that relates to the video program and that defines a first audiovisual experience;

wherein the first audiovisual experience comprises a reference to the video program, one or more annotations that are associated with actions, one or more cue points each associated with a specified time point in the video program, one or more graphic images, and structural data indicating dimensions and screen locations of a video region in which the video program is to be displayed, regions representing the annotations, and the graphic images;

automatically copying the metadata into a shadow data set that includes the structural data but omits all of: the reference to the video program; the annotations; the cue points; the graphic images;

causing displaying, on a computer display unit, a first representation of the shadow data set in which the structural data is represented as a plurality of rectangles that represent the dimensions and screen locations of the video region and the regions representing the annotations;

receiving input data representing one or more selections of new graphic images and new media assets in association with selections of specified particular rectangles among the plurality of rectangles;

creating and storing a second audiovisual experience by updating the shadow data set to include new references to the new graphic images and the new media assets;

wherein the method is performed using one or more computing devices.

2. The method of claim 1 further comprising causing displaying an inactive trick play control bar in association with the video region.

3. The method of claim 1 further comprising updating the computer display unit to show a second representation of the second audiovisual experience in which one or more of the new graphic images and the new media assets are shown in the specified particular rectangles.

4. The method of claim 3 further comprising causing displaying a playbox over the second representation, wherein the playbox includes at least one trick play control which, when selected, causes performing a trick play function with one of the new media assets in the video region.

5. The method of claim 3 further comprising causing displaying a toolbar adjacent to or over the second representation, wherein the toolbar comprises a plurality of tool icons which when selected cause invoking editing tools for modifying the second audiovisual experience.

6. The method of claim 5 wherein selecting the tool icons causes invoking any of tools to create annotations, create image elements, create text annotations, zoom the frame, reorder annotations, and/or align or distribute elements.

* * * * *